United States Patent
Khoshkholgh Dashtaki et al.

(10) Patent No.: US 12,376,058 B2
(45) Date of Patent: Jul. 29, 2025

(54) REPORTING TIMING ADVANCE INFORMATION IN NON-TERRESTRIAL NETWORKS

(71) Applicant: Ofinno, LLC, Reston, VA (US)

(72) Inventors: Mohammad Ghadir Khoshkholgh Dashtaki, Burnaby (CA); Ali Cagatay Cirik, Chantilly, VA (US); Esmael Hejazi Dinan, McLean, VA (US); Hyoungsuk Jeon, Centreville, VA (US); Bing Hui, Nanjing (CN)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/230,401

(22) Filed: Aug. 4, 2023

(65) Prior Publication Data

US 2023/0388952 A1 Nov. 30, 2023

Related U.S. Application Data

(63) Continuation of application No. PCT/US2022/045172, filed on Sep. 29, 2022.
(Continued)

(51) Int. Cl.
*H04W 56/00* (2009.01)
(52) U.S. Cl.
CPC .............. *H04W 56/0045* (2013.01)
(58) Field of Classification Search
CPC .............................................. H04W 56/0045
(Continued)

(56) References Cited

U.S. PATENT DOCUMENTS

2021/0007147 A1* 1/2021 Yang ................. H04W 74/0808
2021/0029658 A1 1/2021 Mahalingam et al.
(Continued)

FOREIGN PATENT DOCUMENTS

CN 113261351 A 8/2021
EP 4319371 A1 2/2024
(Continued)

OTHER PUBLICATIONS

R1-2106591; 3GPP TSG RAN WG1#106-e; e-Meeting, Aug. 16-27, 2021; Source: vivo; Title: Discussion on timing relationship enhancements for NR-NTN; Agenda Item: 8.4.1; Document for: Discussion and Decision.
(Continued)

*Primary Examiner* — Chi Tang P Cheng
(74) *Attorney, Agent, or Firm* — Peter Flanagan; Kavon Nasabzadeh; Jacob L. Mangan

(57) ABSTRACT

A method may include receiving, by a wireless device, one or more configuration parameters for a timing advance (TA) reporting procedure. The one or more configuration parameters may include a first timing advance threshold for a TA reporting based on an offset between a current timing advance value and a last reported timing advance value. The method may also include triggering the TA reporting procedure based on a condition for the first timing advance threshold being satisfied. The method may additionally include based on the triggering the TA reporting procedure, triggering a scheduling request (SR) and starting a SR prohibit timer. The method may further include, in response to canceling the TA reporting procedure, cancelling the triggered SR and stopping the SR prohibit timer.

20 Claims, 31 Drawing Sheets

Related U.S. Application Data

(60) Provisional application No. 63/250,368, filed on Sep. 30, 2021.

(58) Field of Classification Search
USPC .......................................................... 370/350
See application file for complete search history.

(56) References Cited

U.S. PATENT DOCUMENTS

| | | | |
|---|---|---|---|
| 2021/0105761 | A1 | 4/2021 | Cheng et al. |
| 2021/0321353 | A1 | 10/2021 | Muruganathan et al. |
| 2022/0006514 | A1 | 1/2022 | Sedin et al. |
| 2022/0086780 | A1 | 3/2022 | Tsai et al. |
| 2022/0124795 | A1 | 4/2022 | Wu et al. |
| 2023/0284165 | A1* | 9/2023 | Ye .......................... H04L 1/0038 370/503 |

FOREIGN PATENT DOCUMENTS

| | | | |
|---|---|---|---|
| WO | 2021/063395 | A1 | 4/2021 |
| WO | 2021/139665 | A1 | 7/2021 |
| WO | 2021/163889 | A1 | 8/2021 |
| WO | 2021/164579 | A1 | 8/2021 |
| WO | 2021159449 | A1 | 8/2021 |
| WO | 2022/052989 | A1 | 3/2022 |
| WO | 2022/237845 | A1 | 11/2022 |
| WO | 2022/243910 | A1 | 11/2022 |

OTHER PUBLICATIONS

R1-2106754; 3GPP TSG RAN WG1 #106-e; e-Meeting, Aug. 16-27, 2021; Agenda Item: 8.4.1; Source: Baicells; Title: Discussion on timing relationship enhancement for NTN; Document for: Discussion and Decision.
R1-2106805; 3GPP TSG RAN WG1 #106-e; e-Meeting, Aug. 16-27, 2021; Agenda Item: 8.4.1; Source: Sony; Title: Calculation and application of timing relationship offsets; Document for: Discussion and decision.
R1-2106884; 3GPP TSG RAN WG1 #106-e; e-Meeting, Aug. 16-27, 2021; Agenda item: 8.4.1; Source: Samsung; Title: Timing relationship enhancements for NTN; Document for: Discussion and Decision.
R1-2106967; 3GPP TSG RAN WG1 #106-e; e-Meeting, Aug. 16-27, 2021; Agenda Item: 8.4.1; Source: CATT; Title: Further discussion on timing relationship enhancements for NTN; Document for: Discussion and Decision.
R1-2107014; 3GPP TSG RAN WG1 #106-e; e-Meeting, Aug. 16-27, 2021; Agenda Item: 8.4.1; Source: NEC; Title: Discussion on timing relationship enhancements for NTN; Document for: Discussion.
R1-2107020; 3GPP TSG RAN WG1 #106-e; E-meeting, Aug. 16-Aug. 27, 2021; Source: Panasonic; Title: Enhancements on UL time and frequency synchronization; Agenda Item: 8.4.2; Document for: Discussion and decision.
R1-2107287; 3GPP TSG RAN WG1#106-e; e-Meeting, Aug. 16-Aug. 27, 2021; Source: FGI, Asia Pacific Telecom, III, ITRI; Title: Timing relationship enhancements in NTN; Agenda item: 8.4.1; Document for: Discussion and Decision.
R1-2107399; 3GPP TSG RAN WG1 #106-e; e-Meeting, Aug. 16-27, 2021; Source: CMCC; Title: Discussion on timing relationship enhancements for NTN; Agenda Item: 8.4.1; Document for: Discussion and Decision.
R1-2107736; 3GPP TSG RAN WG1 #106-e; e-Meeting, Aug. 16-27, 2021; Agenda Item: 8.4.1; Source: Apple; Title: On Timing Relationship Enhancements for NR NTN; Document for: Discussion/Decision.
R1-2107775; 3GPP TSG RAN WG1 #106-e; e-Meeting, Aug. 16-27, 2021; Source: ZTE; Title: Discussion on timing relationship for NR-NTN; Agenda Item: 8.4.1; Document for: Discussion.

R1-2107855; 3GPP TSG RAN WG1 #106e; e-Meeting, Aug. 16-27, 2021; Source: NTT Docomo, Inc.; Title: Discussion on timing relationship enhancements for NTN; Agenda Item: 8.4.1; Document for: Discussion and Decision.
R1-2108518; 3GPP TSG-RAN WG1 Meeting #106-e; e-Meeting, Aug. 16-27, 2021; Title: Draft Reply LS on TA pre-compensation; Reply to: LS on TA pre-compensation (R2-2104376); Release: Release 17; Work Item: NR_NTN_solutions-Core.
R1-2108555; GPP TSG-RAN WG1 Meeting #106-e; e-Meeting, Aug. 16-27, 2021; Agenda Item: 8.4.1; Source: Moderator (Ericsson); Title: Feature lead summary#5 on timing relationship enhancements; Document for: Discussion.
R1-2108587; 3GPP TSG-RAN WG1 Meeting #106-e; e-Meeting, Aug. 16-27, 2021; Agenda Item: 8.4.2; Source: Moderator (Thales); Title: FL Summary #7 on enhancements on UL time and frequency synchronization for NR NTN; Document for: Discussion.
R2-2104966; 3GPP TSG-RAN WG2 Meeting #114 electronic; Online, May 19-May 27, 2021; Agenda item: 8.10.2.1; Source: Asia Pacific Telecom, FGI; Title: Discussion on UE-specific TA report; Document for: Discussion and decision.
R2-2106015; 3GPP TSG-RAN WG2 Meeting #114 electronic; Online, May 19-27, 2021; Agenda item: 8.10.2.2Other MAC aspects; Source: NEC; Title:Remaining RACH issues; Document for: Discussion.
R2-2107075; 3GPP TSG-RAN WG2 Meeting #115 electronic; Online, Aug. 2021; Agenda Item: 8.10.2.1; Source: OPPO; Title: Discussion on RACH in NTN; Document for: Discussion, Decision.
R2-2107280; 3GPP TSG RAN WG2 Meeting #115-e; e-Meeting, Aug. 9-Aug. 27, 2021; Agenda item: 8.10.2; Source: Samsung; Title: User Plane Issues and Enhancements for an NTN; Document for: Discussion & Decision.
R2-2107314; 3GPP TSG-RAN WG2 Meeting #115-e; Electronic meeting, Aug. 16-27, 2021; Source: CATT ; Title: Discussion on UE-specific TA Report; Agenda Item: 8.10.2.1; Document for: Discussion and Decision.
R2-2107362; 3GPP TSG-RAN WG2 Meeting #115-e; Online, Aug. 16-27, 2021; Agenda item: 8.10.2.1; Source: Spreadtrum Communications; Title: TA report in Random access procedure; Document for: Discussion and Decision.
R2-2107972; 3GPP TSG-RAN2 #115e; Online, Aug. 9-27, 2021; Agenda Item: 8.10.2.1; Source: Xiaomi; Title: RACH Type selection and TA report; Document for: Discussion and Decision.
R2-2108114; 3GPP TSG-RAN WG2 Meeting #115 Electronic; Elbonia, Aug. 16-27, 2021; Agenda item: 8.10.2.1; Source: Nokia, Nokia Shanghai Bell; Title: Further discussion on RACH issues for NR NTN; WID/SID: NR_NTN_solutions-Core—Release 17; Document for: Discussion and Decision.
R2-2108350; 3GPP TSG-RAN WG2 Meeting #115 electronic; Online, Aug. 16-Aug. 27, 2021; Source: ZTE Corporation, Sanechips; Title: Consideration on Random Access aspects; Agenda item: 8.10.2.1; Document for: Discussion and Decision.
R2-2108453; 3GPP TSG-RAN WG2 #115e; Electronic meeting, Aug. 16, 2021-Aug. 27, 2021; Revision of R2-2106090; Agenda Item: 8.10.2.1; Source: Ericsson; Title: Random Access timers and reporting information about UE specific TA pre-compensation in NTNs; Document for: Discussion, Decision.
R2-2108609; 3GPP TSG-RAN WG2 #115-e; E-meeting, Aug. 16-Aug. 27, 2021; Agenda Item: 8.10.2.1 (NR_NTN_solutions-Core); Source: LG Electronics Inc.; Title: Discussion on RACH and TA report aspects; Document for : Discussion and Decision.
R2-2108611; 3GPP TSG-RAN WG2 Meeting #115-e; Online, Aug. 9-27, 2021; Source: Huawei, HiSilicon; Title: Discussion on TA report; Agenda Item: 8.10.2.2; Document for: Discussion and decision.
R2-2108882; 3GPP TSG-RAN WG2 Meeting #115e; Online, Aug. 16-27, 2021; Agenda item: 8.10.2.1; Source: CATT; Title: Report of [AT115-e][106][NTN] RACH aspects (CATT); Document for: Discussion and Decision.
R2-2108897; 3GPP TSG-RAN WG2 Meeting #115e; Online, Aug. 16-27, 2021; Agenda item: 8.10.2.1; Source: CATT; Title: [draft] Report of [AT115-e][106][NTN] RACH aspects (CATT); Document for: Discussion and Decision.

(56) References Cited

OTHER PUBLICATIONS

International Search Report and Written Opinion of the International Searching authority mailed Mar. 31, 2023, in International Application No. PCT/US2022/045172.
R2-2103261; 3GPP TSG-RAN WG2 Meeting #113 bis electronic; Online, Apr. 12-Apr. 20, 2021; Agenda item: 8.10.2.1; Source: Asia Pacific Telecom, FGI; Title: Triggering of UE-specific TA report; Document for: Discussion and decision.
Extended European Search Report mailed Nov. 22, 2024 in EP Patent Application No. 24179199.5.

* cited by examiner

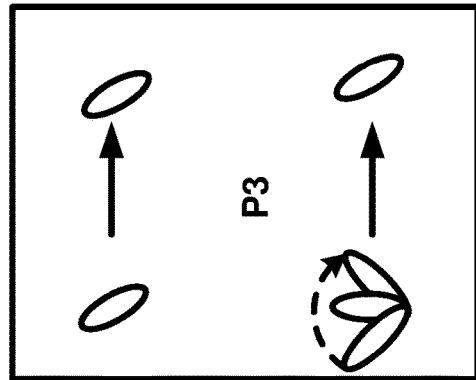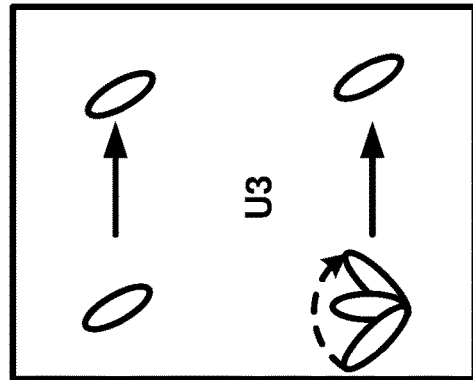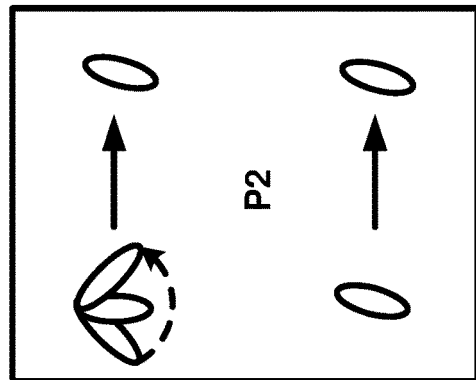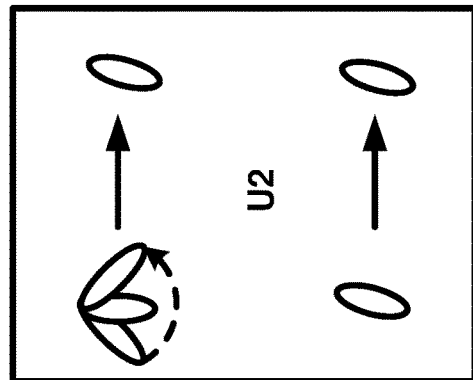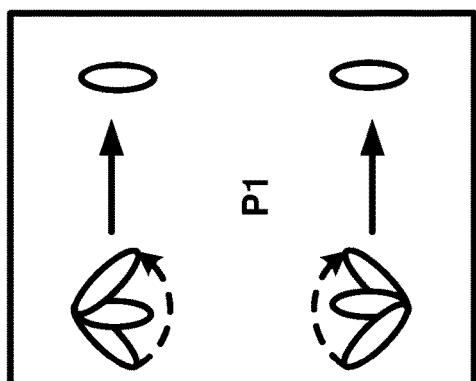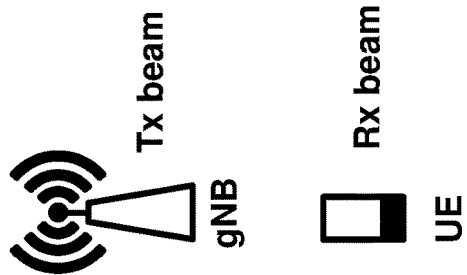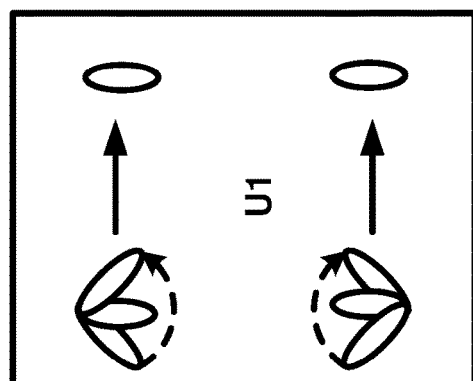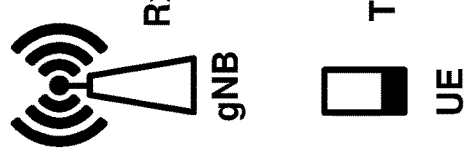
FIG. 12A
FIG. 12B

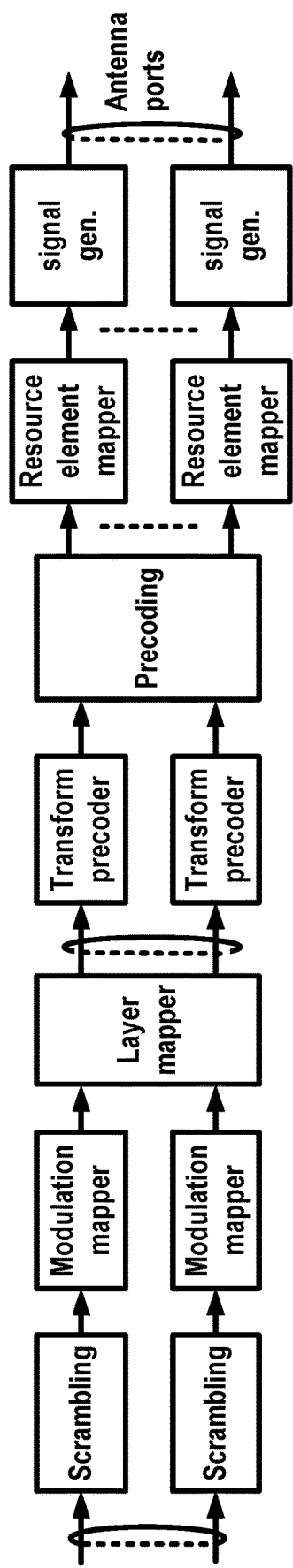
FIG. 16A
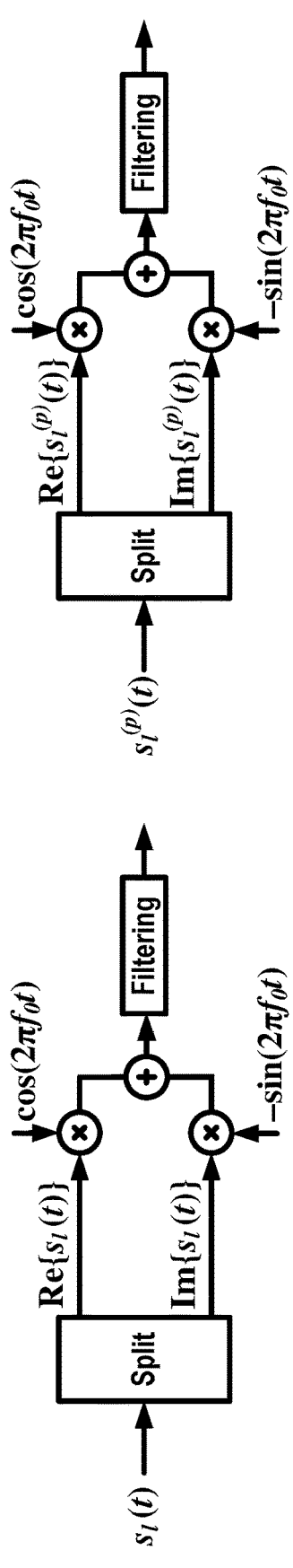
FIG. 16B
FIG. 16D
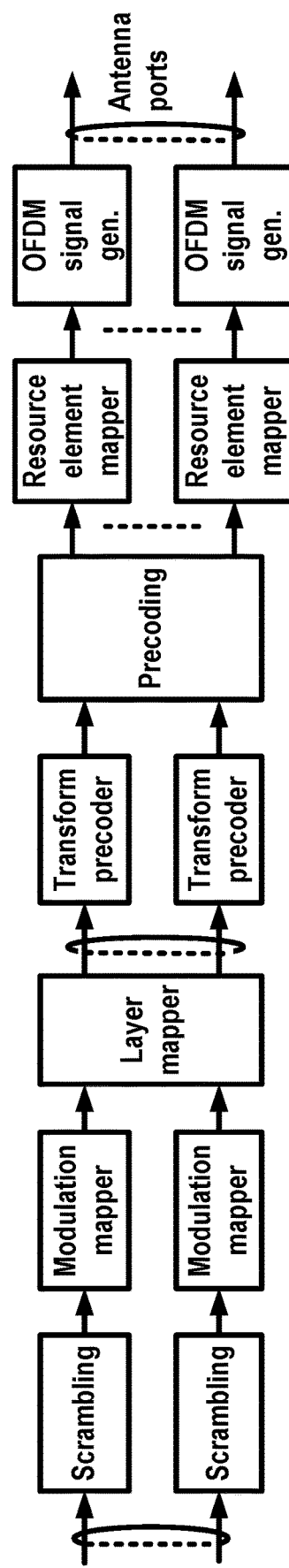
FIG. 16C

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

Table 1: PDSCH processing time for PDSCH processing capability 1

| $\mu$ | PDSCH decoding time $N_1$ [symbols] | |
|---|---|---|
| | dmrs-AdditionalPosition = 'pos0' in both of DMRS-DownlinkConfig in both of dmrs-DownlinkForPDSCH-MappingTypeA, dmrs-DownlinkForPDSCH-MappingTypeB | dmrs-AdditionalPosition ≠ 'pos0' in DMRS-DownlinkConfig in either of dmrs-DownlinkForPDSCH-MappingTypeA, dmrs-DownlinkForPDSCH-MappingTypeB, or if the higher layer parameter is not configured |
| | | $N_{1,0}$ |
| 0 | 8 | 13 |
| 1 | 10 | 13 |
| 2 | 17 | 20 |
| 3 | 20 | 24 |

Table 2: PDSCH processing time for PDSCH processing capability 2

| $\mu$ | PDSCH decoding time $N_1$ [symbols] dmrs-AdditionalPosition = 'pos0' in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

FIG. 18

Table 3: PUSCH preparation time for PUSCH timing capability 1

| $\mu$ | PUSCH preparation time $N_2$ [symbols] |
|---|---|
| 0 | 10 |
| 1 | 12 |
| 2 | 23 |
| 3 | 36 |

Table 4: PUSCH preparation time for PUSCH timing capability 2

| $\mu$ | PUSCH preparation time $N_2$ [symbols] |
|---|---|
| 0 | 5 |
| 1 | 5.5 |
| 2 | 11 for frequency range 1 |

FIG. 19

Types of non-terrestrial network (NTN) platforms/nodes

| NTN Platforms | Altitude range | Orbit | Typical beam footprint size |
|---|---|---|---|
| LEO satellite | 300 – 1500 km | Circular around the earth | 100 – 1000 km |
| MEO satellite | 7000 – 25000 km | | 100 – 1000 km |
| GEO satellite | 35,786 km | Notional station keeping position fixed in terms of elevation/azimuth with respect to a given earth point | 200 – 3500 km |
| UAS platform | 8-50 km (20km for HAPS) | | 5 – 200 km |
| HEO platform | 400 – 50000 km | Elliptical around the earth | 200 – 3500 km |

FIG. 21

| Class of Orbit | Altitude (km) | Elevation angle (degrees) | |
|---|---|---|---|
| | | 0 | 10 |
| LEO satellite | | Propagation delay – satellite to UE (millisec) | 90 |
| | 800 | 11.0 | 2.7 |
| | 1400 | 14.8 | 4.7 |
| MEO satellite | | Propagation delay – satellite to UE (millisec) | |
| | 8000 | 43.0 | 26.7 |
| GEO satellite | | Propagation delay – satellite to UE (millisec) | |
| | 35,786 | 138.9 | 119.3 |

Types of non-terrestrial network platforms

FIG. 23

REPORTING TIMING ADVANCE INFORMATION IN NON-TERRESTRIAL NETWORKS

CROSS-REFERENCE TO RELATED APPLICATIONS

This application is a continuation of International Application No. PCT/US2022/045172, filed Sep. 29, 2022, which claims the benefit of U.S. Provisional Application No. 63/250,368, filed Sep. 30, 2021, all of which are hereby incorporated by reference in their entireties.

BRIEF DESCRIPTION OF THE DRAWINGS

Examples of several of the various embodiments of the present disclosure are described herein with reference to the drawings.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 17 shows several examples of DCI formats.

FIG. 18 shows example PDSCH processing times.

FIG. 19 shows examples of PUSCH preparation/processing time.

FIG. 21 is an example figure of different types of non-terrestrial network (NTN) platforms/nodes.

FIG. 23 shows examples of propagation delay corresponding to NTNs of different altitudes.

DETAILED DESCRIPTION

Figure 1A:
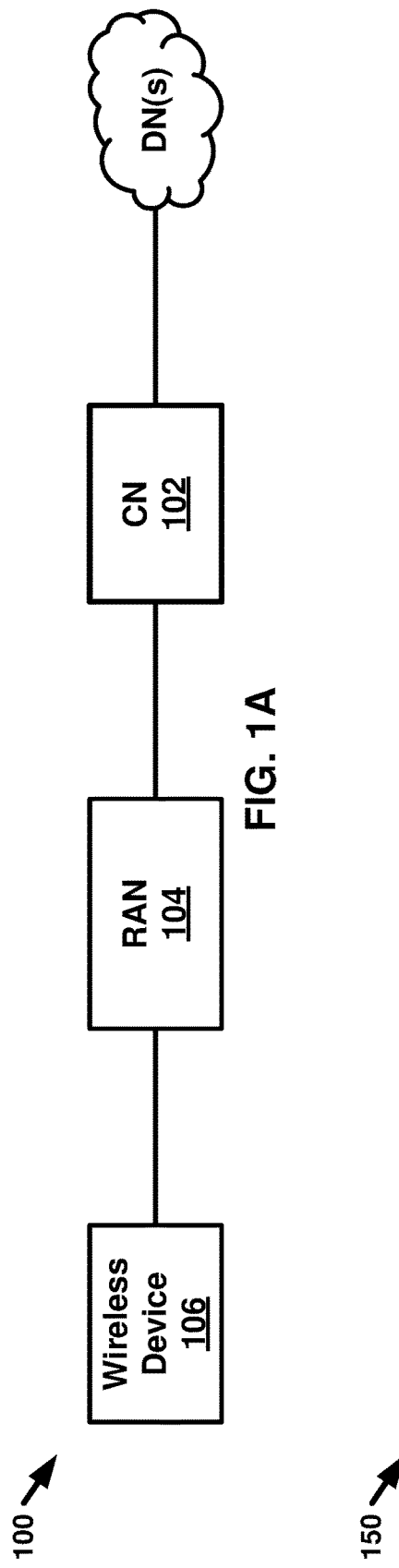
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is interpreted as "at least one" and "one or more." In this disclosure, "at least one of A and B" is interpreted as "only A, only B, or both A and B." In this disclosure, the term "may" is interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (I) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
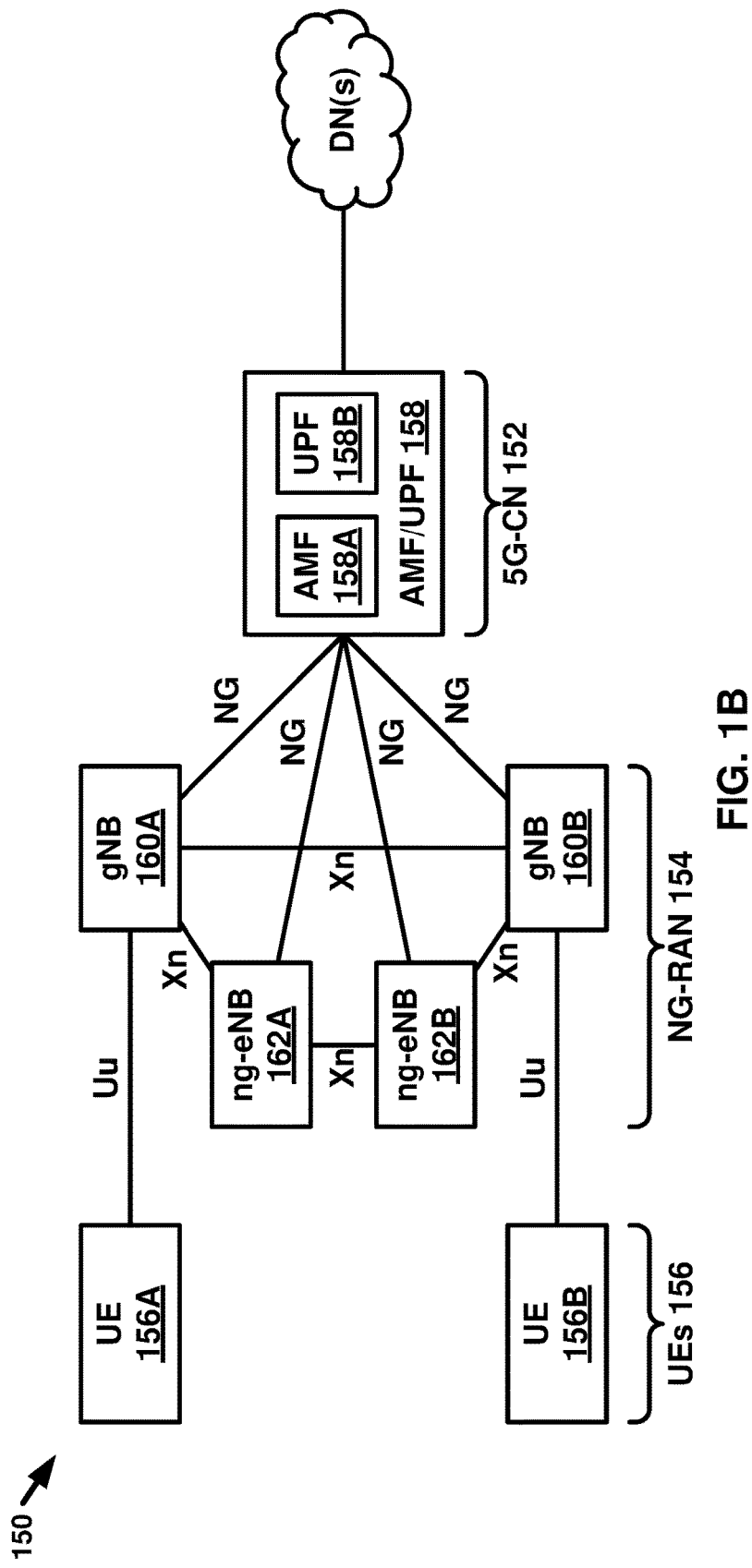

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
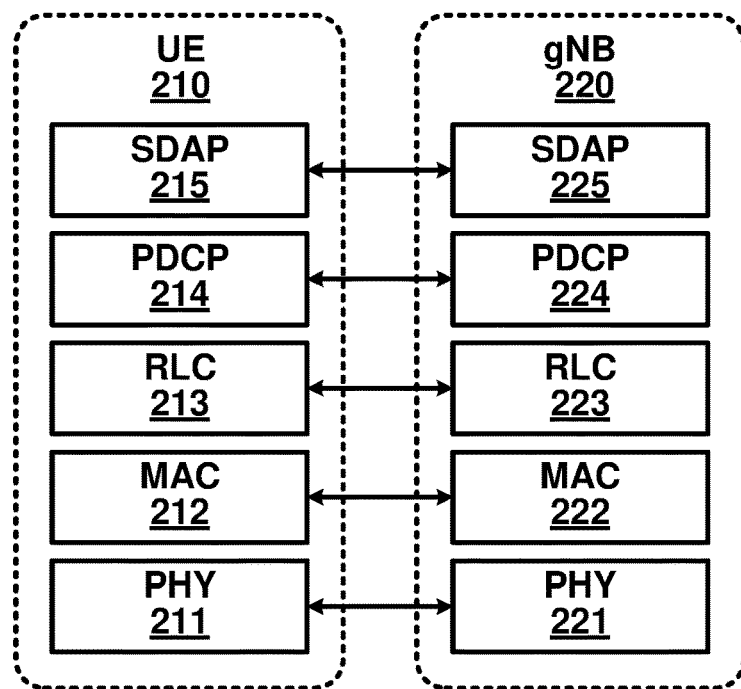
FIG. 2A and FIG. 2B respectively illustrate a New Radio (NR) user plane and control plane protocol stack.
Figure 2B:
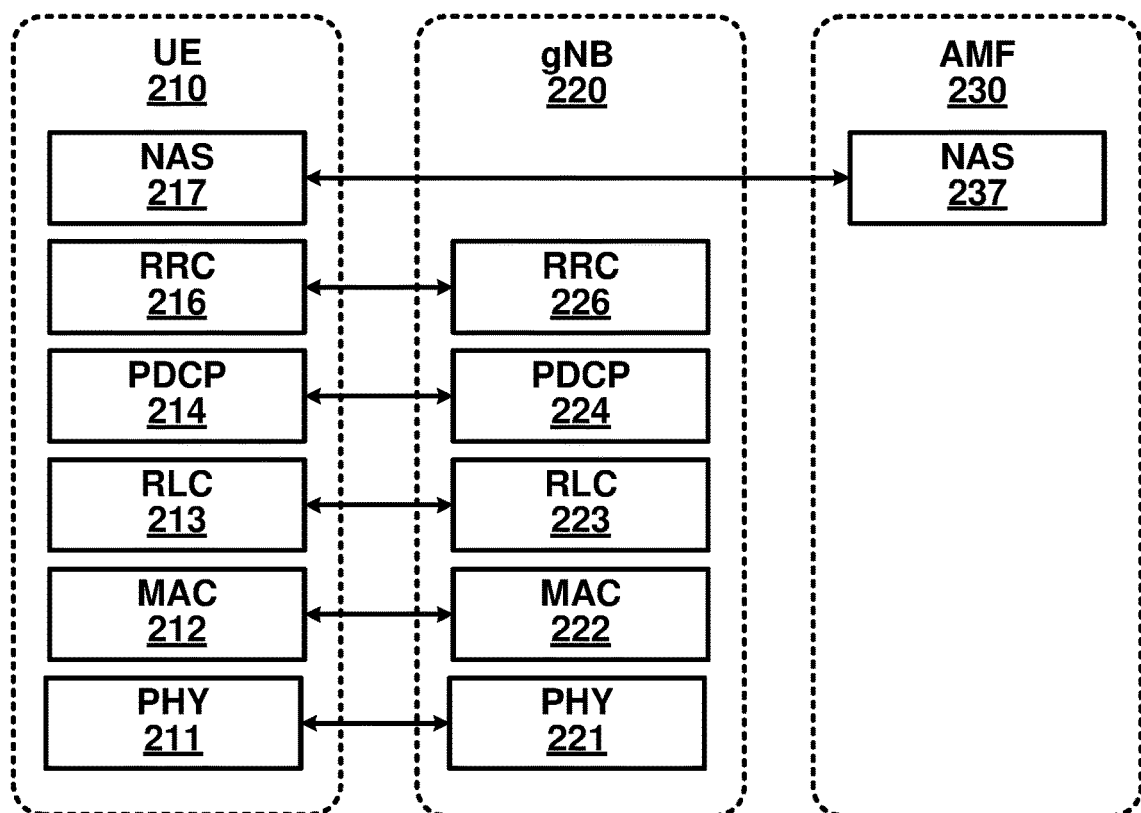

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
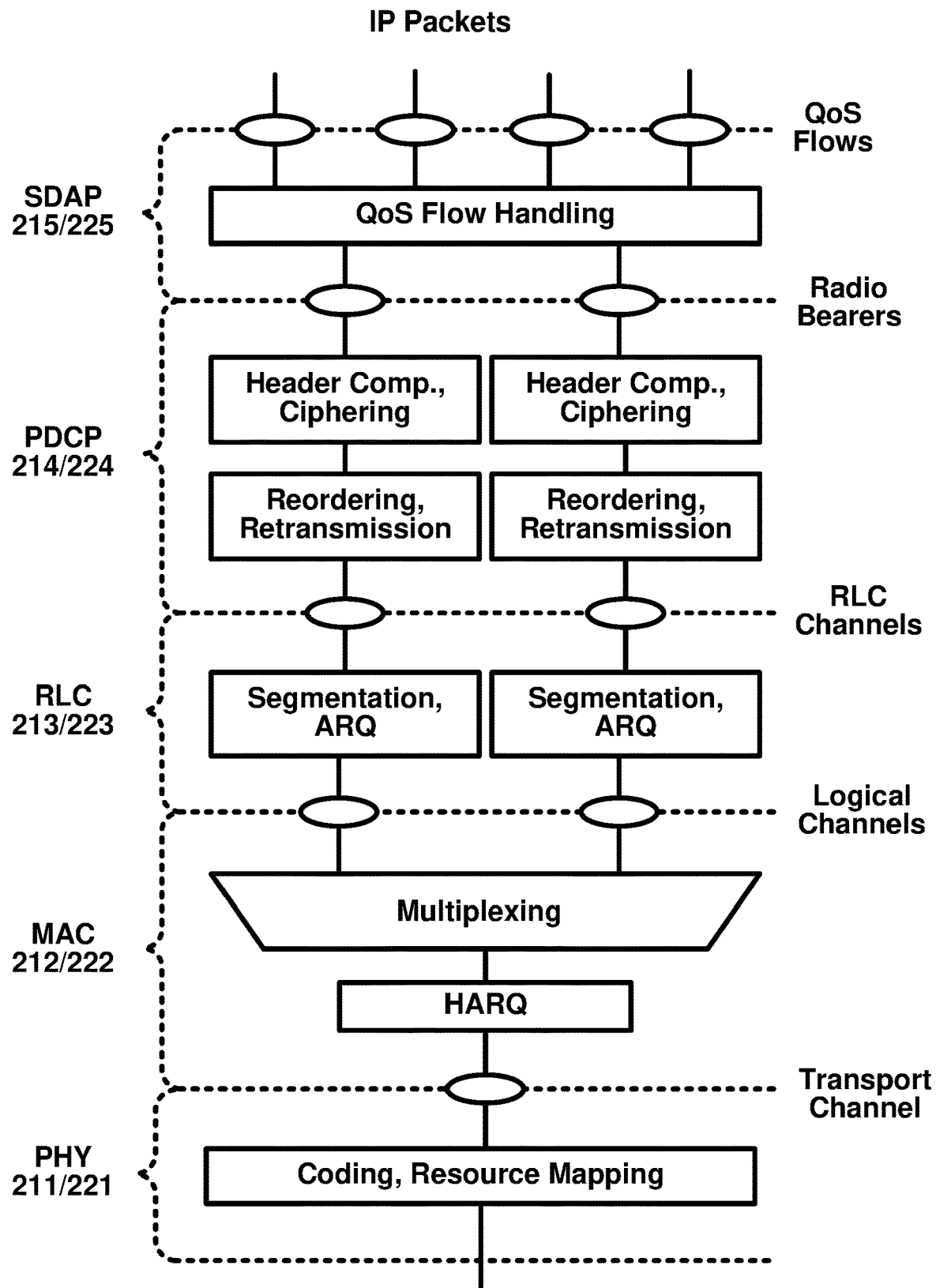
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
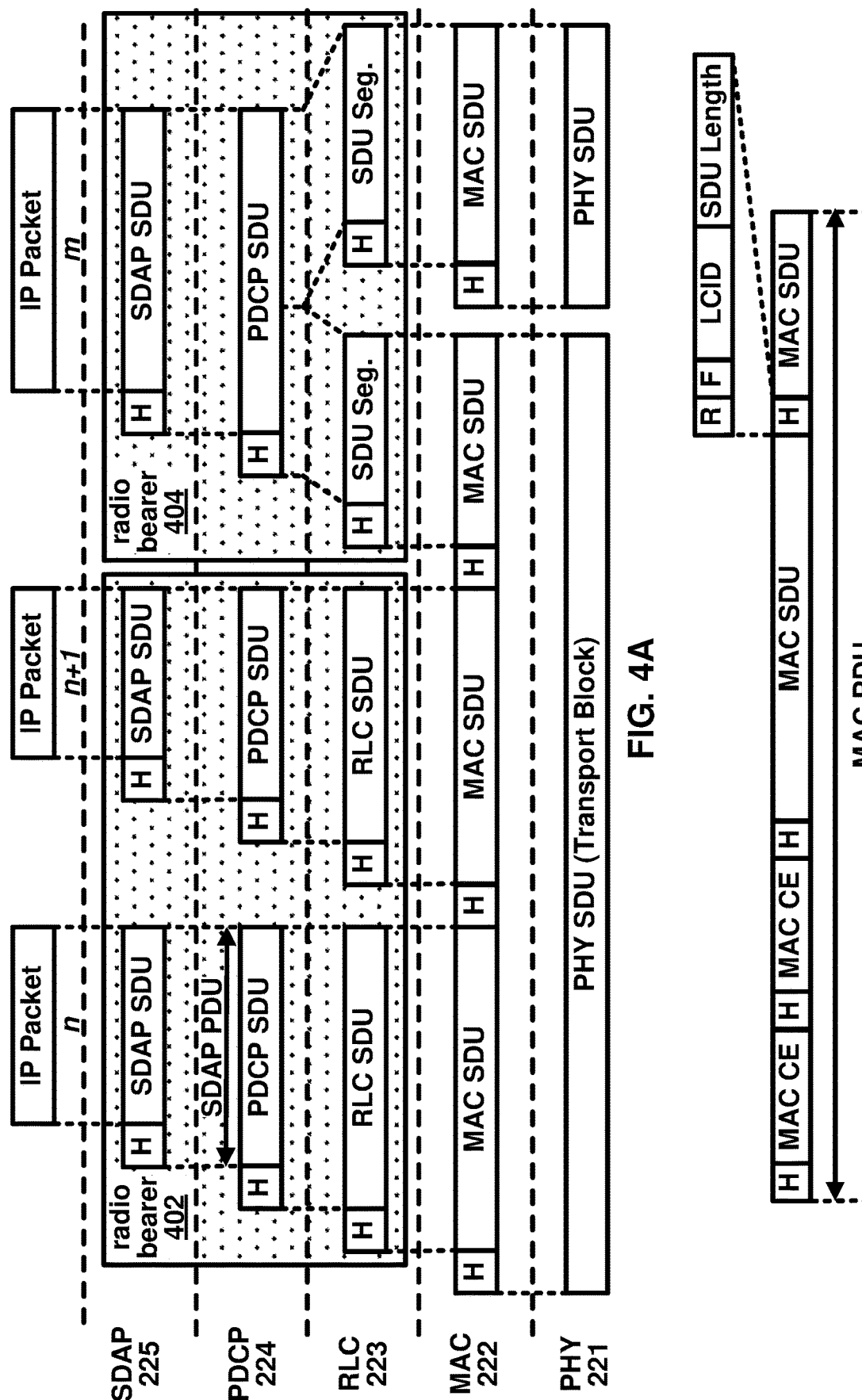
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
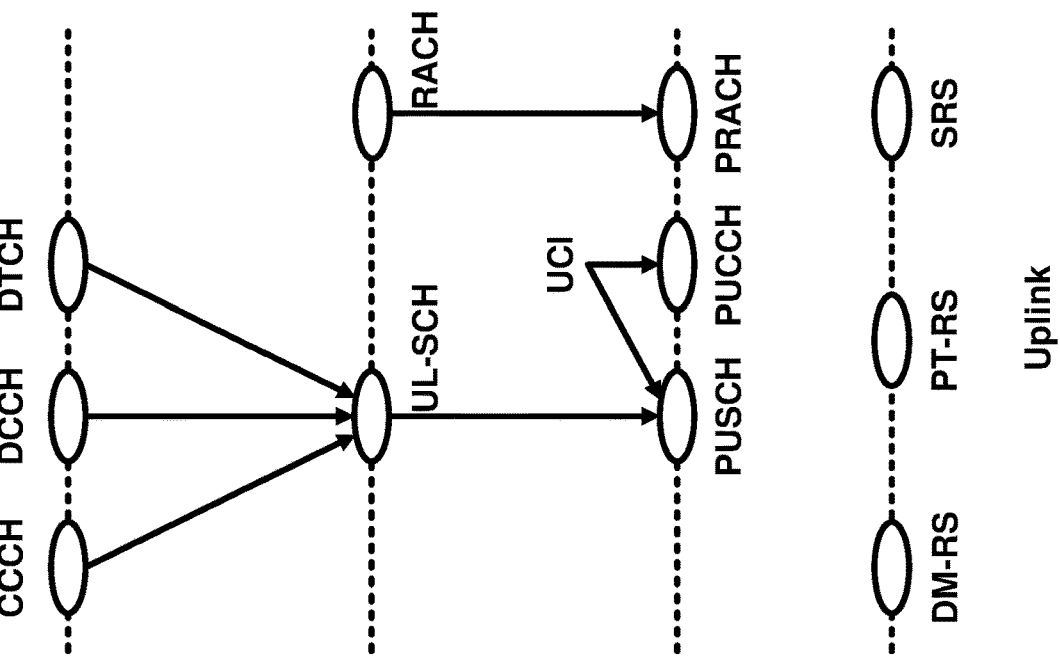
FIG. 5A and FIG. 5B respectively illustrate a mapping between logical channels, transport channels, and physical channels for the downlink and uplink.
Figure 5A:
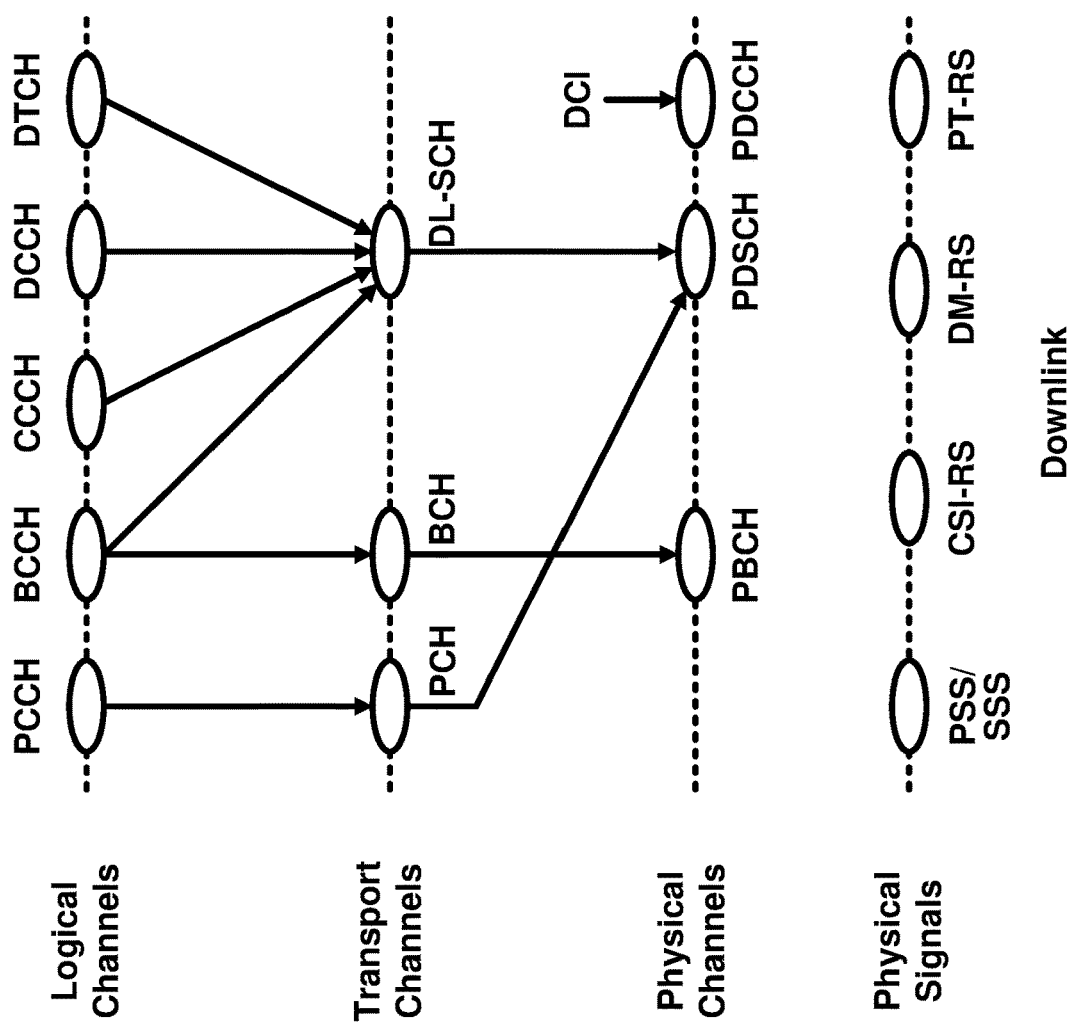

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
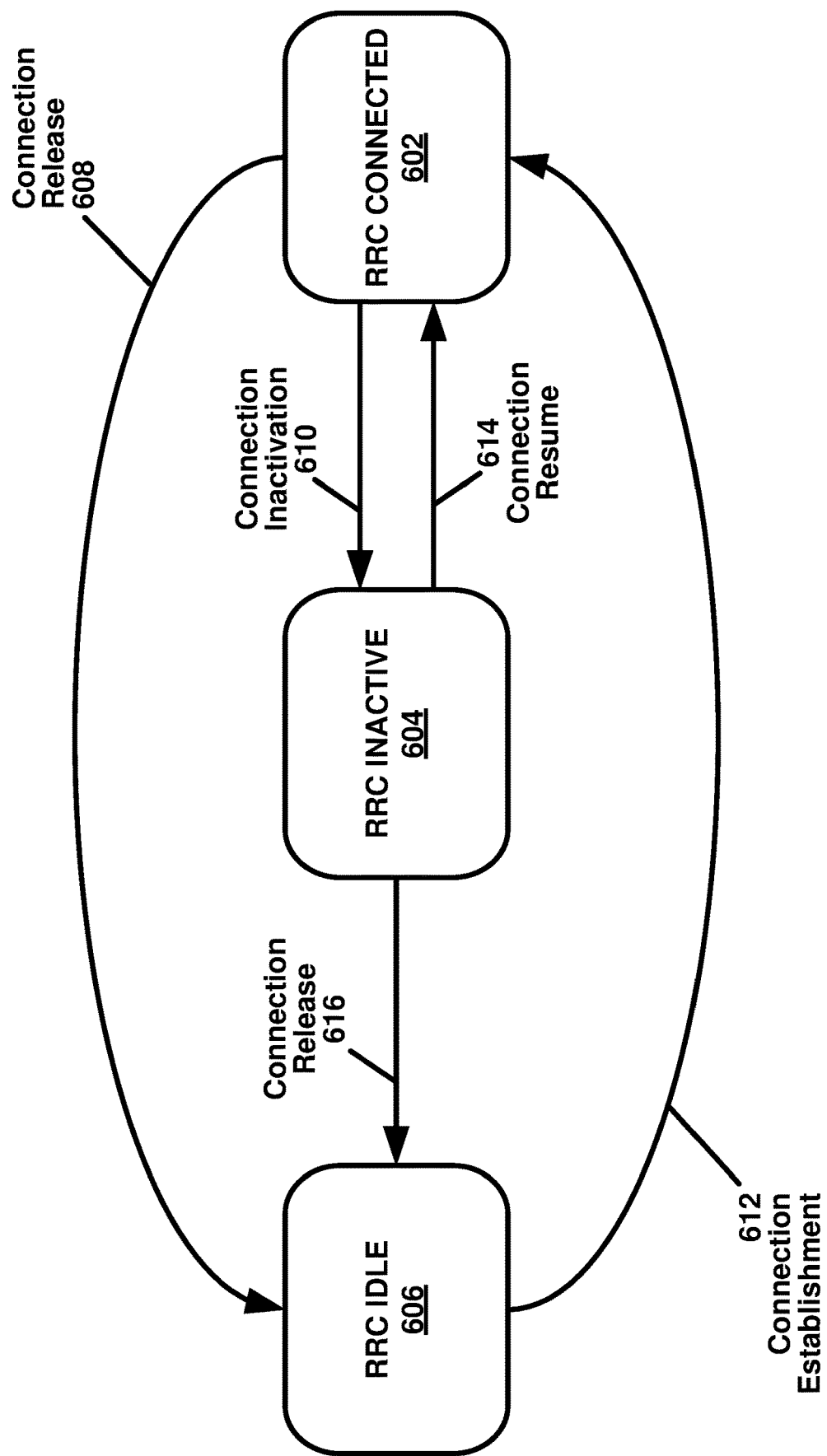
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
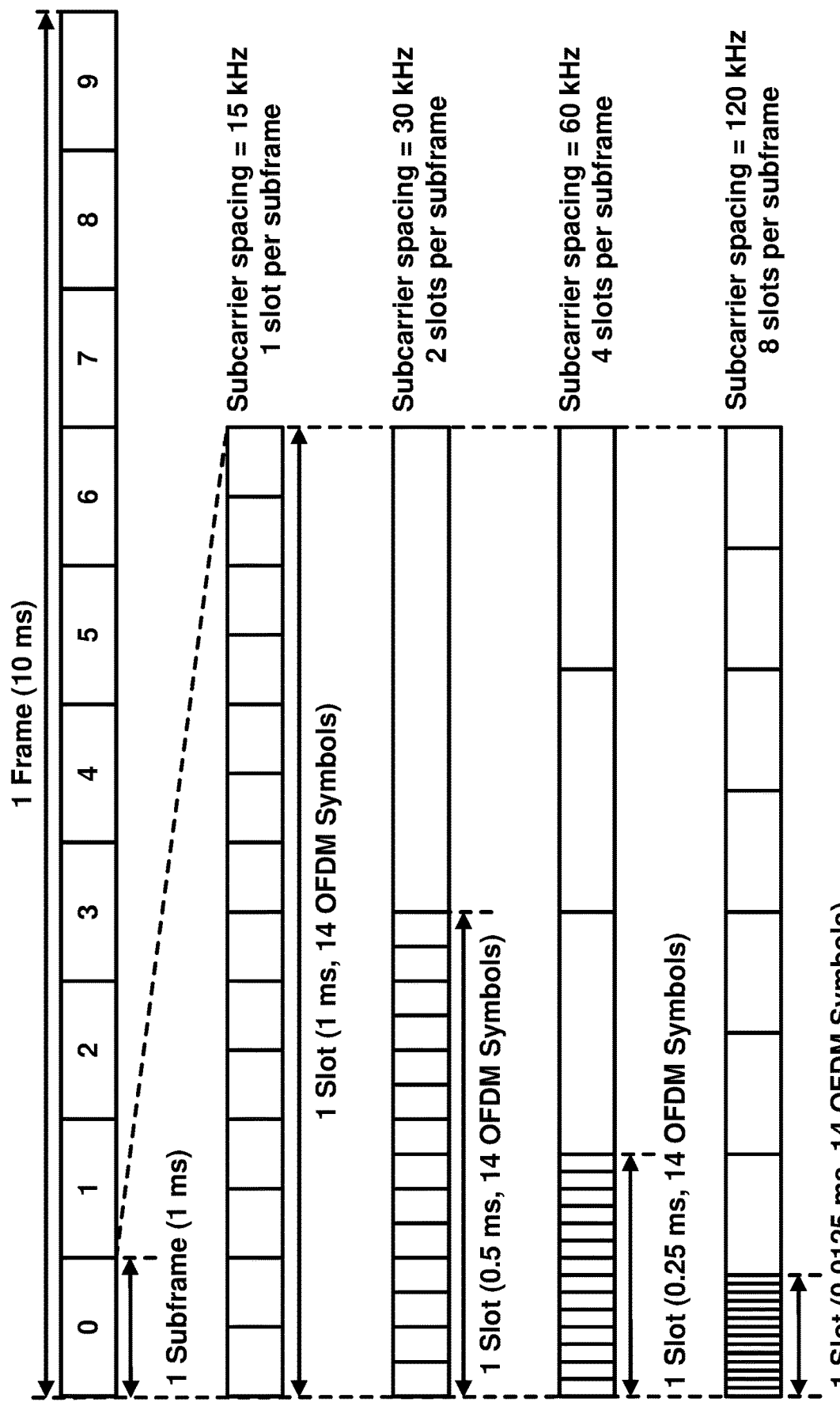
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
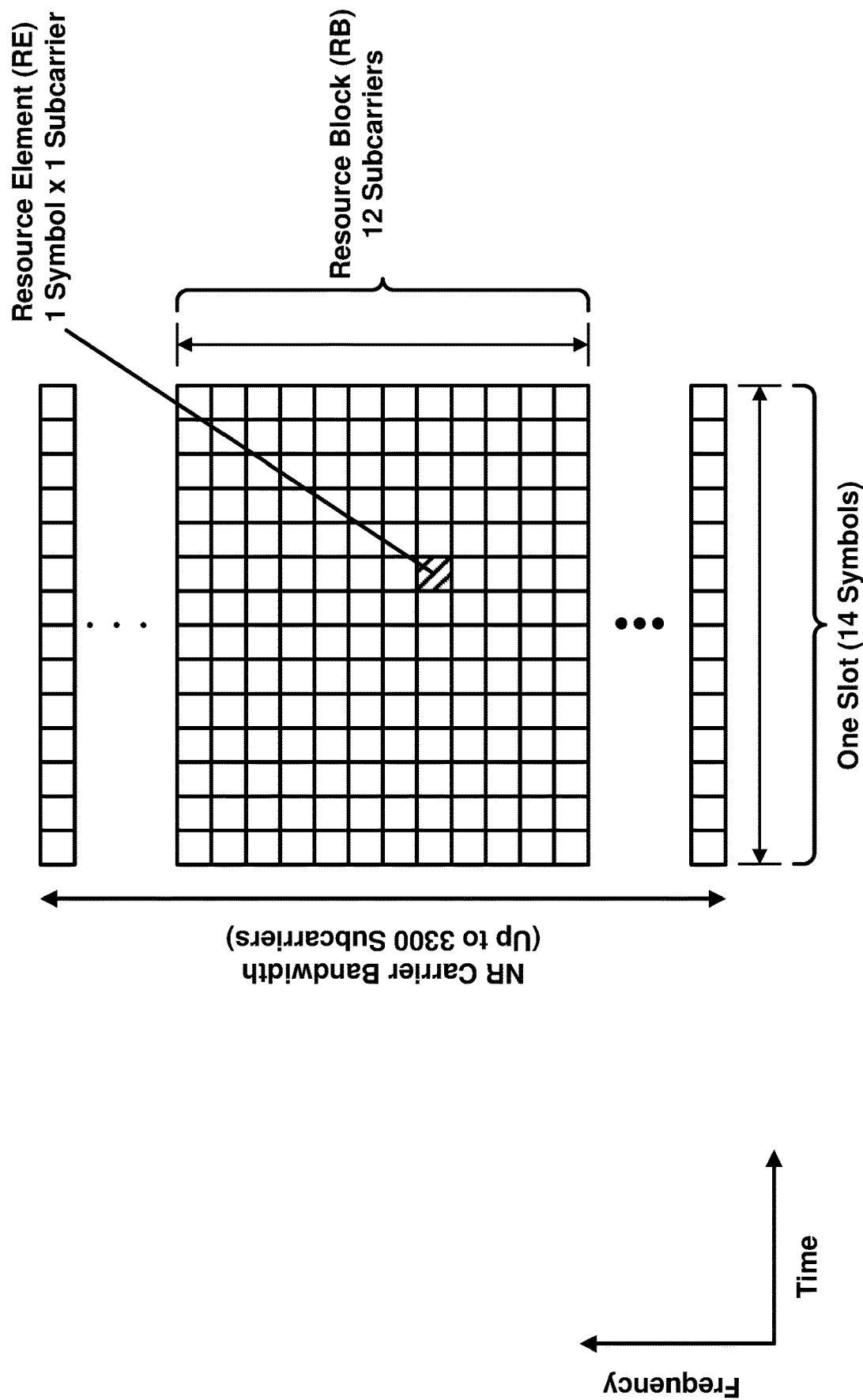
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
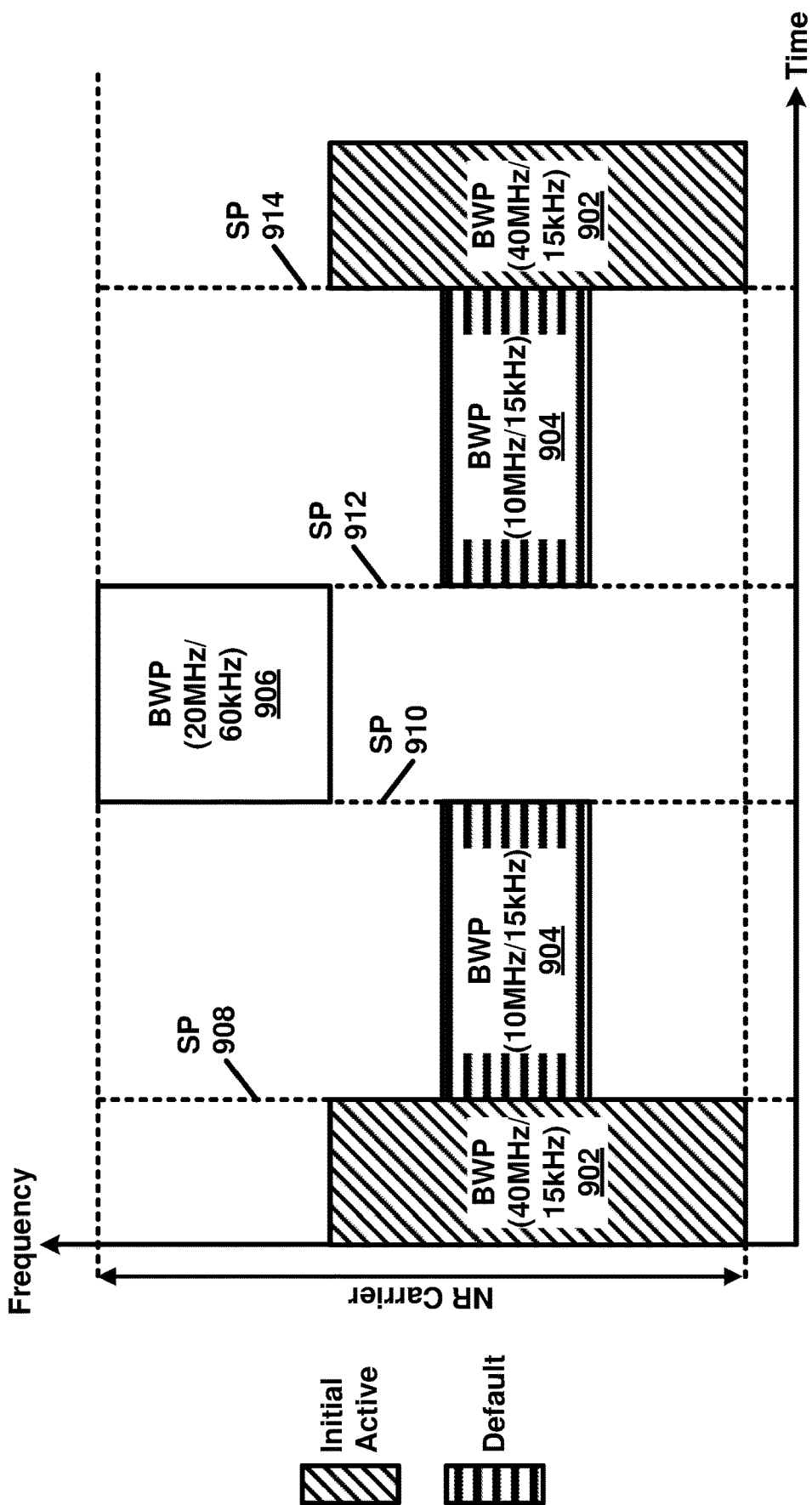
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
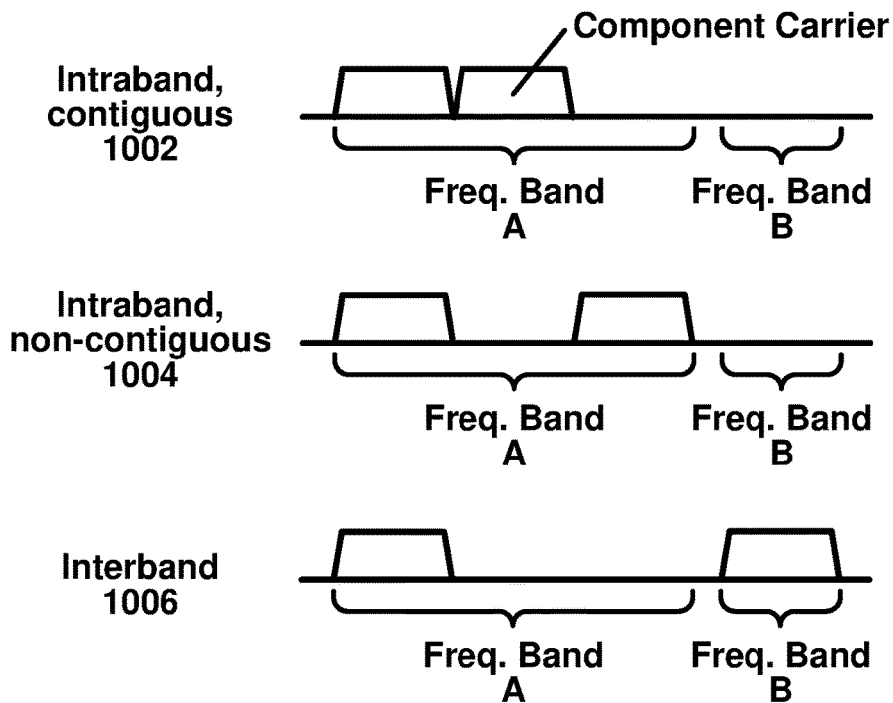
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
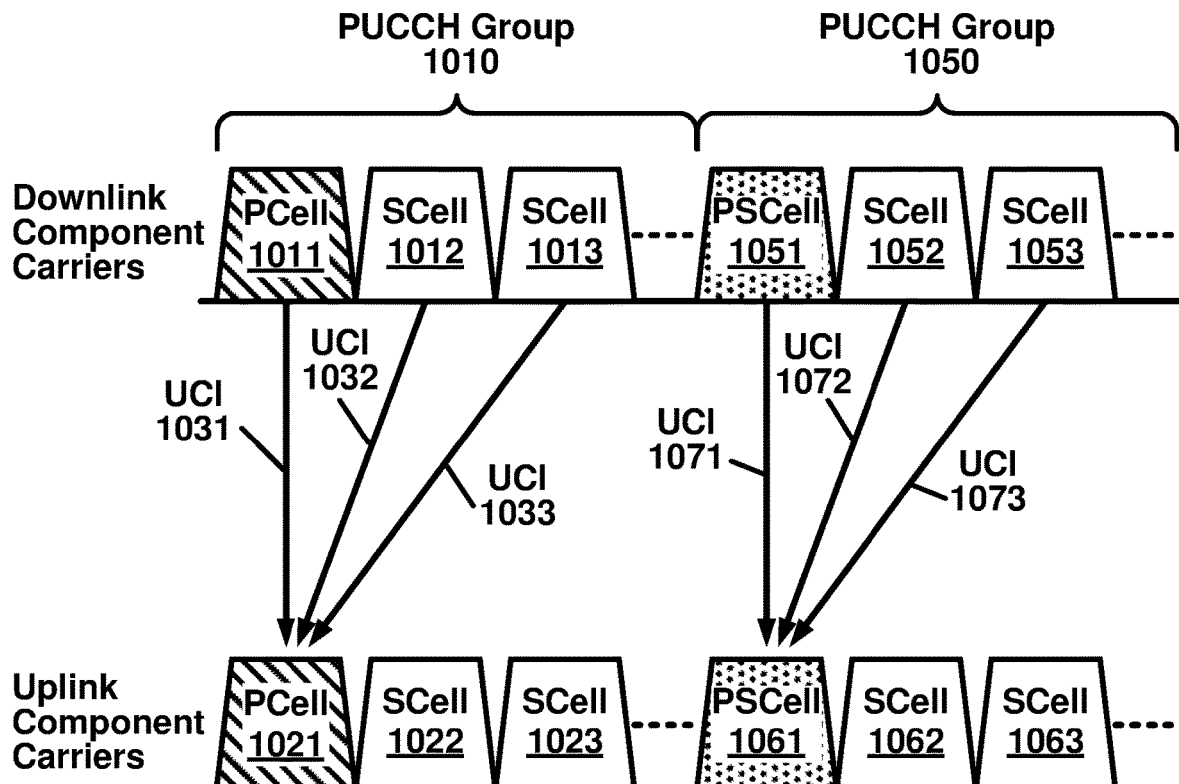
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
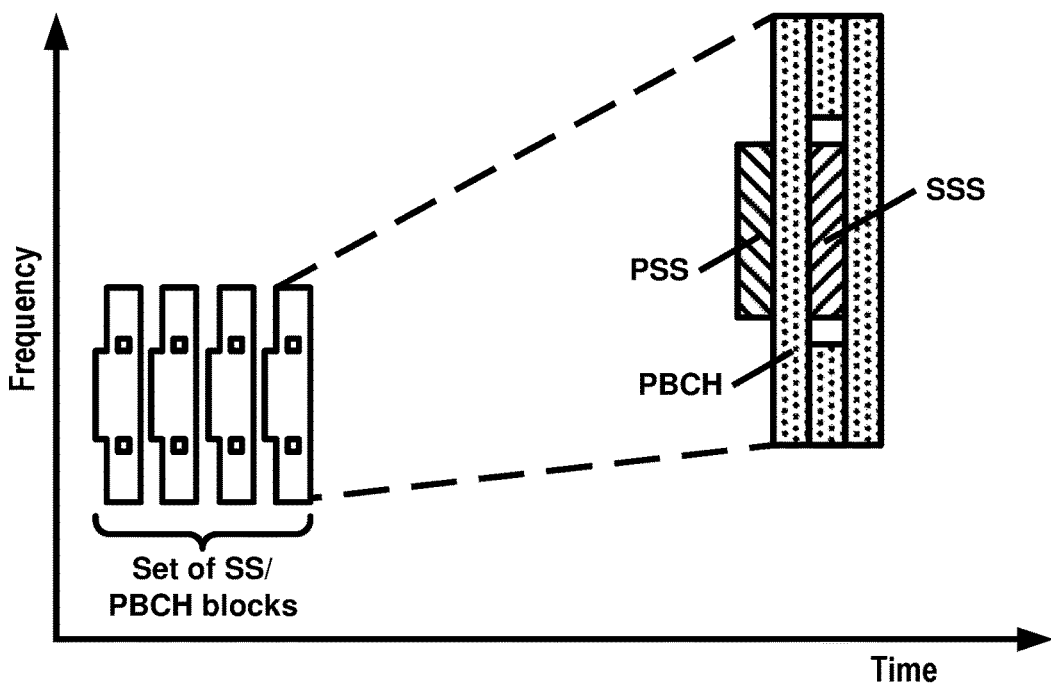
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
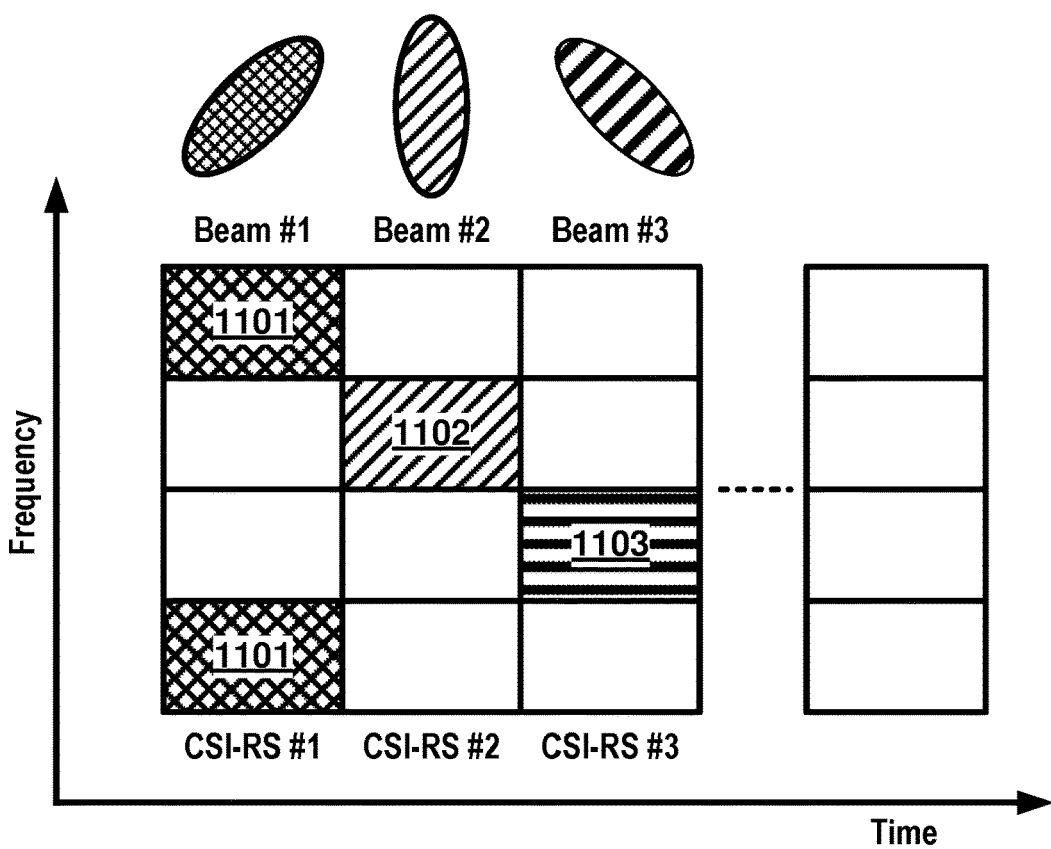
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
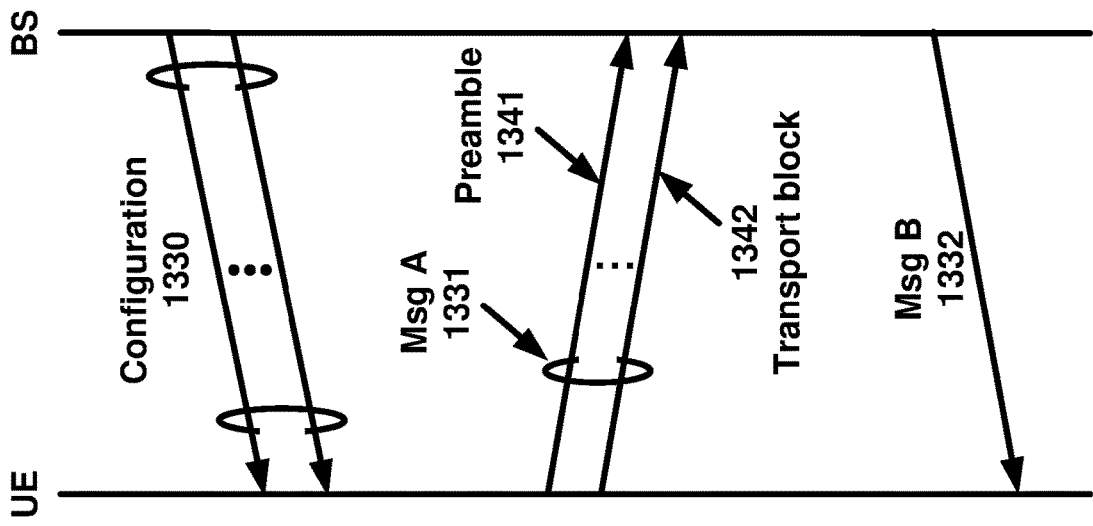
FIG. 13A, FIG. 13B, and FIG. 13C respectively illustrate a four-step contention-based random access procedure, a two-step contention-free random access procedure, and another two-step random access procedure.
Figure 13B:
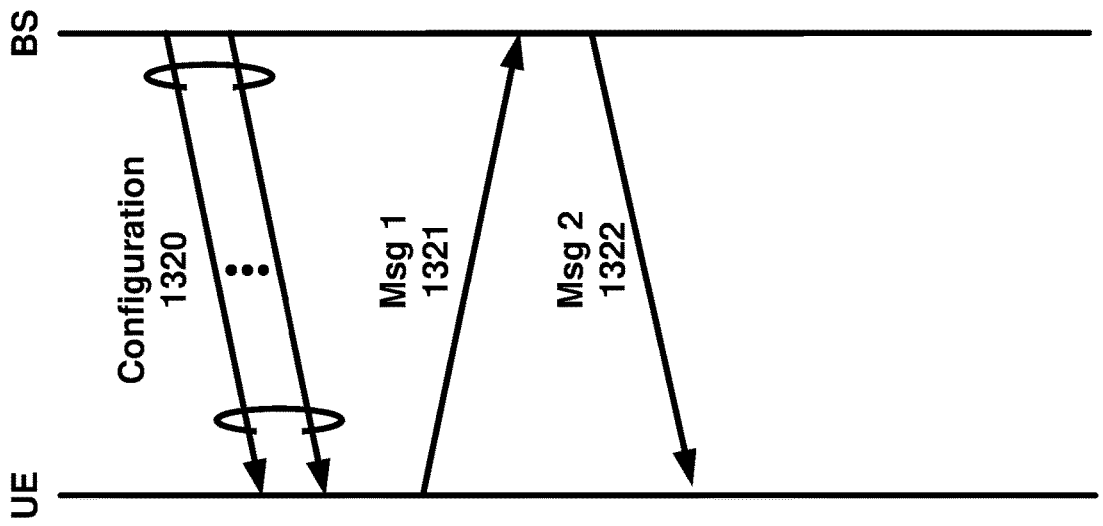
Figure 13A:
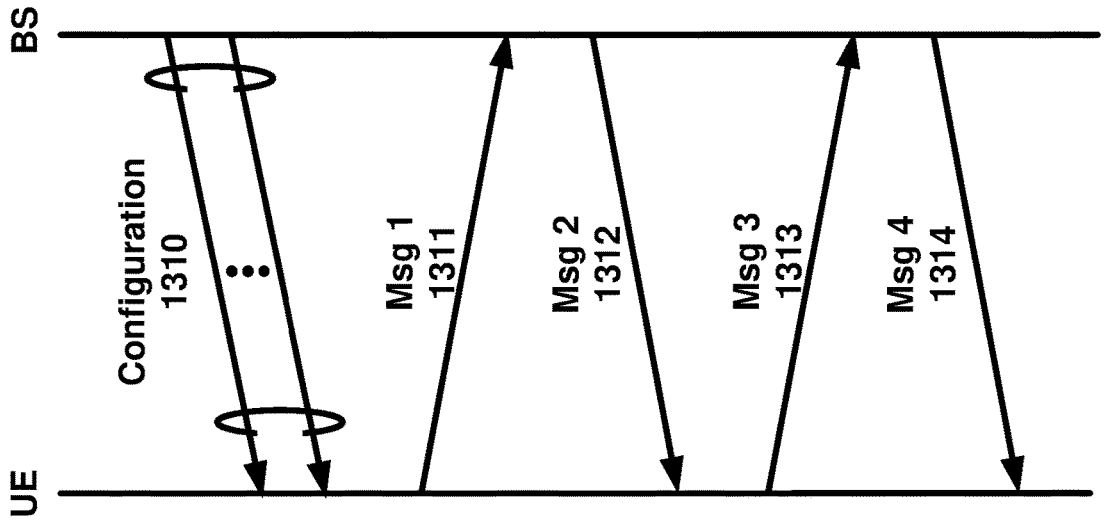

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg1 1311, a Msg2 1312, a Msg3 1313, and a Msg4 1314. The Msg1 1311 may include and/or be referred to as a preamble (or a random access preamble). The Msg2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg1 1311 and/or the Msg3 1313. Based on the one or more RACH parameters, the UE may determine a reception timing and a downlink channel for receiving the Msg2 1312 and the Msg4 1314.

The one or more RACH parameters provided in the configuration message 1310 may indicate one or more Physical RACH (PRACH) occasions available for transmission of the Msg1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg1 1311 and/or Msg3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg1 1311 and the Msg3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg1 1311 based on the association. The Msg1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg2 1312 received by the UE may include an RAR. In some scenarios, the Msg2 1312 may include multiple RARs corresponding to multiple UEs. The Msg2 1312 may be received after or in response to the transmitting of the Msg1 1311. The Msg2 1312 may be scheduled on the DL-SCH and indicated on a PDCCH using a random access RNTI (RA-RNTI). The Msg2 1312 may indicate that the Msg1 1311 was received by the base station. The Msg2 1312 may include a time-alignment command that may be used by the UE to adjust the UE's transmission timing, a scheduling grant for transmission of the Msg3 1313, and/or a Temporary Cell RNTI (TC-RNTI). After transmitting a preamble, the UE may start a time window (e.g., ra-ResponseWindow) to monitor a PDCCH for the Msg2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI} = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg3 1313 in response to a successful reception of the Msg2 1312 (e.g., using resources identified in the Msg2 1312). The Msg3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg3 1313 and the Msg4 1314) may be used to increase the likelihood that the UE does not incorrectly use an identity of another the UE. To perform contention resolution, the UE may include a device identifier in the Msg3 1313 (e.g., a C-RNTI if assigned, a TC-RNTI included in the Msg2 1312, and/or any other suitable identifier).

The Msg4 1314 may be received after or in response to the transmitting of the Msg3 1313. If a C-RNTI was included in the Msg3 1313, the base station will address the UE on the PDCCH using the C-RNTI. If the UE's unique C-RNTI is detected on the PDCCH, the random access procedure is determined to be successfully completed. If a TC-RNTI is included in the Msg3 1313 (e.g., if the UE is in an RRC_IDLE state or not otherwise connected to the base station), Msg4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg1 1311 and/or the Msg 31313) may remain on the selected carrier. The UE may switch an uplink carrier during the random access procedure (e.g., between the Msg1 1311 and the Msg3 1313) in one or more cases. For example, the UE may determine and/or switch an uplink carrier for the Msg1 1311 and/or the Msg3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg1 1321 and a Msg2 1322. The Msg1 1321 and the Msg2 1322 may be analogous in some respects to the Msg1 1311 and a Msg2 1312 illustrated in FIG. 13A, respectively. As will be understood from FIGS. 13A and 13B, the contention-free random access procedure may not include messages analogous to the Msg3 1313 and/or the Msg4 1314.

The contention-free random access procedure illustrated in FIG. 13B may be initiated for a beam failure recovery, other SI request, SCell addition, and/or handover. For example, a base station may indicate or assign to the UE the preamble to be used for the Msg1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg1 1321 and reception of a corresponding Msg2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg2 1312 (e.g., an RAR) illustrated in FIGS. 13A and 13B and/or the Msg4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg3 analogous to the Msg3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
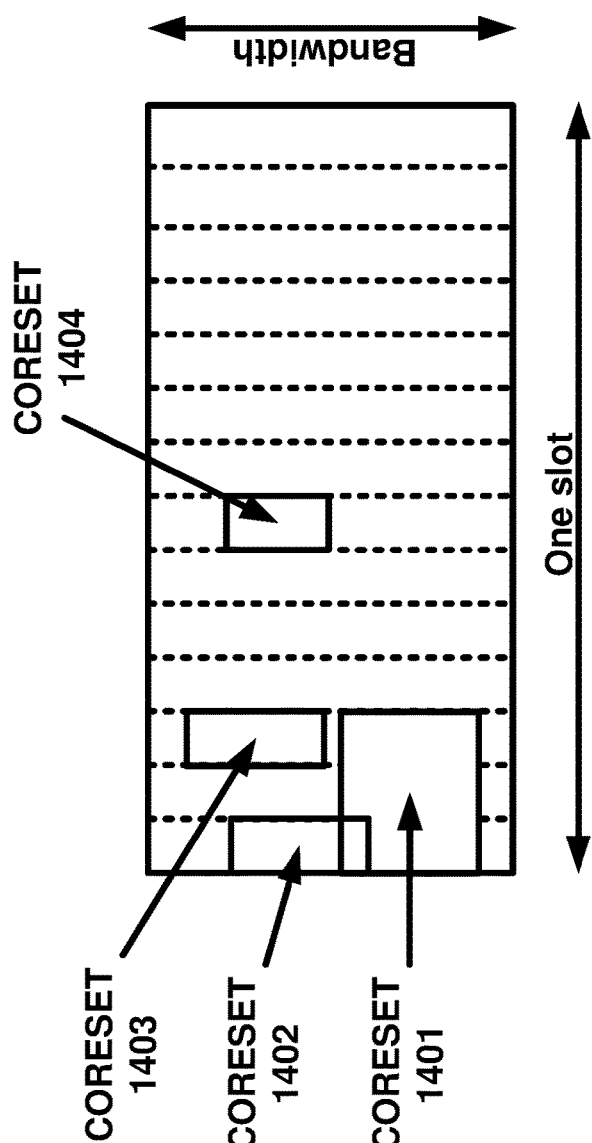
FIG. 14A illustrates an example of CORESET configurations fora bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
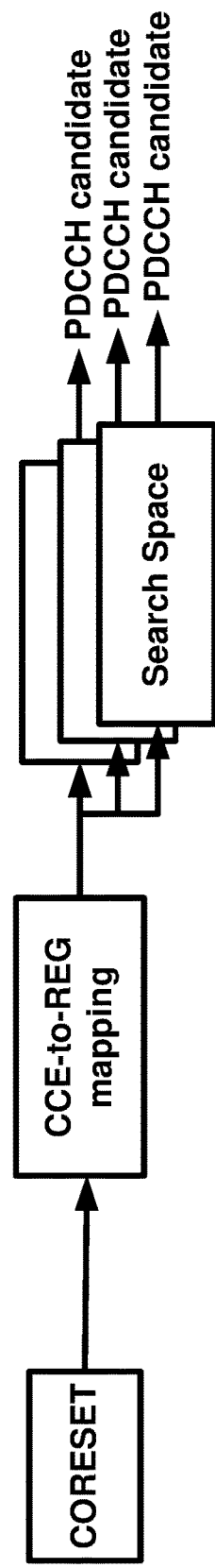
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUCCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
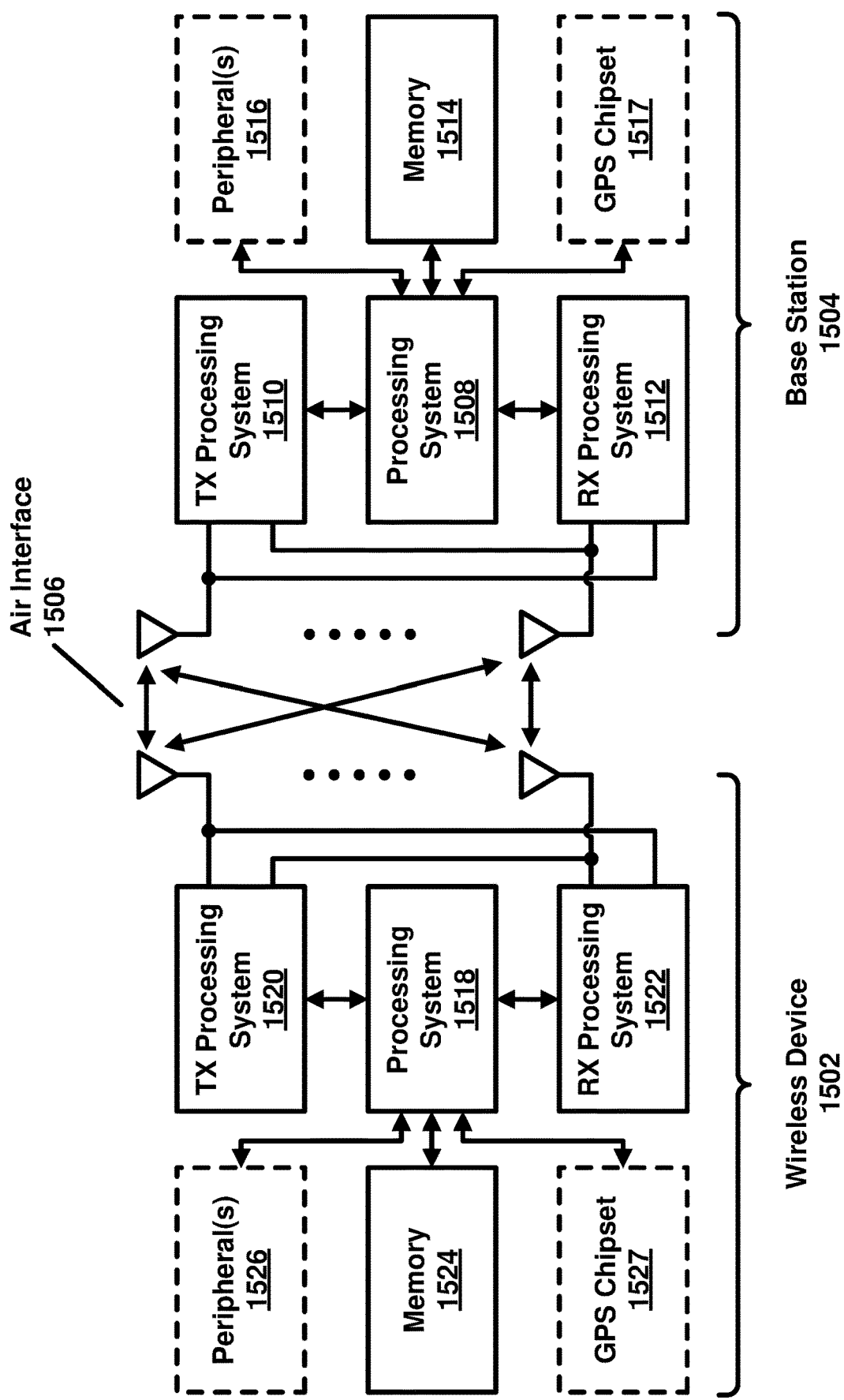
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit. In an example, a MAC SDU may be included in a MAC PDU from the first bit onward. A MAC control element (CE) may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

In an example, a MAC entity of a base station may transmit one or more MAC CEs to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, a secondary cell (SCell) activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE. For example, semi-persistent reporting on PUCCH, the PUCCH resource used for transmitting a CSI report may be configured by reportConfigType. Semi-persistent reporting on PUCCH may be activated by a MAC CE activation command for selecting one of the semi-persistent Reporting Settings for use by the wireless device on the PUCCH.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more SCells. When configured with CA, a wireless device may have one RRC connection with a network. In an example, a base station may transmit, to a wireless device, one or more messages comprising configuration parameters of a plurality of one or more SCells, depending on capabilities of the wireless device. When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant." A wireless device may activate/deactivate an SCell in response to receiving an SCell Activation/Deactivation MAC CE.

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. In paired spectrum (e.g., FDD), a base station and/or a wireless device may independently switch a DL BWP and an UL BWP. In unpaired spectrum (e.g., TDD), a base station and/or a wireless device may simultaneously switch a DL BWP and an UL BWP.

In an example, a base station and/or a wireless device may switch a BWP between configured BWPs by means of a DCI or a BWP invalidity timer. When the BWP invalidity timer is configured for a serving cell, the base station and/or the wireless device may switch an active BWP to a default BWP in response to an expiry of the BWP invalidity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH. In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any. In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, a set of PDCCH candidates for a wireless device to monitor is defined in terms of PDCCH search space sets. A search space set comprises a common search space (CSS) set or a user search space (USS) set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with search Space Type=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding.

FIG. 17 shows several examples of DCI formats. In an example, several DCI formats may be used by a base station to transmit control information to a wireless device or used by the wireless device for PDCCH monitoring. Different DCI formats may comprise different DCI fields and/or have different DCI payload sizes. Different DCI formats may have different signaling purposes. In an example, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc. If in an active DL BWP a wireless device monitors PDCCH either for detection of DCI format 0_1 and DCI format 1_1 or for detection of DCI format 0_2 and DCI format 1_2, a priority index can be provided by a priority indicator field. In an example, if a wireless device indicates a capability to monitor, in an active UL BWP, PDCCH for detection of DCI format 0_1 and DCI format 1_1 and for detection of DCI format 0_2 and DCI format 1_2, a DCI format 0_1 or a DCI format 0_2 may schedule a PUSCH transmission of any priority, a DCI format 1_1 or a DCI format 1_2 may schedule a PDSCH reception. According to an example, the DCI format 1_1 or the DCI format 1_2 may trigger a PUCCH transmission with corresponding HARQ-ACK information of any priority. In an example, the DCI format 1_1 may trigger a PUCCH transmission with corresponding HARQ-ACK information of any priority.

In an example, a wireless device may assume that flexible symbols in a CORESET configured to the wireless device for PDCCH monitoring are downlink symbols if the wireless device does not detect an SFI-index field value in a DCI (e.g., DCI format 2_0) indicating one or more symbols of a slot as flexible or uplink and the wireless device does not detect a DCI (e.g., DCI format 0_0, DCI format 0_1, DCI format 1_0, DCI format 1_1, or DCI format 2_3) indicating to the wireless device to transmit SRS, PUSCH, PUCCH, or PRACH in the one or more symbols.

In an example, upon receiving a downlink transmission scheduled via a DCI, the wireless device may attempt to decode a transport block (TB) the downlink scheduling transmission is carrying, e.g., after soft combining with previous attempts/receptions of the TB. New downlink transmission and one or more downlink retransmissions may be scheduled in a same framework. The wireless device may determine whether a downlink transmission is a new transmission, or a retransmission based on a new data indicator (NDI) field in a DCI indicating the downlink transmission. In an example, a time gap/interval/offset (e.g., $K_1$) from a downlink data reception (e.g., DL-SCH resource) to a transmission of a HARQ ACK/NACK corresponding to the downlink data may be fixed, e.g., multiple subframes/slots/symbols. This scheme with pre-defined timing instants for the HARQ ACK/NACK may not blend well with dynamic TDD and/or unlicensed operation. A more flexible scheme, capable of dynamically controlling the HARQ ACK/NACK transmission timing may be adopted. For example, a DCI format may comprise a PDSCH-to-HARQ_feedback timing field to control/indicate a transmission timing of an HARQ ACK/NACK corresponding to a data scheduled by the DCI in an uplink transmission (e.g., PUCCH). The PDSCH-to-HARQ_feedback timing field in the DCI may be used as an index of one or more indexes of $K_1$ values in a pre-defined and/or an RRC-configured table (e.g., a HARQ timing table). In an example, the $K_1$ value may provide information of a gap/interval/offset between a second time to transmit the HARQ ACK/NACK relative to a first time of the downlink data reception. The wireless device may determine a resource for HARQ ACK/NACK transmission, e.g., frequency resource and/or PUCCH format and/or code domain, based on a location of a PDCCH (e.g., a starting control channel element (CCE) index) carrying the DCI format. The DCI format may comprise a field, e.g., PUCCH resource indicator (PRI) field, that indicates a frequency resource for an uplink transmission of the HARQ ACK/NACK transmission. For example, the PRI field may be an index selecting one of a plurality of pre-defined and/or RRC-configured PUCCH resource sets.

A wireless device may be scheduled to transmit a TB and no CSI report, or the UE may be scheduled to transmit a TB and one or more CSI reports on PUSCH by a DCI. The 'Time domain resource assignment' field value m of the DCI may provide a row index m+1 to an allocated table. The indexed row may define the slot offset $K_2$, the start and length indicator SLIV, or directly the start symbol S and the allocation length L, the PUSCH mapping type, and the number of repetitions (if numberOfRepetitions is present in the resource allocation table) to be applied in the PUSCH transmission. In an example, the wireless device may be scheduled to transmit a PUSCH with no TB and with one or more CSI reports by a 'CS/request' field on a DCI, the 'Time domain resource assignment' field value m of the DCI provides a row index m+1 to the allocated table. The indexed row defines the start and length indicator SLIV, or directly the start symbol S and the allocation length L, and the PUSCH mapping type to be applied in the PUSCH transmission and the $K_2$ value may be determined, by the wireless device, based on one or more higher layer parameters. In an example, if pusch-TimeDomainAllocationListForMultiPUSCH in pusch-Config contains row indicating resource allocation for two to eight contiguous PUSCHs, $K_2$ may indicate the slot where the wireless device may transmit a first PUSCH of a multiple PUSCHs. Each PUSCH may have a separate SLIV and mapping type. The number of scheduled PUSCHs may be signaled by the number of indicated valid SLIVs in the row of the pusch-TimeDomainAllocationListForMultiPUSCH signaled in DCI format 0_1.

A wireless device may be configured with minimum-SchedulingOffsetK2 in an active UL BWP. The minimum-SchedulingOffsetK2 in an active UL BWP may be applied a minimum scheduling offset restriction indicated by the 'Minimum applicable scheduling offset indicator' field in DCI format 0_1 or DCI format 1_1 if the same field is available. For example, when the wireless device is configured with minimumSchedulingOffsetK2 in an active UL BWP and it has not received 'Minimum applicable scheduling offset indicator' field in DCI format 0_1 or 1_1, the wireless device may apply a minimum scheduling offset restriction indicated based on 'Minimum applicable scheduling offset indicator' value '0'. In an example, when the minimum scheduling offset restriction is applied the wireless device may not expect to be scheduled with a DCI in slot n to transmit a PUSCH scheduled with C-RNTI, CS-RNTI, MCS-C-RNTI or SP-CSI-RNTI with $K_2$ smaller than $$\left\lceil K_{2min} \cdot \frac{2^{\mu'}}{2^{\mu}} \right\rceil,$$

where $K_{2min}$ and µ are the applied minimum scheduling offset restriction and the numerology of the active UL BWP of the scheduled cell when receiving the DCI in slot n, respectively, and if is the numerology of the new active UL BWP in case of active UL BWP change in the scheduled cell and is equal to pi, otherwise. The wireless device may not apply the minimum scheduling offset restriction when PUSCH transmission is scheduled by a RAR UL grant or a fallbackRAR UL grant for RACH procedure, or when PUSCH is scheduled with TC-RNTI.

Semi-persistent scheduling (SPS) may be supported in the downlink, where the wireless device may be configured with a periodicity of the data transmission using RRC signaling. Activation of semi-persistent scheduling may be done using PDCCH, as for dynamic scheduling, for example, with CS-RNTI. The PDCCH may carry necessary information in terms of time-frequency resources and other parameters. A HARQ process number/ID may be derived from a time, for example, when the downlink data transmission starts. Upon activation of semi-persistent scheduling, the wireless device may receive downlink transmission periodically according to an RRC-configured periodicity using the transmission parameters indicated in the PDCCH activating the transmission.

In the uplink, two schemes for transmission without a dynamic grant may be supported. The two schemes may differ in the way they are activated: 1) configured grant type 1 (or Type 1 configured grant), where an uplink grant is provided by RRC, including activation of the grant, 2) configured grant type 2 (or Type 2 configured grant), where the transmission periodicity is provided by RRC and L1/L2 control signaling is used to activate/deactivate the transmission in a similar way as in a downlink case. The two schemes may reduce control signaling overhead, and the latency before uplink data transmission, as no scheduling request-grant cycle is needed prior to data transmission. Configured grant type 2 may be similar to downlink SPS. RRC signaling may be used to configure the periodicity and PDCCH activation may provide transmission parameters. Upon receiving the activation command, the wireless device may transmit according to the preconfigured periodicity, if, for example, there are data in the buffer. If there are no data to transmit, the wireless device may, similarly to type 1, not transmit anything. The wireless device may acknowledge the activation/deactivation of type 2 by sending a MAC control element in the uplink. In both schemes, it is possible to configure multiple wireless devices with overlapping time-frequency resources in the uplink. In this case, the network may differentiate between transmissions from different wireless devices. In an example, PUSCH resource allocation may be semi-statically configured by higher layer parameter con figuredGrantConfig in BWP-UplinkDedicated information element.

In an example, a wireless device may support a baseline processing time/capability. Some wireless devices may support additional aggressive/faster processing time/capability. In an example, the wireless device may report to a base station a processing capability, e.g., per sub-carrier spacing. In an example, a PDSCH processing time may be considered to determine, by a wireless device, a first uplink symbol of a PUCCH (e.g., determined at least based on a HARQ-ACK timing K1 and one or more PUCCH resources to be used and including the effect of the timing advance) comprising the HARQ-ACK information of the PDSCH scheduled by a DCI. In an example, the first uplink symbol of the PUCCH may not start earlier than a time gap (e.g., $T_{proc,1}$) after a last symbol of the PDSCH reception associated with the HARQ-ACK information. In an example, the first uplink symbol of the PUCCH which carries the HARQ-ACK information may start no earlier than at symbol L1, where L1 is defined as the next uplink symbol with its Cyclic Prefix (CP) starting after the time gap $T_{proc,1}=(N_1+d_{1,1}+d_2)(2048+144)$. $a_1$ after the end of the last symbol of the PDSCH. In an example, parameter $a_1$ may depend on a numerology p. The time gap may be given by the wireless device PDSCH processing capability in the corresponding frequency band. In an example, $d_{1,1}$ may at least depend on the PDSCH mapping (e.g., a mapping type A or mapping type B) and the length of the PDSCH (in the number of symbols). In an example, the wireless device may set $d_2=0$.

FIG. 18 shows example PDSCH processing times. Table 1 shows PDSCH decoding time (N1) in number of symbols for a first PDSCH processing capability and for different numerologies. Table 2 shows PDSCH decoding time in number of symbols for a second PDSCH processing capability and for different numerologies. As shown in FIG. 18, for PDSCH processing capability 1, PDSCH decoding time $N_1$ is more than 14 OFDM symbols if SCS is higher than 60 kHz ($\mu=2$). Even for PDSCH processing capability 2, PDSCH decoding time $N_1$ is 9 OFDM symbols for 60 kHz SCS. The PDSCH decoding time, $N_1$, for 480 kHz and 960 kHz SCS may be more than 14 OFDM symbols (1 slot). In an example, parameter $N_1$ may be based on p for the wireless device with processing capability 1 and 2 respectively, where $\mu$ may correspond to the one of ($\mu_{PDCCH}$, $\mu_{PDSCH}$, $\mu_{UL}$) For example, the $\mu_{PDCCH}$ corresponds to the subcarrier spacing of the PDCCH scheduling the PDSCH, the $\mu_{PDSCH}$ corresponds to the subcarrier spacing of the scheduled PDSCH, and pa corresponds to the subcarrier spacing of the uplink channel with which a HARQ-ACK is to be transmitted.

In an example, an PUSCH preparation/processing time may be considered for determining the transmission time of an UL data. For example, if the first uplink symbol in the PUSCH allocation for a transport block (including the DM-RS) may not be no earlier than at symbol L2, the wireless device may perform transmitting the PUSCH. In an example, the symbol L2 may be determined, by a wireless device, at least based on a slot offset (e.g., K2), SLIV of the PUSCH allocation indicated by time domain resource assignment of a scheduling DCI. In an example, the symbol L2 may be specified as the next uplink symbol with its CP starting after a time gap with length $T_{proc,2}=\max((N_2+d_{2,1}+d_2)(2048+144)$. $a_1$, $d_{2,2}$) after the end of the reception of the last symbol of the PDCCH carrying the DCI scheduling the PUSCH. If the first symbol of the PUSCH allocation consists of DM-RS only, the wireless device may set 41=0, otherwise 41=1. In an example, parameter $a_1$ may depend on a numerology p.

FIG. 19 shows examples of PUSCH preparation/processing time. Table 3 in FIG. 19 shows example PUSCH preparation/processing time in number of slots ($N_2$) for a wireless device with PUSCH timing capability 1. Table 4 in FIG. 19 shows example PUSCH preparation/processing time in number of slots ($N_2$) fora wireless device with PUSCH timing capability 2. As FIG. 19 shows $N_2$ may depend on the numerology p. In an example, the numerology p may correspond to the subcarrier spacing of the downlink with which a PDCCH carrying a DCI scheduling a PUSCH is transmitted. In another example, the numerology p may correspond to the subcarrier spacing of the uplink channel with which the PUSCH is to be transmitted.

In an example, a wireless device may not decode a PDSCH in a serving cell scheduled by a PDCCH with C-RNTI, CS-RNTI or MCS-C-RNTI and one or multiple PDSCH(s) required to be received (e.g., via CA) in the same serving cell without a corresponding PDCCH transmission if the PDSCHs partially or fully overlap in time. The wireless device may decode the PDSCH if the PDCCH scheduling the PDSCH ends at least 14 symbols before the earliest starting symbol of the PDSCH(s) without the corresponding PDCCH transmission. The symbol duration may be determined based on the smallest numerology between the scheduling PDCCH and the PDSCH. According to an example, the wireless device may not decode a PDSCH scheduled with C-RNTI, MCS-C-RNTI, or CS-RNTI if another PDSCH in the same cell scheduled with RA-RNTI or MSGB-RNTI partially or fully overlap in time. In an example, the wireless device may, upon detection of a PDCCH with a configured DCI format 0_0, 0_1 or 0_2, may transmit the corresponding PUSCH as indicated by that DCI unless the wireless device does not generate a transport block.

A wireless device may be configured with one or more SRS resource configuration(s) indicating configuration of SRS resource sets. In an example, the higher layer parameter resourceType in SRS-Resource or SRS-PosResource is set to 'aperiodic' (for an aperiodic SRS transmission). The wireless device may receive a downlink DCI, a group common DCI, or an uplink DCI based command where a codepoint of the DCI may trigger one or more SRS resource sets. For SRS in a resource set with usage set to 'codebook' or 'antennaSwitching', the minimal time interval between the last symbol of a PDCCH triggering the aperiodic SRS transmission and the first symbol of SRS resource may be determined at least based on $N_2$ symbols and/or an additional time duration for BWP switching. Otherwise, the minimal time interval between the last symbol of the PDCCH triggering the aperiodic SRS transmission and the first symbol of SRS resource is $N_2+14$ symbols and/or an additional time duration for BWP switching. If the wireless device receives the DCI triggering aperiodic SRS in slot n and when SRS is configured with the higher layer parameter SRS-PosResource, the wireless device may transmit every aperiodic SRS resource in each of the triggered SRS resource set(s) in slot m. In an example, the slot m may be determined, by the wireless device, at least based on a higher layer parameter slotOffset for each aperiodic SRS resource in each triggered SRS resources set, the subcarrier spacing of the triggered SRS transmission, the subcarrier spacing configurations for triggered SRS, and the subcarrier spacing of the PDCCH carrying the triggering command.

Upon (or in response to) reception of a timing advance command (TAC MAC CE) for a TA group (TAG), the wireless device may adjust uplink timing for PUSCH/SRS/PUCCH transmission on all the serving cells in the TAG. For example, the TAC MAC CE for a TAG may indicate the change of the uplink timing relative to the current uplink timing for the TAG. In an example, the wireless device may receive a Msg2 1312 (or a MsgB 1332) comprising a TA command filed or an absolute TA command field. In response to receiving the TA command (or the absolute TAC MAC CE), the wireless device may initiate a TA value by an initial value based on the TA command. After initial access, a TAC MAC CE for a TAG may indicate adjustment of the TA value (e.g., a current TA value). For example, adjustment of the current TA value by a positive amount (received via TAC MAC CE) may indicate advancing the uplink transmission timing for the TAG by a corresponding amount. For example, adjustment of the current TA value by a negative amount (received via TAC MAC CE) may indicate delaying the uplink transmission timing for the TAG by a corresponding amount.

The base station may configure (e.g., via RRC) timeAlignmentTimer (per TAG) for the maintenance of UL time alignment. For example, timeAlignmentTimer may control how long the MAC entity considers the Serving Cells belonging to the associated TAG to be uplink time aligned.

The wireless device, upon or in response to receiving a TAC MAC CE, may apply the Timing Advance Command for the indicated TAG and start or restart the timeAlignmentTimer associated with the indicated TAG. For example, when a Timing Advance Command is received in a Random Access Response message (e.g., a Msg2 1312) for a Serving Cell belonging to a TAG or in a MsgB 1321 for an SpCell, the wireless device may apply the Timing Advance Command for this TAG and start or restart the timeAlignmentTimer associated with this TAG. In an example, when an Absolute Timing Advance Command is received in response to a MSGA transmission including C-RNTI MAC CE, the wireless device may apply the Timing Advance Command for primary TAG and start or restart the timeAlignmentTimer associated with the primary TAG.

In an example, when a timeAlignmentTimer expires, the wireless device may, based on the timeAlignmentTimer being associated with a primary TAG, take at least one of the following actions: flush all HARQ buffers for all Serving Cells; notify RRC to release PUCCH for all Serving Cells, if configured; notify RRC to release SRS for all Serving Cells, if configured; clear any configured downlink assignments and configured uplink grants; clear any PUSCH resource for semi-persistent CSI reporting; consider all running timeAlignmentTimers as expired; maintain one or more current TA values of all TAGs.

In an example, when a timeAlignmentTimer expires, the wireless device may, based on the timeAlignmentTimer being associated with a secondary TAG, take at least one of the following actions: flush all HARQ buffers; notify RRC to release PUCCH, if configured; notify RRC to release SRS, if configured; clear any configured downlink assignments and configured uplink grants; clear any PUSCH resource for semi-persistent CSI reporting; maintain a current TA value of this TAG.

In an example, the wireless device may not perform any uplink transmission on a Serving Cell except the Random Access Preamble (e.g., Msg1 1311) and MsgA 1331 transmission when a timeAlignmentTimer associated with the TAG to which this Serving Cell belongs is not running. In some aspect, when a timeAlignmentTimer associated with a primary TAG is not running, the wireless device may not perform any uplink transmission on any Serving Cell except the Random Access Preamble (e.g., Msg1 1311) and MsgA 1331 transmission on the SpCell.

One or more timing relationships (e.g., with respect to a TA value) may comprise one or more MAC CE timing relationships and/or one or more UL timing relationships. In an example, the wireless device may determine the one or more timing relationships based on one or more timing relationship rules. The one or more timing relationship rules may indicate UL transmission timing adjustments (e.g., based on the TA value) and/or uplink timing for PUSCH/SRS/PUCCH transmission. In another example, the one or more timing relationship rules may indicate an activation time (or the wireless device assumption in the downlink configuration or in the uplink configuration) of a MAC CE command based on the received time of a PDSCH carrying the MAC CE command in the downlink (e.g., the MAC CE command may become activated X milliseconds after the wireless device transmits a HARQ-ACK corresponding to the PDSCH).

In an example, the one or more timing relationship rules may indicate the transmission timing of one or more UL grants (e.g., PUSCH, aperiodic SRS, and/or reporting SRS over PUSCH) based on detecting a DCI. According to an example, the one or more timing relationship rules may indicate the transmission timing of an UL transmission (e.g., PUSCH, SRS, PUCCH) other than a PUSCH scheduled by a RAR UL grant or a fallbackRAR UL grant or a PUCCH with HARQ-ACK information in response to a successRAR. For example, the wireless device may receive a TAC MAC CE on uplink slot n. The one or more timing relationship rules may indicate the adjustment of the UL transmission based on the uplink slot n+k+1, where k may be determined at least based on a PDSCH processing time of the wireless device capability 1, a PUSCH preparation time for the wireless device processing capability 1, and/or a maximum TA value that may be provided via a TAC MAC CE command of 12 bits.

According to an example, the one or more timing relationship rules may indicate the transmission timing of an UL transmission scheduled by a RAR UL grant or a fallback-RAR UL grant or a PUCCH with HARQ-ACK information in response to a successRAR.

For example, the wireless device may receive a MAC CE activation command in the downlink for one of the one or more TCI states. The wireless device may transmit a PUCCH with HARQ-ACK information for a PDSCH providing the activation command in slot k. The one or more timing relationship rules may indicate that the wireless device may apply the activation command in a first uplink slot that is after slot $k+3N_{slot}^{subframe,\mu}$ where μ is the SCS configuration for the PUCCH.

In another example, the wireless device may receive a PDSCH carrying an activation command in the downlink indicating semi-persistent Reporting Setting. The wireless device may transmit a PUCCH with HARQ-ACK information in an uplink slot n corresponding to the PDSCH. The one or more timing relationship rules may indicate that the indicated semi-persistent Reporting Setting may be applied starting from the first uplink slot that is after slot $n+3N_{slot}^{subframe,\mu}$, where □ is the SCS configuration for the PUCCH.

In an example, the wireless device may receive an activation command for one or more CSI-RS resource sets for channel measurement and/or CSI-IM/NZP CSI-RS resource sets for interference measurement associated with one or more configured CSI resource settings. The wireless device may transmit a PUCCH with HARQ-ACK information in an uplink slot n corresponding to a PDSCH carrying the selection command in the downlink. The one or more timing relationship rules may indicate that the corresponding action(s) and/or the wireless device assumptions (corresponding to quasi-collocation assumptions provided by a list of reference to TCI-State's one per activated resource) on CSI-RS/CSI-IM transmission corresponding to the configured CSI-RS/CSI-IM resource configuration(s) may be applied starting from the first slot that is after slot $n+3N_{slot}^{subframe,\mu}$ where □ is the SCS configuration for the PUCCH. According to an example, the wireless device may receive a deactivation command of the one or more CSI-RS/CSI-IM resource sets. The wireless device may transmit a PUCCH with HARQ-ACK information in slot n corresponding to a PDSCH carrying the deactivation command. The one or more timing relationship rules may indicate that the wireless device assumption on cessation of CSI-RS/CSI-IM transmission corresponding to the one or more CSI-RS/CSI-IM resource sets may apply starting from the first slot that is after slot $n+3N_{slot}^{subframe,\mu}$ where □ is the SCS configuration for the PUCCH.

According to an example, the wireless device may transmit a PUCCH with HARQ-ACK information in slot n corresponding to a PDSCH carrying an activation command indicating performing semi-persistent CSI reporting on a PUCCH. The one or more timing relationship rules may indicate that the wireless device may perform semi-persistent CSI reporting on the PUCCH applied starting from the first slot that is after slot $n+3N_{slot}^{subframe,\mu}$ where □ is the SCS configuration for the PUCCH.

According to an example, the wireless device may receive an activation command for an SRS resource. The wireless device may transmit a PUCCH with HARQ-ACK information in slot n corresponding to a PDSCH carrying the activation command in slot n. The one or more timing relationship rules may indicate that the action time of the activation command (and/or the wireless device assumptions on SRS transmission corresponding to the configured SRS resource set) may be applied starting from the first slot that is after slot $n+3N_{slot}^{subframe,\mu}$ where □ is the SCS configuration for the PUCCH.

According to an example, the wireless device may receive a deactivation command for an activated SRS resource set. The wireless device may transmit a PUCCH with HARQ-ACK information in slot n corresponding to a PDSCH carrying the deactivation command. The one or more timing relationship rules may indicate that the action time of the deactivation command (and/or the wireless device assumption on cessation of SRS transmission) corresponding to the deactivated SRS resource set may apply starting from the first slot that is after slot $n+3N_{slot}^{subframe,\mu}$ where □ is the SCS configuration for the PUCCH.

According to an example, the wireless device may transmit a PUCCH with HARQ-ACK information in uplink slot n corresponding to a PDSCH carrying the ZP CSI-RS Resource Set Activation MAC CE command for one or more ZP CSI-RS resources. The one or more timing relationship rules may indicate that the corresponding action time of the ZP CSI-RS Resource Set Activation MAC CE command (and/or the wireless device assumption on the PDSCH resource element mapping) corresponding to the activated one or more ZP CSI-RS resources may be applied starting from an uplink first slot that is after slot $n+3N_{slot}^{subframe,\mu}$ where □ is the SCS configuration for the PUCCH. In an example, the wireless device may transmit a PUCCH with HARQ-ACK information in uplink slot n corresponding to a PDSCH carrying the ZP CSI-RS Resource Set Deactivation MAC CE command for the one or more ZP CSI-RS resources. The one or more timing relationship rules may indicate that the corresponding action in and the wireless device assumption on the PDSCH resource element mapping corresponding to the deactivated ZP CSI-RS resources may be applied starting from an uplink first slot that is after slot $n+3N_{slot}^{subframe,\mu}$ where □ is the SCS configuration for the PUCCH.

In an example, a wireless device may be configured with configuration parameters of a buffer status report (BSR). The configuration parameters may comprise at least one of: a periodic BSR timer (e.g., periodicBSR-Timer), a BSR retransmission timer (e.g., retxBSR-Timer), a SR delay timer application indicator (e.g., logicalChannelSR-Delay-TimerApplied), a SR delay timer (e.g., logicalChannelSR-DelayTimer), a SR mask parameter (e.g., logicalChannelSR-Mask), a logical channel group (LCG) group indication (e.g., logicalChannelGroup), etc.

In an example, a wireless device may trigger a first BSR in response to a MAC entity of the wireless device having new UL data (e.g., new data) available for a logical channel (LCH) which belongs to an LCG, either when the new UL data belongs to a LCH with higher priority than the priority of any LCH containing available UL data which belong to any LCG, or when none of the LCHs which belong to an LCG contains any available UL data. The first BSR may be referred to as a regular BSR (or a first type of BSR) in this specification.

In an example, a wireless device may trigger a second BSR in response to UL resources being allocated and number of padding bits being equal to or larger than the size of a BSR MAC CE plus its subheader. The second BSR may be referred to as a padding BSR (or a second type of BSR) in this specification.

In an example, a wireless device may trigger a third BSR in response to a timer (e.g., retxBSR-Timer) expiring, and at least one of the LCHs which belong to an LCG containing UL data. The third BSR may be the same type of BSR as the first BSR. The third BSR may be referred to as a regular BSR in this specification. In an example, a MAC entity of a wireless device may restart retxBSR-Timer upon reception of an UL grant for transmission of new data on any UL-SCH. In an example, for a BSR triggered by a BSR retransmission timer (e.g., retxBSR-Timer) expiry, a MAC entity of the wireless device may determine that a LCH that triggered the BSR is the highest priority LCH that has data available for transmission at the time the BSR is triggered.

In an example, a wireless device may trigger a fourth BSR in response to a timer (e.g., periodicBSR-Timer) expiring. The fourth BSR may be referred to as a periodic BSR (or a third type of BSR) in this specification.

In an example, for a BSR (e.g., a regular BSR), a wireless device may start or restart a SR delay timer (e.g., logicalChannelSR-DelayTimer) in response to the BSR being triggered for a first LCH. The first LCH may be associated with a logicalChannelSR-DelayTimerApplied being set to value true. In an example, the wireless device may not trigger an SR for the pending BSR based on determining that the associated SR delay timer is running. The wireless device may stop the SR delay timer, if running, in response to the BSR being triggered for a second LCH for which a logicalChannelSR-DelayTimerApplied is not configured or is set to value false if configured.

In an example, for a BSR (e.g., a regular BSR or a periodic BSR), a wireless device may report Long BSR for all LCGs which have data available for transmission in response to more than one LCG having data available for transmission when the MAC PDU containing the BSR is to be built, otherwise the wireless device may report Short BSR.

In an example, for a BSR (e.g., a padding BSR), a wireless device may report Short Truncated BSR of the LCG with the highest priority logical channel with data available for transmission if: the number of padding bits is equal to or larger than the size of the Short BSR plus its subheader but smaller than the size of the Long BSR plus its subheader, more than one LCG has data available for transmission when the BSR is to be built and the number of padding bits is equal to the size of the Short BSR plus its subheader.

In an example, for a BSR (e.g., a padding BSR), a wireless device may report Long Truncated BSR of the LCG(s) with the logical channels having data available for transmission following a decreasing order of the highest priority logical channel (with or without data available for transmission) in each of these LCG(s), and in case of equal priority, in increasing order of LCGID if: the number of padding bits is equal to or larger than the size of the Short BSR plus its subheader but smaller than the size of the Long BSR plus its subheader, more than one LCG has data available for transmission when the BSR is to be built and the number of padding bits is greater than the size of the Short BSR plus its subheader.

In an example, for a BSR (e.g., a padding BSR), a wireless device may report Short BSR if: the number of padding bits is equal to or larger than the size of the Short BSR plus its subheader but smaller than the size of the Long BSR plus its subheader, at most one LCG has data available for transmission when the BSR is to be built.

In an example, for a BSR (e.g., a padding BSR), a wireless device may report Long BSR for all LCGs which have data available for transmission if the number of padding bits is equal to or larger than the size of the Long BSR plus its subheader.

In an example, a wireless device may instruct a Multiplexing and Assembly procedure to generate BSR MAC CE(s), (re-)start a periodic BSR timer (e.g., periodicBSR-Timer) except when all generated BSRs are long or short Truncated BSRs and/or start or restart a BSR retransmission timer (e.g., retxBSR-Timer) in response to: at least one BSR having been triggered and not been cancelled, and UL-SCH resources being available for a new transmission and the UL-SCH resources accommodating the BSR MAC CE plus its subheader as a result of logical channel prioritization.

In an example, a wireless device may trigger a SR in response to: at least one BSR having been triggered and not been cancelled, a regular BSR of the at least one BSR having been triggered and a logicalChannelSR-DelayTimer associated with a LCH for the regular BSR not being running, and no UL-SCH resource being available for a new transmission (or the MAC entity being configured with configured uplink grant(s) and the Regular BSR being triggered for a LCH for which logicalChannelSR-Mask is set to false, or the UL-SCH resources available for a new transmission not meeting the LCP mapping restrictions configured for the LCH that triggered the BSR).

In an example, a wireless device may determine that UL-SCH resources are available if a MAC entity of the wireless device has an active configuration for either type (type 0 or type 1) of configured uplink grants, or if the MAC entity has received a dynamic uplink grant, or if both of these conditions are met. In an example, the wireless device may determine that one or more UL-SCH resources are available if the MAC entity has been configured with, receives, or determines an uplink grant. If the MAC entity has determined at a given point in time that UL-SCH resources are available, this need not imply that UL-SCH resources are available for use at that point in time.

In an example, a MAC PDU may contain at most one BSR MAC CE, even when multiple events have triggered a BSR. The Regular BSR and the Periodic BSR shall have precedence over the padding BSR.

In an example, a wireless device may cancel all triggered BSRs when the UL grant(s) can accommodate all pending data available for transmission but is not sufficient to additionally accommodate the BSR MAC CE plus its subheader.

In an example, a wireless device may cancel all BSRs triggered prior to MAC PDU assembly when a MAC PDU is transmitted and this PDU includes a Long or Short BSR MAC CE which contains buffer status up to (and including) the last event that triggered a BSR prior to the MAC PDU assembly.

In an example, a MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

In an example, a base station may transmit to a wireless device one or more RRC messages comprising configuration parameters of one or more PUCCH resources and configuration parameters of a plurality of SR configurations. A first SR configuration in the plurality of SR configurations may correspond to one or more first LCHs of the plurality of LCHs. In an example, the base station may transmit to a wireless device at least one message comprising parameters indicating zero, one or more SR configurations. Each SR configuration may correspond to one or more logical channels. Each logical channel may be mapped to zero or one SR configuration configured by the at least one message. A SR configuration of a logical channel (LCH) that triggers a buffer status report (BSR) may be considered as a corresponding SR configuration for a triggered SR.

For example, the one or more configuration parameters may comprise at least one of: a SR prohibit timer (e.g., sr_ProhibitTimer); a maximum number of SR transmission (e.g., sr_TransMax); a parameter indicating a periodicity and offset of SR transmission in slots (e.g., periodicityAndOffset) for a PUCCH transmission conveying SR; and/or a PUCCH resource; a number of symbols for a PUCCH transmission (e.g., nrofSymbols). A SR configuration may comprise a set of PUCCH resources for SR on one or more BWPs, and/or one or more cells. On a BWP, at most one PUCCH resource for SR may be configured. In an example, a wireless device may be configured by a priority index or a priority index 1 for the SR (e.g., by phy-Priorityindex in SchedulingRequestResourceConfig). If the wireless device not being provided a priority index for SR, the priority index may be 0.

The wireless device may trigger a BSR in response to data becoming available for the LCH. The wireless device may determine that a SR configuration of a LCH that triggers a BSR is a corresponding SR configuration for a triggered SR. In an example, the wireless device may trigger a SR for requesting UL-SCH resource when the wireless device has new transmission (e.g., SR for BSR). In an example, when the SR is triggered, a wireless device may consider the SR pending until it is cancelled. In an example, when one or more UL grants accommodate one or more pending data (e.g., all pending data) available for transmission, one or more pending SRs (e.g., all pending SRs) including the triggered SR may be cancelled.

In an example, the SR prohibit timer may be a duration during which the wireless device may be not allowed to transmit the SR. In an example, the wireless device may stay active while sr_ProhibitTimer is running and may monitor PDCCH for detecting DCI indicating uplink scheduling grant(s). In an example, the maximum number of SR transmission (e.g., sr_TransMax) may be a transmission number for which the wireless device may be allowed to transmit the SR at most.

The wireless device may determine whether there is at least one valid PUCCH resource for a pending SR at the time of SR transmission occasion. In an example, based on determining that there is no valid PUCCH resource for the pending SR, the wireless device may initiate a random access procedure on a PCell, or a PSCell. The wireless device may cancel the pending SR based on initiating the RA procedure in response to no valid PUCCH resource for the pending SR. In an example, based on determining that there is at least one valid PUCCH resource for the pending SR (e.g., by determining that the PUCCH resource for the SR transmission occasion does not overlap with a measurement gap), the wireless device may determine an SR transmission occasion on the at least one valid PUCCH resource based on the periodicity and the offset of the corresponding SR configuration. In an example, the wireless device may transmit the PUCCH using PUCCH format 0, or PUCCH format 1, according to the PUCCH configuration.

In an example, based on determining that the SR prohibit timer being running, the wireless device may wait for another SR transmission occasion (e.g., when the SR prohibit timer not being running). In an example, a wireless device may maintain a SR transmission counter (e.g., SR_COUNTER) associated with an SR configuration for counting the number of times that the SR being transmitted/retransmitted.

In an example, if an SR of a SR configuration being triggered, and there are no other SRs pending corresponding to the same SR configuration, a wireless device may set the SR_COUNTER of the SR configuration to a first value (e.g., 0).

In an example, if the SR prohibit timer not being running and the SR_COUNTER being less than the maximum number of SR transmission, the wireless device may instruct the physical layer of the wireless device to signal the SR on the at least one valid PUCCH resource for the SR, increment the SR_COUNTER (e.g., by one), and start the SR prohibit timer. In response and/or after instructing the physical layer of the wireless device to signal the SR on the at least one valid PUCCH resource for the SR, the wireless device may start monitoring a PDCCH for detecting a DCI for uplink grant (e.g., when the SR prohibit timer is running). In an example, based on determining, by a wireless device, that one or more uplink grants being received, which may accommodate one or more pending data (e.g., all pending data) available for transmission, the wireless device may cancel the pending SR, and/or stop the SR prohibit timer.

In an example, a wireless device may cancel all pending SR(s) for BSR triggered before the MAC PDU assembly and/or stop each respective sr-ProhibitTimer in response to the MAC PDU being transmitted and this PDU being comprised a Long or Short BSR MAC CE which may contain buffer status up to (and including) the last event that triggered a BSR prior to the MAC PDU assembly. In an example, the wireless device may cancel all pending SR(s) for BSR triggered according to the BSR procedure and stop each respective sr-ProhibitTimer by determining that the UL grant(s) accommodating all pending data available for transmission.

In an example, based on determining that, by the wireless device, one or more uplink grants, which may accommodate all pending data available for transmission, not being received until the expiry of the SR prohibit timer, the wireless device may repeat one or more actions comprising: determining the at least one valid PUCCH resource for the transmission of the SR; checking whether the SR prohibit timer is running; whether the SR_COUNTER is equal or greater than the maximum number of SR transmission; incrementing the SR_COUNTER, transmitting the SR and starting the SR prohibit timer; monitoring a PDCCH for uplink grant.

In an example, based on determining that the SR_COUNTER indicating a number equal to or greater than the maximum number of SR transmission, a wireless device may release PUCCH for one or more serving cells, and/or release SRS for the one or more serving cells, and/or clear one or more configured downlink assignments and uplink grants, and/or initiate a random access procedure on a PCell, and/or cancel the pending SR.

In an example, the wireless device (e.g., a MAC entity of the wireless device) may stop ongoing Random Access (RA) procedure due to a pending SR which has no valid PUCCH resources configured, wherein the SR was initiated by the MAC entity of the wireless device prior to a MAC PDU assembly. In an example, the wireless device may stop the ongoing RA procedure due to an SR (triggered by a BSR) not being configured with valid PUCCH resource, in response to: transmitting a MAC PDU via a first UL grant other than a second UL grant provided by a RAR of the RA procedure; the MAC PDU comprising a BSR MAC CE which contains buffer status up to (and comprising) a last event that triggered the BSR prior to the MAC PDU assembly, or when the UL grant(s) can accommodate all pending data available for transmission.

Figure 20:
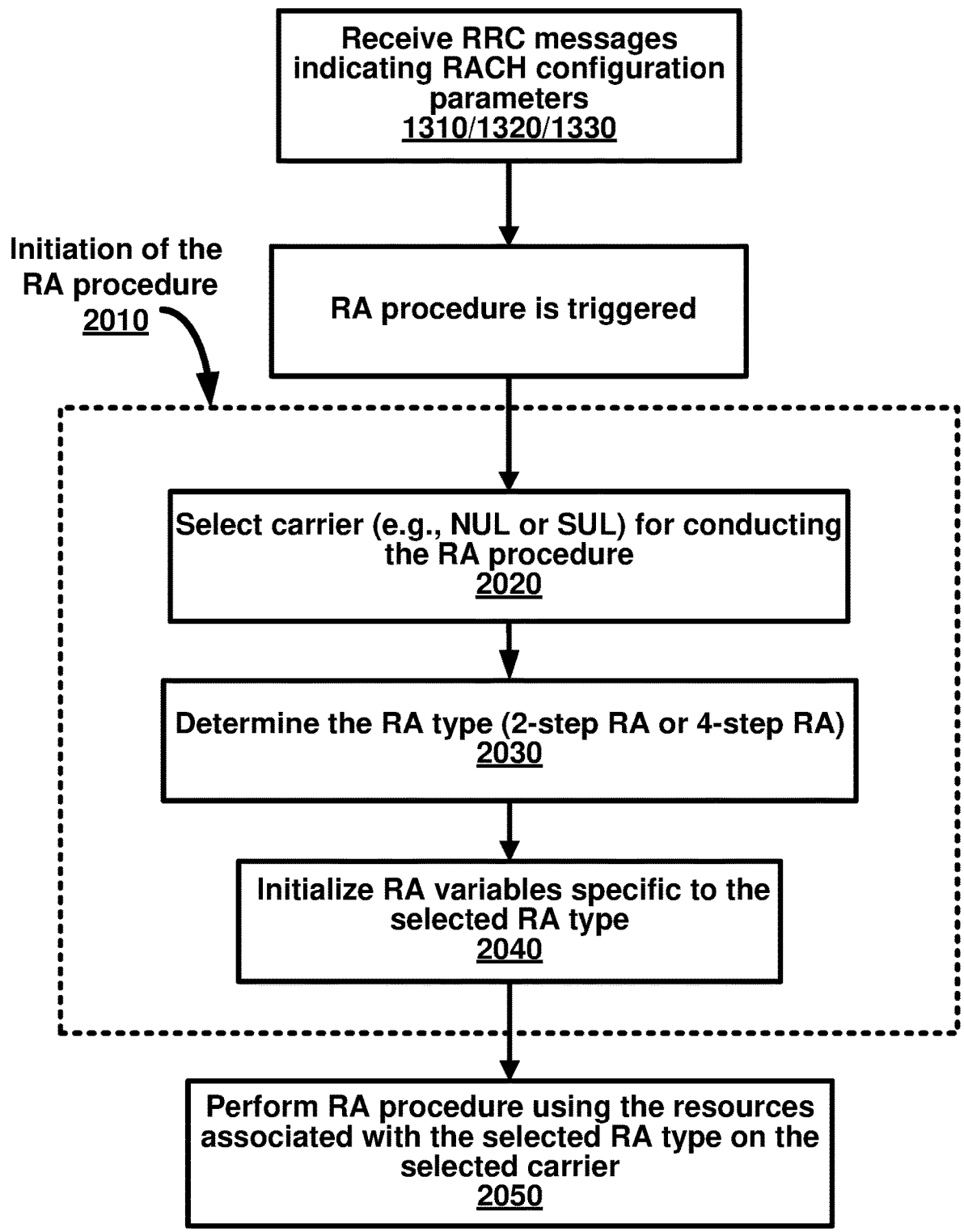
FIG. 20 shows an example flow diagram of an RA procedure with multiple uplink carriers and multiple RA types configured.

FIG. 20 shows an example flow diagram of an RA procedure with multiple uplink carriers and multiple RA types configured. Prior to initiation of a random access (RA) procedure, a base station may transmit one or more RACH configuration messages 1310/1320/1330 (e.g., RRC messages) to configure a wireless device with one or more parameters of RACH configuration. The cell may comprise an SUL and/or an NUL. In an example, the RACH configuration procedure may comprise 2-step RA and/or 4-step RA. There may be a case that a wireless device may receive, from a base station, configuration parameters indicating different (or independent) PRACH occasions between 2-step RA and four-step RA. There may be a case that a base station configures one or more PRACH occasions shared between 2-step RA and 4-step RA and preambles partitioned for the 2-step RA and the 4-step RA. In an example, the wireless device may be configured with a 4-step RACH configuration regardless of whether 2-step RACH configuration exists or not. In an example, when the base station configures the wireless device with both 4-step and 2-step RACH resources/configurations, the wireless device may need to select which type of RACH (2-step or 4-step) to use to initiate a RA procedure. In some aspect, the wireless device supporting 2-step RA may select 2-step RA type as long as a received target power for the preamble and PUSCH transmission may be achieved. The wireless device may select between a 2-step RA type and a 2-step RA type based on at least RSRP.

In an example, the one or more RACH configuration messages may comprise at least one or more common configuration parameters (e.g., RA-ConfigCommon IE and/or RA-ConfigCommonTwoStepRA-r16 IE), and/or one or more configuration parameters configuring MsgA 1331 (e.g., MsgA-PUSCH-Config IE). In an example, the one or more RACH configuration messages may comprise generic configuration parameters (e.g., RACH-ConfigGeneric IE or RACH-ConfigGenericTwoStepRA IE), a cell specific random access configuration message (e.g., RACH-Config-Common and/or RACH-ConfigGeneric), and/or a dedicated random access configuration message (e.g., RACH-ConfigDedicated). According to an example, the MsgA-PUSCH-Config IE may comprise a list of MsgA PUSCH resources (e.g., msgA-PUSCH-ResourceList) that the wireless device may use when performing MsgA 1331 transmission. For example, MsgA payload may comprise buffer status report (BSR) MAC CE, power headroom report (PHR) MAC CE, RRC messages, connection request, etc.

Lower layers (e.g., the physical layer) of the wireless device may receive from higher layers (e.g., the MAC layer), among other information, one or more SS/PBCH block indexes and/or one or more configuration parameters of one or more PRACH transmission parameters. In an example, the one or more PRACH transmission parameters may indicate PRACH preamble format, preamble index, a corresponding RA-RNTI (or MSGB-RNTI), time and/or frequency resources for PRACH preamble transmission, and/or parameters for determining one or more sequences and their shifts in the PRACH preamble sequence set (e.g., set type). The physical layer may provide to higher layers (e.g., the MAC layer) one or more corresponding sets of reference signal received power (RSRP) measurements and/or one or more indications.

As shown in FIG. 20, the wireless device may trigger the RA procedure based on the one or more RACH configuration messages. The wireless device may trigger the RA procedure in response to: initial access to the cell; a positioning procedure; an uplink coverage recovery procedure; initiating a beam failure recovery; receiving from a base station a RRC reconfiguration message for a handover to a second cell; receiving from a base station a physical downlink control channel (PDCCH) order; re-synchronizing when new data arrives and the wireless device status is out-of-sync; new data arrives at the buffer of the wireless device when there is no scheduling request (SR) resources are configured; and/or pending data exists in the buffer of the wireless device and the wireless device has reached a maximum allowable times for (re)transmitting an SR (e.g., an SR failure). In an example, there may only be one RA procedure ongoing at any point in time in a MAC entity of the wireless device. In an example, based on determining that the RA procedure is ongoing, if a new RA procedure is triggered, it may be up to the wireless device implementation whether to continue with the ongoing RA procedure or initiate the new RA procedure.

In response to triggering the RA procedure, the wireless device may initialize the RA procedure 2010. The initializing the RA procedure may comprise at least one of: determining a carrier (SUL or NUL) for performing the RA procedure based on measured RSRP 2020, determining a 2-step RA type or a 4-step RA type (e.g., selecting RA type) for performing the RA procedure 2030, and initializing one or more RA parameters (variables) specific to the selected RA type 2040. The wireless device may employ/use/maintain one or more parameters/variables for the initiated RA procedure. For example, the one or more parameters/variables may comprise at least one of: RA_TYPE; PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET POWER; PREAMBLE_BACKOFF; PCMAX; SCALING_FACTOR_BI; POWER_OFFSET_2STEP_RA; MSGA_PREAMBLE_POWER_RAMPING_STEP; and TEMPORARY C-RNTI. The wireless device may set one or more of the RA procedure parameters/variables. According to an example, the wireless device may set the value of PCMAX based on the selected carrier (SUL or NUL).

In an example, upon initiating the RA procedure 2010, the wireless device may flush the Msg3 buffer. In another example, upon triggering the RA procedure 2020, the wireless device may flush the MsgA buffer. Once the RA procedure is initiated, the wireless device may perform RA procedure using selected RA resources with the selected RA carrier and RA type 2050. In an example, performing the RA procedure, based on determining that the RA procedure is a 4-step RA procedure, may comprise at least one or more of the following: selecting the RA resources and transmitting one or more PRACH preambles, monitoring one or more PDCCHs for receiving one or more random access responses (RARs), one or more retransmissions of the one or more PRACH preambles, transmission of Msg3, and/or contention resolution procedure. In another example, performing the RA procedure, based on determining that the RA procedure is a 2-step RA procedure, may comprise at least one or more of the following: selecting the RA resources and transmitting one or more PRACH preambles and/or one or more MsgA payloads, monitoring one or more PDCCHs for receiving one or more random access responses (RARs), one or more retransmissions of the one or more PRACH preambles and/or MsgA payloads, switching to a 4-step RA procedure, performing fallback procedure (e.g., transmitting Msg3 in response to receiving a MsgB comprising fallback MAC subPDU).

As shown in FIG. 20, in response to selecting an uplink carrier (e.g., SUL or NUL) for performing the RA procedure, the wireless device may select the RA type 2030. In an example, the wireless device may select the RA type based on a plurality of conditions, e.g., the RSRP value, delay requirement, distance to the serving (or target) base station, and logical channel priority triggering a BSR, and the like. In an example, in response to the RSRP being greater than a RSRP threshold, the wireless device may select 2-step RA type (e.g., RA_TYPE=2-stepRA) for performing the RA procedure on the selected uplink carrier. According to another example, when the RA procedure is triggered/initiated for system information (SI) acquisition, the wireless device may select the 4-step RA type for performing the RA procedure.

As shown in FIG. 20, after determining the RA type 2030, the wireless device may initialize one or more RA parameters specific to the selected RA type 2040. The wireless device may initialize one or more parameters (e.g., transmission counter, transmission timer, transmission power settings, response windows, and etc.) of the RA procedure. For example, based on determining that the selected RA type is a 2-step RA procedure (i.e., RA_TYPE=2-stepRA), the one or more RA parameters specific to 2-step RA procedure may comprise at least the following: PREAMBLE_POWER_RAMPING_STEP, msgA-TransMax, preambleTransMax, and SCALING_FACTOR_BI. In another example, based on determining that the selected RA type is a 4-step RA procedure (i.e., RA_TYPE=4-stepRA), the one or more RA parameters specific to 4-step RA procedure may comprise at least the following: PREAMBLE_POWER_RAMPING_STEP, preambleTransMax, and SCALING_FACTOR_BI. For example, based on determining that the selected RA type is a 2-step RA procedure (i.e., RA_TYPE=2-stepRA) the wireless device may set PREAMBLE_POWER_RAMPING_STEP to msgA-PreamblePowerRampingStep.

In an example, if RA_TYPE is switched from 2-stepRA to 4-stepRA during the ongoing/current RA procedure, the wireless device may set POWER_OFFSET_2STEP_RA based on at least one or more configured parameters. In an example, the at least one or more configured parameters may comprise PREAMBLE_POWER_RAMPING_COUNTER and PREAMBLE_POWER_RAMPING_STEP. In response to switching the RA type from 2-stepRA to 4-stepRA during the ongoing/current RA procedure, the wireless device may initialize the RA variables specific to a 4-step RA type 2040 and perform the RA procedure 2050.

In an example, a wireless device may perform a RAP transmission based on a selected PREABLE_INDEX and PRACH occasion. In another example, when applicable, the wireless device may perform a RAP transmission based on a selected preamble index and PRACH occasion and may perform a MsgA payload transmission based on a selected MsgA PUSCH occasion. For example, based on a notification of suspending power ramping counter not being received from lower layers (e.g., the physical layer); and/or based on an SSB and/or a CSI-RS selected not being changed (e.g., same as the previous RAP transmission), a wireless device may increment PREAMBLE_POWER_RAMPING_COUNTER, e.g., by one or to the next value (e.g., counter step size may be predefined and/or semi-statically configured).

In an example, the wireless device may start a RAR window (e.g., ra-Response Window or msgB-Response Window) at a first downlink control channel occasion from an end of the RAP transmission (e.g., Msg1 1311 or Msg1 1321 for a case of four-step RA procedure) or from an end MsgA payload transmission (e.g., TB 1342 for a case of 2-step RA procedure). The wireless device may, while the RAR window is running, monitor a first downlink control channel (DCI) occasion of the SpCell for random access response(s) (RARs) identified by a particular RNTI, e.g., a random access-radio network temporary identifier (RA-RNTI), a temporary cell-radio network temporary identifier (TC-RNTI), C-RNTI, and/or MSGB-RNTI. For example, the first DCI may comprise at least one of the following fields: one or more random access preamble index, SS/PBCH index, PRACH mask index, UL/SUL indicator, frequency and time domain resource assignments, modulation and/or coding schemes. In an example, the wireless device may monitor a set of candidates for the one or more downlink control channels in a Type1-PDCCH common search space set. For example, the Type1-PDCCH common search space set may be configured by the one or more search space sets, e.g., the ra-searchSpace in the PDCCH-ConfigCommon.

In a 2-step RA procedure, the wireless device may receive two separate responses corresponding to a MsgA transmission; a first response for an RAP (e.g., MsgA preamble) transmission; and a second response for a transmission of one or more TBs (e.g., MsgA payload). The wireless device may monitor a PDCCH (e.g., common search space and/or a wireless device specific search space) to detect the first response with the MSGB-RNTI generated based on time and/or frequency indices of PRACH resource where the wireless device may transmit the RAP. The wireless device may monitor a common search space and/or a wireless device specific search space to detect the second response.

In an example, the wireless device may transmit a MsgA preamble, as part of MsgA transmission, based on determining that the corresponding PRACH occasion or the MsgA preamble is not mapped to a valid MsgA PUSCH occasion. The wireless device may, based on determining that the MsgA preamble is mapped to an invalid MsgA PUSCH occasion, detect the first DCI with CRC scrambled by a corresponding MSGB-RNTI during the RAR window.

In an example, the wireless device may receive a PDCCH based on the RA-RNTI or the MSGB-RNTI. The PDCCH may indicate a downlink assignment based on which the wireless device may receive one or more TBs comprising an MAC PDU. For example, the MAC PDU comprises at least one MAC subPDU with a corresponding subheader comprising a Random Access Preamble identifier (e.g., RAPID) matched to a preamble that a wireless device transmits to the base station. In this case, the wireless device may determine that a RAR reception is successful. For example, the at least one MAC subPDU may comprise a RAPID only, e.g., for a random access procedure being started, by a wireless device, for a system information (SI) request.

A wireless device may stop the RAR window (e.g., ra-Response Window or msgB-Response Window) after and/or in response to receiving one or more RARs being determined as successful. A reception of the one or more RARs may be determined as successful, for example, when the one or more RARs comprise a RAPID corresponding to a preamble that the wireless device transmits to a base station (e.g., MsgA preamble). The one or more RARs may comprise an uplink grant indicating one or more uplink resources granted for the wireless device. The wireless device may transmit one or more transport blocks (e.g., Msg3) via the one or more uplink resources. In an example, the wireless device may use the downlink assignment to identify parameters required for decoding/detecting the one or more TBs. For example, the downlink assignment may indicate at least one of following: time and frequency resource allocation of a PDSCH carrying the one or more TBs, a size of the PDSCH, MCS, etc.

In an example, a RAR message may be in a form of MAC PDU comprising one or more MAC subPDUs and/or optionally padding. In an example, a MAC subPDU may comprise at least one of following: a MAC subheader with Backoff Indicator only; a MAC subheader with RAPID only (e.g., acknowledgment for SI request); a MAC subheader with RAPID and MAC RAR. In an example, an MAC RAR may be fixed size and may comprise at least one of the following fields: an R field that may indicate a Reserved bit; a TAC MAC CE field that may indicate the index value TA employed to control the amount of timing adjustment; an UL grant field that may indicate the resources to be employed on the uplink; and an RNTI field (e.g., Temporary C-RNTI and/or C-RNTI) that may indicate an identity that is employed during the RA procedure. For example, for a 2-step RA procedure, a RAR may comprise at least one of following: a wireless device contention resolution identity, an RV ID for retransmission of one or more TBs, decoding success or failure indicator of one or more TB transmission, and one or more.

In an example, the wireless device may determine that a RAR reception not being successful, e.g., based on determining that at least one RAR comprising one or more RAPIDs, matching the transmitted PREAMBLE_INDEX, is not received until the expiry of the RAR window. In an example, in response to and/or after determining that the RAR reception not being successful, the wireless device may perform one or more retransmissions of one or more PRACH preambles during the RA procedure. In another example, the wireless device may determine the requirement for the one or more retransmissions of MsgA (e.g., MsgA preamble and MsgA payload), e.g., in response to not receiving at least one MsgB comprising the contention resolution identifier, which the wireless device may include in MsgA payload, until the expiry of the RAR window. In another example, the wireless device may determine the one or more retransmissions of one or more preambles or MsgA, e.g., in response to determining, by the wireless device, that a contention resolution not being successful. For example, the wireless device may determine, based on Msg3 for four-step RA procedure and/or MsgB for 2-step RA procedure, whether the contention resolution being successful or not.

In an example, the wireless device may start a contention resolution timer (e.g., ra-ContentionResolutionTimer) and may restart the contention resolution timer at each HARQ retransmission in the first symbol after the end of a Msg3 1313 transmission, for example, once the wireless device transmits, to a base station, the Msg3. A wireless device may determine that the contention resolution not being successful, for example, based on not receiving an indication of a contention resolution until the contention resolution timer expires. In an example, the wireless device may discard a TEMPRARY_C-RNTI indicated by an Msg2 1312 (or MsgB 1332) after or in response to an expiry of the contention resolution timer (and/or in response to a determination of the contention resolution is unsuccessful).

For a 2-step RA procedure, the wireless device may fall back to a four-step RA procedure based on an explicit and/or implicit indication of a MsgB (e.g., based on receiving a fallbackRAR message). In an example, in response to receiving, by the wireless device, the MsgB comprising an explicit indication and/or an RNTI used for detecting a PDCCH scheduling the MsgB (e.g., RA-RNTI or MSGB-RNTI), the wireless device may determine to fall back to the four-step RA procedure. The wireless device may transmit Msg3, e.g., after or in response to receiving the fallback message via resource(s) indicated by an UL grant in the MsgB. In this case the wireless device may follow the four-step RA procedure, e.g., starting the contention resolution timer, and/or determining whether the contention resolution being successful or not being successful.

In an example, a wireless device may delay a particular period of time (e.g., a backoff time) for performing a retransmission of one or more Msg1 1311, Msg1 1321, or MsgA 1331. For example, the wireless device may apply the backoff time to the retransmission, for example, in response to the RA procedure being CBRA (e.g., where a preamble being selected by a MAC entity of the wireless device) and/or based on determining, by the wireless device, that the RA procedure not being completed in response to a successful RAR reception. In an example, the backoff time to the retransmission may be applied, by the wireless device, based on determining that that the RA procedure not being completed in response to an unsuccessful contention resolution. In an example, the wireless device may set the backoff time to 0 milliseconds when the RA procedure is initiated 1910. In an example, the wireless device may set (or update) the backoff time based on the PREAMBLE_BACKOFF determined by a value in the backoff indicator (BI) field of the MAC subPDU and one or more RRC messages indicating the scaling factor (e.g., SCALING_FACTOR_BI). For example, the wireless device may determine the backoff time based on a uniform distribution between 0 and the PREAMBLE_BACKOFF.

A wireless device may initiate a 4-step RA procedure. The wireless device may transmit a preamble (e.g., Msg1 1311) and monitor RAR window for receiving a Msg2. In an example, the Msg2 may schedule transmission of a Msg3 comprising a C-RNTI MAC CE. While a contention resolution timer (e.g., ra-ContentionResolutionTimer) is running, the wireless device may detect a PDCCH addressed to C-RNTI. The wireless device may indicate the 4-step RA procedure being successfully completed in response to determining that the RA procedure was initiated by the higher layers (e.g., MAC sublayer or by the RRC sublayer), the PDCCH is addressed to the C-RNTI indicates a UL grant for a new transmission.

In another example, the wireless device may include a CCCH SDU in the Msg3. While a contention resolution timer is running, the wireless device may detect a PDCCH addressed to a TEMPORARY C-RNTI. The wireless device may indicate the 4-step RA procedure being successfully completed in response to determining that a Msg4 comprising a Contention Resolution Identity in the MAC CE matches the CCCH SDU transmitted in the Msg3.

A wireless device may initiate a 2-step RA procedure. The wireless device may transmit the C-RNTI (e.g., C-RNTI MAC CE indicating the C-RNTI) via the MsgA and may monitor a downlink control channel with C-RNTI and/or MSGB-RNTI (or RA-RNTI). The wireless device may stop monitoring the downlink control channel with the C-RNTI and/or MSGB-RNTI (or RA-RNTI) after or in response to receiving a PDCCH addressed to the C-RNTI. The PDCCH may comprise a DCI comprising a downlink assignment based on which the wireless device may receive a PDSCH (e.g., MAC PDU). The received PDSCH (or MAC PDU) may comprise a TA command (e.g., TA command MAC CE). The wireless device may stop monitoring the downlink control channel with the C-RNTI and/or MSGB-RNTI (or RA-RNTI) after or in response to receiving the PDCCH addressed to the C-RNTI and/or the corresponding PDSCH (or MAC CE) comprising the TA command. In this case, the wireless device may determine that the 2-step RA procedure being completed successfully, a reception of MsgB being successful, and/or a contention resolution being completed successfully.

In an example, the wireless device may receive at least one response, e.g., a PDCCH addressed to the C-RNTI and/or a PDCCH addressed to the MSGB-RNTI while monitoring msgB-Response Window. In an example, the wireless device may determine that the 2-step RA procedure successfully completed based on detecting a PDCCH addressed to the C-RNTI, included in the MsgA, where indicating a PDSCH (e.g., via a downlink assignment of a DCI) comprising a TA command. In an example, the wireless device may determine that the 2-step RA procedure successfully completed based on determining that a PDCCH addressed to the C-RNTI included in the MsgA being detected, indicating a PDSCH (e.g., via a downlink assignment of a DCI) comprising an UL grant (e.g., if the wireless device is already synchronized). The PDCCH addressed to the C-RNTI may be an indication of a success response. In an example, the wireless device may detect and/or receive a PDCCH addressed to the MSGB-RANTI. The wireless device may receive and/or successfully decode the PDSCH based on the downlink assignment (e.g., a response to the MsgA). In an example, the response to the MsgA may comprise a preamble identifier (e.g., RAPID) that may match the preamble identifier of the preamble that the wireless device transmitted to the base station via the MsgA. The response to the MsgA may comprise an explicit or implicit indicator that indicates a success RAR or a fallback RAR (e.g., fallbackRAR MAC subPDU). In an example, based on determining that the MsgA comprises the fallback-RAR MAC subPDU and the Random Access Preamble (RAP) was not selected by the MAC entity among the contention-based Random Access Preamble(s), the wireless device may consider the 2-step RA procedure successfully completed. In an example, the wireless device may process the received timing advance command (e.g., TAC MAC CE) and UL grant value and indicate it to the lower layers (e.g., physical layer).

In an example, a wireless device may maintain (e.g., increment) a counter counting a number of preamble transmissions (e.g., PREAMBLE_TRANSMISSION_ COUNTER) by a value of counter step (e.g., by 1), for example, after or in response to a RAR reception being unsuccessful and/or after or in response to a contention resolution being unsuccessful. The wireless device may determine that the RA procedure being unsuccessfully completed and/or a MAC entity of the wireless device may indicate a random access problem to upper layer(s), for example, in response to determining that the number of preamble transmissions reached a configured value, (e.g., if PREAMBLE_ TRANSMISSION_COUNTER=preambleTransMax+1). In an example, the wireless device may determine that the RA procedure not being completed and/or one or more retransmissions of one or more Msg1 1311, Msg1 1321, or Msg A 1331 may be performed, in response to determining that the number of preamble transmissions being smaller than the configured value, (e.g., if PREAMBLE_ TRANSMISSION_COUNTER<preambleTransMax+1).

A non-terrestrial network (NTN) network (e.g., a satellite network) may be a network or network segment that uses a space-borne vehicle to embark a transmission equipment relay node (e.g., radio remote unit) or a base station (e.g., an NTN base station). While a terrestrial network is a network located on the surface of the earth, an NTN may be a network which uses an NTN node (e.g., satellite) as an access network, a backhaul interface network, or both. In an example, an NTN may comprise one or more NTN nodes/space-borne vehicles. An NTN node may embark a bent pipe payload (e.g., transparent payload) or a regenerative payload. The NTN node with transparent payload may comprise transmitter/receiver circuitries without the capability of on-board digital signal processing (e.g., modulation and/or coding). The NTN node may comprise a regenerative payload (e.g., the NTN base station) transmitter/receiver with the on-board processing used to demodulate and decode the received signal and/or regenerate the signal before sending it back to the earth.

In an example, the NTN node may be a satellite, a balloon, an air ship, a high-altitude platform station (HAPS), an unmanned aircraft system (UAS), and the like. For example, the UAS may be a blimp, a quasi-stationary (or stationary) HAPS, or a pseudo satellite station (e.g., HAPS). FIG. 21 is an example figure of different types of NTN platforms/nodes. In an example, a satellite may be placed into a low-earth orbit (LEO) at an altitude between 250 km to 1500 km, with orbital periods ranging from 90–130 minutes. From the perspective of a given point on the surface of the earth, the position of the LEO satellite may change. In an example, a satellite may be placed into a medium-earth orbit (MEO) at an altitude between 5000 to 20000 km, with orbital periods ranging from 2 hours to 14 hours. In an example, a satellite may be placed into a geostationary satellite earth orbit (GEO) at 35,786 km altitude, and directly above the equator. From the perspective of a given point on the surface of the earth, the position of the GEO may not move.

Figure 22:
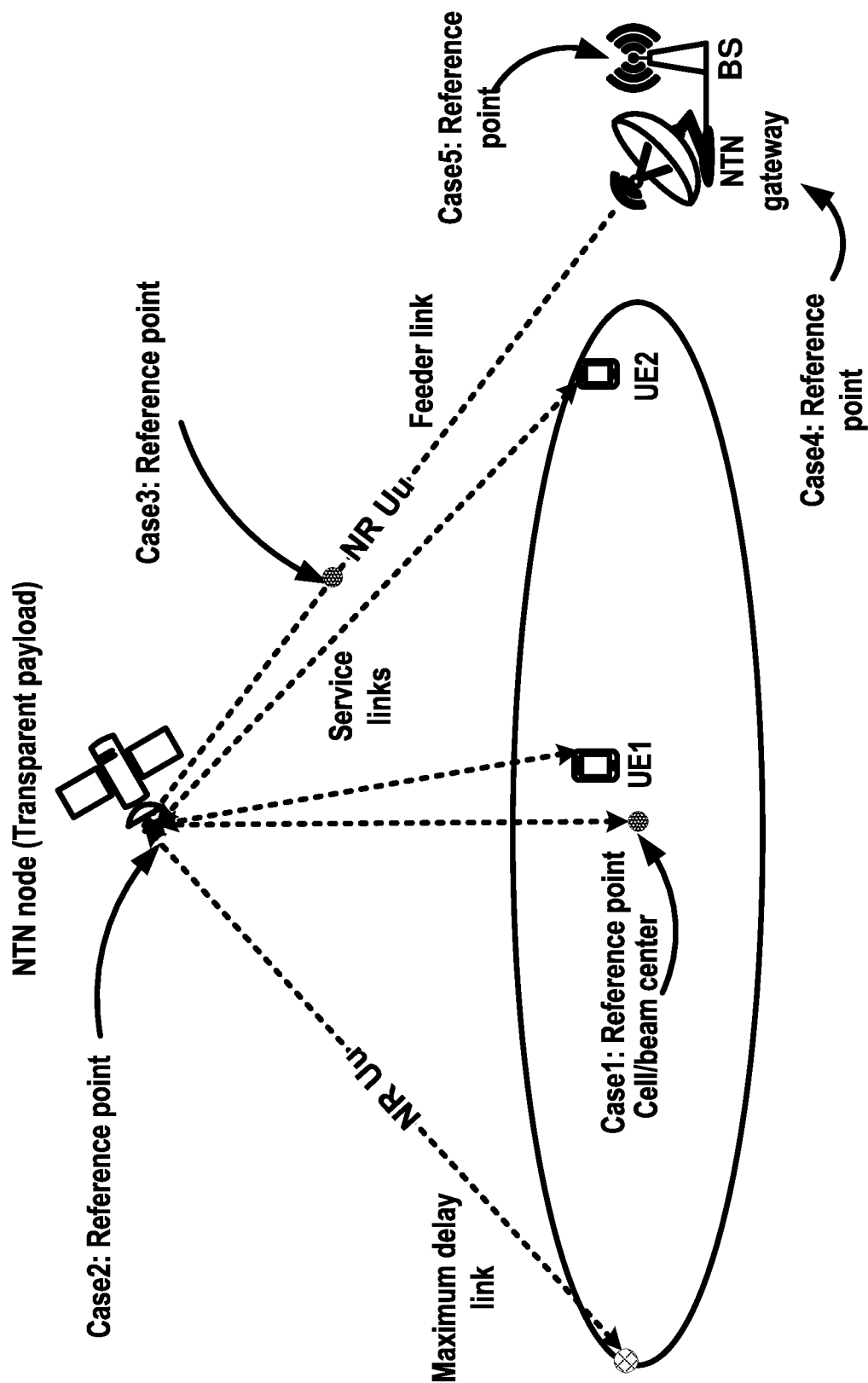
FIG. 22 shows an example of an NTN with a transparent NTN platform/node.

FIG. 22 shown an example of an NTN with a transparent NTN platform/node. In an example, the NTN node (e.g., a satellite) may forward a received signal from another satellite (e.g., over inter-link satellite communication links) or a gateway on the ground (e.g., over the feeder communication link) back to the earth. The gateway may be collocated with the base station (e.g., the NTN base station). In an example, the gateway and the base station (e.g., the NTN base station) may not be collocated. The NTN node may forward a received signal from a wireless device on the earth to another NTN node or a gateway on the ground. The signal may be forwarded back with amplification and/or a shift between service link frequency (point or a bandwidth) and feeder link frequency.

An NTN node may generate one or more beams over a given area (e.g., a coverage area or a cell). The footprint of a beam (or a cell) may be referred to as a spotbeam. For example, the footprint of a cell/beam may move over the Earth's surface with the satellite movement (e.g., a LEO with moving cells or a HAPS with moving cells). The footprint of a cell/beam may be Earth fixed with some beam pointing mechanism used by the satellite to compensate for its motion (e.g., a LEO with earth fixed cells). As shown in FIG. 21, the size of a spotbeam may depend on the system design and may range from tens of kilometers to a few thousand kilometers.

In an example, a propagation delay (e.g., between a satellite and the ground or between multiple satellites) may be an amount of time it takes for the head of the signal to travel from a sender (e.g., the NTN base station or the NTN node) to a receiver (e.g., a wireless device) or vice versa. For uplink, the sender may be a wireless device and the receiver may be a base station/access network (e.g., the NTN base station). For downlink, the sender may be a base station/access network (e.g., the NTN base station) and the receiver may be a wireless device. The propagation delay may vary depending on a change in distance between the sender and the receiver, e.g., due to movement of the NTN node, movement of the wireless device, inter-satellite link, and/or feeder link switching.

FIG. 23 shows examples of propagation delay corresponding to NTNs of different altitudes. The propagation delay in the figure may be one-way latency. In an example, one-way latency may be an amount of time required to propagate through a telecommunication system from a terminal to the receiver (e.g., base station). In an example shown in FIG. 23, for the transparent NTN, the round-trip propagation delay (RTD) may comprise service link delay (e.g., between the NTN node and the wireless device), feeder link delay (e.g., between the NTN gateway and the NTN node), and/or between the gateway and the base station (e.g., in the case the gateway and the NTN base station are not collocated). From FIG. 23, in case of GEO satellite with transparent payload, the RTD may be four times of 138.9 milliseconds (approximately 556 milliseconds). In an example, a RTD of a terrestrial network (e.g., NR, E-UTRA, LTE) may be negligible compared to the RTD of an NTN scenario. The RTD of a terrestrial network may be less than 1 millisecond. In an example, the RTD of a GEO satellite may be hundreds of times longer than the one of terrestrial network. A maximum RTD of a LEO satellite with transparent payload with altitude of 600 km may be 25.77 milliseconds. In an example, for a LEO satellite with transparent payload with altitude of 1200 km, the maximum RTD of may be 41.77 milliseconds.

A differential delay within a beam/cell of the satellite may be calculated based on the maximum diameter of the beam/cell footprint at nadir (e.g., the maximum delay link). In an example, the differential delay may imply the difference between communication latency that two wireless devices, e.g., a second wireless device (UE2) that is located close to the edge of the cell/beam and a first wireless device (UE1) that is located close to the center of the cell/beam, may experience while communicating with the NTN node (e.g., the NTN base station). The first wireless device may experience a smaller RTD compared to the second wireless device. The link with maximum propagation delay may experience higher propagation delay than UE1 and UE2 in the cell/beam. The link to a cell/beam center may experience the minimum propagation delay in the cell/beam. For a LEO satellite, the differential RTD may be 3.12 milliseconds.

FIG. 22 also shows several examples of a reference point in an NTN architecture. The configuration of one or more reference points may indicate at least: uplink timing synchronization (e.g., whether the UL frame and the DL frame are aligned at the base station or not), the pre-compensation of the delay by the base station for UL communications, the pre-compensation of the delay by the wireless device for UL communications, an epoch time for satellite ephemeris data, and/or the like. The one or more reference points in an NTN scenario may allow the wireless device to perform one or more of the following: estimating/calculating/measuring the propagation delay (e.g., in the service link), maintaining/tracking the propagation delay (or RTD), and/or determining a transmission timing of an UL transmission scheduled by a DCI or acting time of a MAC CE command.

In an example, the base station may configure the reference point at the cell/beam center (Case1). In an example of Case1, the reference point may be on the ground and have an altitude larger than the wireless devices in the cell/beam in order to make sure that the propagation delay to the reference point (from the NTN node or the base station) stays the smallest propagation delay in the cell/beam (e.g., above the flight height of commercial airlines). In another example, the base station may configure the reference point at the NTN node (Case2). For Case2, the uplink timing synchronization may be at the NTN node (e.g., UL frame and DL frame are not aligned at the base station). In another example, the base station may configure the reference point within the feeder link between the NTN node and the gateway (Case3). For Case3, the base station may configure the location of the reference point such that the propagation delay that is pre-compensated by the base station stays fixed despite the movement of the NTN node (e.g., a LEO satellite with earth fixed cell). In another example, the base station may configure the reference point at the gateway (Case4). For Case4, in order to not exposing the location of the gateway (e.g., due to security issues) to a wireless device, the reference point may be considered as an auxiliary reference point. In an example, the wireless device may, by knowing the auxiliary reference point and a preconfigured time compensation window, measure/calculate the feeder link delay without knowing the (precise) location of the gateway. In another example, the base station may configure the reference point at the base station (Case5). In an example of Case5, the UL frame and the DL frame may be aligned at the base station (e.g., the NTN base station).

In an example, the propagation delay between the base station and the reference point in FIG. 22 may be considered as a common delay of the cell/beam (e.g., the delay that is experienced by all the wireless devices in the cell/beam). The base station may provide the value of the common delay to all wireless devices in the cell/beam via a broadcast signaling (e.g., SIB1). The wireless device with GNSS capability may require estimating the propagation delay (or service link delay) based on one or more measurements. For example, the one or more measurements may indicate the GNSS-acquired location information (position) of the wireless device. In an example, the one or more measurements may allow the wireless device to calculate/estimate the propagation delay using the GNSS-acquired position and a satellite ephemeris data/information. In an example, the one or more measurements may allow the wireless device to calculate/estimate the propagation delay using the GNSS-acquired position and the one or more reference points. In another example, the one or more measurements may allow the wireless devices to estimate/calculate the propagation delay via one or more timestamps (e.g., the timestamp of a configured broadcast signal). In another example, for a wireless device without a GNSS capability (or when the GNSS precision may not be accurate), the base station may configure the common delay equal to a maximum link of the cell/beam (see FIG. 22). In an example, the one or more measurements may allow the wireless device to estimate/measure a variation rate by which the common delay is changing over a period. The wireless device may calculate a drift rate of the common delay based on the estimated/measured variation rate of the common delay. In an example, the one or more measurements may allow the wireless device to estimate/measure a variation rate by which the service link delay may change (e.g., using the satellite ephemeris data) over a period. The wireless device may calculate a drift rate of the service link delay based on the estimated/measured variation rate of the service link delay.

In an example, the base station may not configure the one or more reference points. The wireless device may, based on determining that no reference point being configured by the base station, assume the reference point is located at the NTN node. The base station may indicate a portion of the propagation delay that the wireless device is expected to pre-compensate via a broadcast system information. In another example, based on determining the one or more reference points not being configured, the wireless device may pre-compensate the service link delay and/or a portion of the service link delay.

Figure 24:
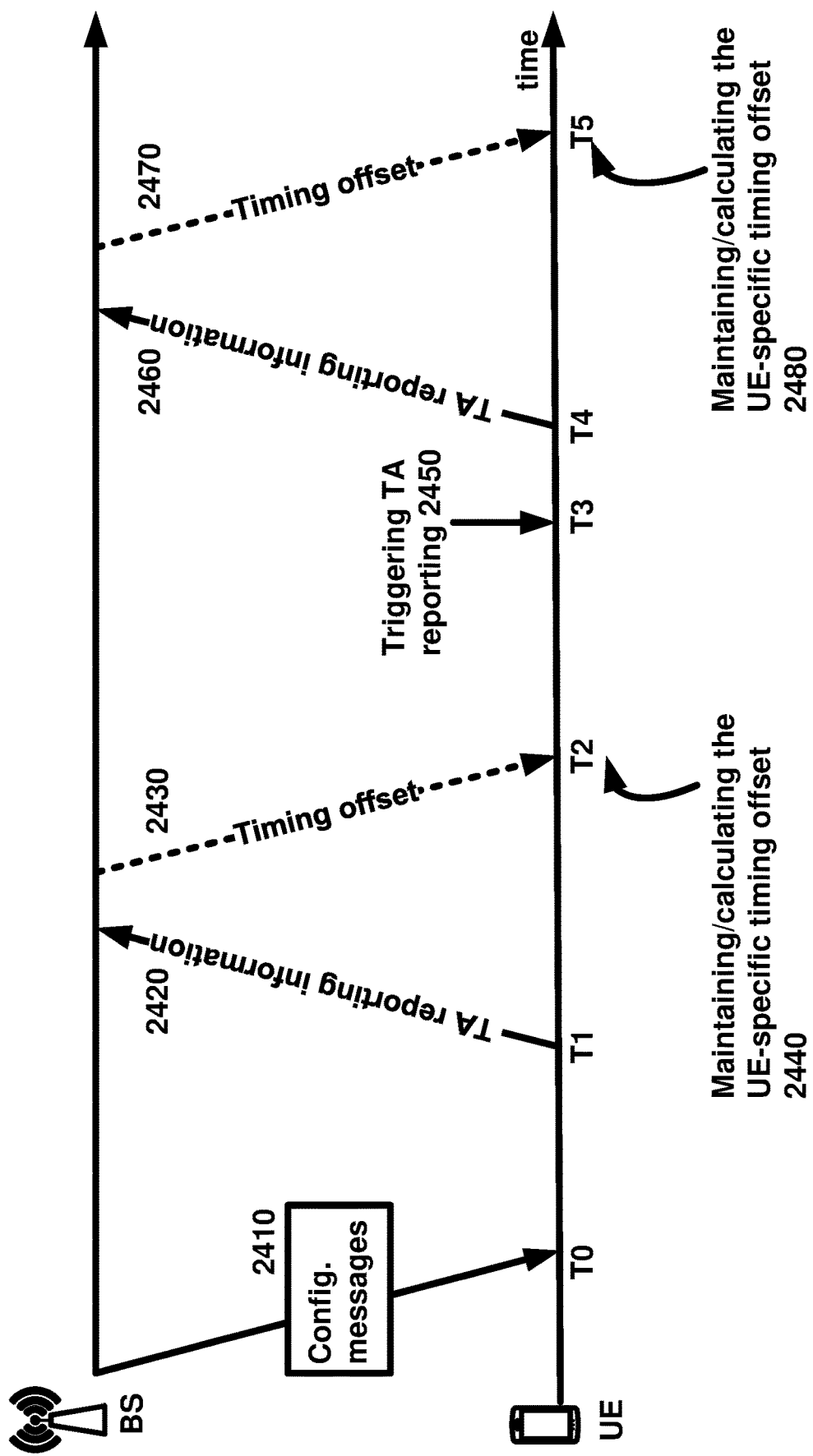
FIG. 24 shows an example of a wireless device communicating with a base station in an NTN.

FIG. 24 shows an example of a wireless device communicating with a base station in a non-terrestrial network (NTN). The wireless device may receive one or more configuration messages 2410 from the base station at time TO in FIG. 24. The one or more configuration messages may comprise at least a first configuration messages, a second configuration messages, and/or a third configuration messages. In an example, the first configuration messages may comprise at least configuration parameters of PUCCH resources, the one or more RACH configuration messages, the configuration parameters of a buffer status report (BSR), the configuration parameters of a plurality of SR configurations, and/or configuration parameters of a plurality of configured grant configurations. The second configuration messages may indicate one or more configuration parameters facilitating/managing the calculation of the propagation delay/TA at the wireless device. In an example, the second configuration messages may comprise at least one or more satellite ephemeris parameters; one or more (network-controlled) common delay/TA parameters; one or more reference points; a first validity/validation period/window (or a first validation period/window of a GNSS-acquired location information or a first validation period/window corresponding to the GNSS location information accuracy or a first validation period/window corresponding to the GNSS validity/availability); and/or one or more TA-margins. The third configuration messages may comprise a TA reporting configuration.

In an example, the second configuration messages 2410 may comprise one or more timing offset parameters. The wireless device may maintain/calculate a cell/beam-specific timing offset based on the one or more timing offset parameters.

In an example, the one or more timing offset parameters may comprise a first timing offset. The first timing offset may account for a cell-specific propagation delay. The base station may calculate/configure the first timing offset as a function of the maximum propagation delay of the cell. In an example, the base station may calculate/configure the first timing offset as function of the maximum service link delay of the cell. The wireless device may calculate/maintain the cell/beam-specific timing offset based on at least the first timing offset indicated by the second configuration messages. For example, the wireless device may track/update/maintain the cell/beam-specific timing offset based on receiving an update of the first timing offset from the base station (e.g., via a broadcast system information and/or the second configuration messages).

In some aspect, the one or more timing offset parameters may comprise the first timing offset and/or one or more beam-specific timing offsets. The one or more beam-specific timing offsets may respectively correspond to one or more maximum propagation delays of the one or more beams in the cell. For example, when the cell comprises of N>1 beams indexed by n, the n-th entry of the one or more beam-specific timing offsets may correspond to the maximum propagation delay of the n-th beam (a virtual beam) of the cell. In another example, the n-th entry of the one or more beam-specific timing offsets may indicate a difference between the first timing offset and the maximum propagation delay of the n-th beam of the cell. In an example, the wireless device may determine/calculate/maintain the cell/beam-specific timing offset based on the one or more beam-specific timing offsets and/or the first timing offset. For example, the wireless device may calculate/maintain the cell/beam-specific timing offset based on an indication indicating a beam index corresponding to the beam that is used for communication with the base station (or the NTN node) in the cell.

In an example, the one or more timing offset parameters may configure a third timing offset. In an example, the wireless device may set a K_mac timing offset by 0 in response to determining the third timing offset not being indicated via the second configured messages. For example, in an NTN scenario with a transparent NTN node, when the UL frame and the DL frame is aligned at the base station, the third timing offset may be absent from the second configuration parameters. In an example, the third timing offset may indicate a portion of the propagation delay that the base station may pre-compensate. In another example, in an NTN scenario with a transparent NTN node, when the UL frame and DL frame is unaligned at the base station, the third timing offset may indicate the difference between the UL frame timing and the DL frame timing.

In an example, the one or more reference points may be used by the wireless device to determine the uplink timing synchronization, to measure/calculate the feeder link delay (for example without knowing the gateway's location), to measure/calculate the service link delay (or a portion of the service link delay), to indicate the UL/DL frame alignment, and/or to measure the epoch time of the satellite ephemeris parameters.

In an example, the first validity/validation window/period may indicate a validity period/window of the required location information (position) accuracy of the GNSS-acquired data. For example, the first validity window/period may indicate a maximum period in which an acquired GNSS location information (e.g., GNSS-acquired position), by the wireless device, stays valid (e.g., corresponding to required accuracy requirement and/or corresponding to a maximum tolerable error). In an example, the wireless device may restart the first validity window/period in response to or upon acquiring a new GNSS location information/data (position). In another example, based on determining that the first validity period/window being expired, the wireless device may acquire a new GNSS location information/data.

The wireless device may (re)start the first validity period/window upon the new GNSS location information being acquired.

Transmissions from different wireless devices in a cell/beam may need to be time-aligned at the base station and/or the NTN node (e.g., satellite) to maintain uplink orthogonality. In an example, time alignment/synchronization may be achieved by using different timing advance (TA) values at different wireless devices to compensate for their different propagation delays/RTDs. For example, the wireless device may calculate/measure/maintain a current TA value (and/or a UE-g NB RTT) based on at least a combination of a closed-loop TA procedure/control and an open-loop TA procedure/control. In an example, the closed-loop TA procedure/control may be based on receiving a TA command MAC CE from the base station or a TA (or an absolute TA) command field of a Msg2 1312 (or MsgB 1332). The wireless device may maintain/calculate a closed-loop TA value in response to receiving each TA command MAC CE. In an example, the open-loop TA procedure/control may require GNSS-acquired position of the wireless device and/or reading/acquiring the second configuration messages (e.g., via broadcast system information). In an example, the combination of the closed-loop TA control/procedure and the open-loop TA procedure/control may require resetting the (accumulative) closed-loop TA value to a predefined value (e.g., 0) when a new GNSS-acquired position becomes available and/or when the wireless device reads/acquires the broadcast system information (e.g., the second configuration messages). In an example, the combination of the closed-loop TA control and the open-loop TA control may be based on adding the open-loop TA value (e.g., derived/calculated based on the open-loop TA procedure/control) and the closed-loop TA value (or a portion of the closed-loop TA procedure/control).

In an example, the one or more TA-margins (if provided) may be used by the wireless device to compensate one or more errors induced by measuring/calculating (autonomously) the propagation delay and/or the current TA value at the wireless device. For example, the base station may configure the one or more TA-margins depending on pre-compensation accuracy requirement(s) and/or UL timing synchronization requirement(s). In an example, the wireless device for transmission of a preamble in a random access procedure may adjust the current TA value based on the one or more TA-margins. For example, when the one or more TA-margins not being provided, the wireless device may expect receiving a TA command (e.g., via the TAC field of a Msg2 1312 or MsgB 1332) with a positive value or a negative value (e.g., a bipolar TA command field) to account for an underestimate or overestimate of the propagation delay at the wireless device, respectively.

In an example, the satellite ephemeris parameters may comprise at least the satellite ephemeris data/information, an epoch time for the satellite ephemeris data, a second validity period/window (or a second validation period/window), and/or one or more drift rates corresponding to the satellite ephemeris data (e.g., indicating one or more variation rates of the satellite location/movement due, for example, to orbital decay/atmospheric drag). The wireless device may, based on an implemented orbital predictor/propagator model, may use the satellite ephemeris parameters to measure/calculate/maintain movement pattern of the satellite, estimate/measure the service link delay, and/or to adjust the current TA value via the open-loop TA procedure/control. In an example, the one or more drift rates may comprise a (first order) drift rate, a second-order drift rate or variation rate of the drift rate, and/or a third-order drift rate or variation rate of the second-order drift rate. In an example, the satellite ephemeris data/information may be configured in one or more satellite ephemeris formats.

In an example, the wireless device may maintain/calculate/update the propagation delay (or the service link delay or the open-loop TA value) over a period (e.g., the second validation window/period) using the satellite ephemeris parameters. For example, using the one or more drift rates of the satellite ephemeris parameters the wireless device may skip a frequent reading/acquiring of the second configuration messages. In another example, the wireless device may not require acquiring a new satellite ephemeris data based on the second validation period/window being running. The second validity period/window may indicate the validity time of the (satellite) ephemeris data/information. In an example, the second validity period/window may specify/indicate a maximum period/window (e.g., corresponding to an orbit predictor/propagator model the wireless device is using to estimate/calculate the propagation delay and/or a maximum tolerable error in estimating/measuring/calculating the open-loop TA value) during which the wireless device may not require to read/update/acquire the satellite ephemeris data. For example, upon or in response to acquiring a new satellite ephemeris data (or parameters), the wireless device may start/restart the second validity timers.

The common TA (or the common delay) parameters may indicate a common TA/delay (with a predefined granularity, for example, one slot or based on the granularity of the TAC MAC CE), a third validity period/window (or a third validation period/window or a common TA validation period/window), and/or one or more higher-order (e.g., a first-order and/or a second-order and/or a third-order) drift rates of the common TA. For example, the third validity period/window may indicate a maximum period during which the wireless device may not require to acquire the common TA for calculation of the propagation delay or the open-loop TA. According to an example, the third validity period/window may indicate a maximum period during which the wireless device may not require to acquire the second configuration messages. In an example, in response to determining the third validity window/period being absent from the second configuration messages, the wireless device may set the third validity window/period based on the second validity window/period (e.g., the validity window/period of the ephemeris data/information). For example, the second-order drift rate of the common TA may indicate the variation rate by which the drift rate of the common TA changes over a predefined window/period (e.g., the third validity window). In another example, when provided, a third-order drift rate of the common TA may indicate a variation rate corresponding to the second-order drift rate of the common TA by which the second-order drift rate of the common TA changes over a predefined window/period (e.g., the third validity window).

In an example, when the second validity period/window being configured, the wireless device may (re)start the second validity period/window after/in response to receiving/reading new satellite ephemeris data; and/or when the third validity period/window being configured, the wireless device may (re)start the third validity period/window upon/in response to reading/receiving new common TA parameters and/or a new common TA; and/or when the first validity window/period being configured, the wireless device may (re)start the first validity period/window after/in response to acquiring a new location information of the wireless device using GNSS data.

In an example, in response to determining that the second validity period/window being expired, the wireless device may acquire an updated satellite ephemeris data/information (e.g., via SIB); and/or in response to determining that the third validity window/period being expired, the wireless device may acquire an updated common TA/delay (e.g., via a SIB); and/or in response to determining that the first validity period/window being expired, the wireless device may acquire an updated GNSS location information.

In an example, in response to receiving/reading at least the updated satellite ephemeris data/information, and/or updated common TA/delay, and/or the updated GNSS location information, the wireless device may calculate/measure/update the current TA value (e.g., the open-loop procedure/control). In another example, the wireless device may update the current TA value based on the closed-loop TA procedure/control, for example, based on receiving the TAC MAC CE.

In an example, the wireless device may set the common TA/delay by zero in response to determining that the common TA/delay parameters are absent from the second configuration message. In another example, for an NTN with a transparent payload NTN node (e.g., LEO satellite), when the UL timing synchronization is held at the NTN node, the wireless device may not pre-compensate the common TA.

The base station may periodically broadcast (e.g., each 160 milliseconds) the second configuration messages and/or the third configuration messages (e.g., via a SIB). In some aspect, based on determining the validity period/window of the ephemeris data/information (and/or the validity period/window of the common TA) being configured and the validity period/window of the ephemeris data/information (and/or the validity period/window of the common TA) being larger than the periodicity of the second configuration messages, the wireless device may not require reading/acquiring the second configuration messages while the validity period/window of the ephemeris data/information (and/or the validity period/window of the common TA) is running. In an example, a periodicity by which the wireless device is required to read/acquire the second configuration messages may be determined (by the wireless device) at least based on whether at least one or more drift rates being configured (e.g., the one or more drift rates of the satellite ephemeris parameters and/or the one or more drift rates of the common TA parameters). For example, based on determining that the one or more drift rates of the common TA (and/or the one or more drift rates of the satellite ephemeris parameters) being configured, the wireless device may skip reading/acquiring the second configuration messages over a time window that the inaccuracy of the marinated/estimated propagation delay is considered/configured tolerable. In another example, based on determining the validity period/window of the ephemeris data/information (and/or the validity period/window of the common TA) not being configured, the wireless device may periodically read/acquire the second configuration messages.

In an example, based on determining at least one or more drift rates being provided (e.g., the drift rate of the satellite ephemeris and/or the drift rate of the common TA), the wireless device may (autonomously) adjust/update/recalculate the current TA value based on the at least one or more drift rates. The base station by providing the at least one or more drift rates and/or the at least one or more variation rates (via the second configuration messages) may reduce the signaling overhead for calculating/maintaining the open-loop TA value. For example, when the at least one or more drift rates are provided, the wireless device may maintain/track a change in the propagation delay (or the open-loop TA value) for a period (e.g., 3 seconds). For example, when the at least one or more drift rates are provided and the at least one or more variation rates of the at least one or more drift rates are provided, the wireless device may maintain/track a change in the propagation delay (or the open-loop TA value) for an extended period (e.g., 35 seconds). In an example, the base station may, to increase the capability of the wireless device to track/maintain the change in the propagation delay, indicate at least one or more configuration parameters, e.g., corresponding to a third order approximation of the feeder link delay, a third order approximation of the satellite movement, a third order approximation of the common delay, and the like.

As shown in FIG. 24, the wireless device may receive a timing offset 2430/2470 (e.g., at time T2 and/or at time T5). The timing offset may be calculated, by the base station, based on a receiving a TA reporting information (e.g., the current TA value, the propagation delay between the base station and the wireless device, the open-loop TA value, a portion of the open-loop TA that is autonomously calculated/maintained by the wireless device, the location information of the wireless device, a difference between the cell/beam-specific timing offset and the current TA value, and/or a difference between the UE-specific timing offset and the current TA value) from the wireless device 2420/2460. For example, the base station may calculate the timing offset based on the location information of the wireless device (if the location information of the wireless device is available at the base station).

The base station may provide the timing offset in order to improve UL data transmission latency/efficiency of the wireless device. For example, if the wireless device is located near the cell center or near a beam center (e.g., UE1 at FIG. 22), the difference between the cell/beam-specific timing offset and the propagation delay of the wireless device may become significant (e.g., close to the differential delay of the cell/beam). The wireless device may maintain/calculate the UE-specific timing offset (e.g., Koffset_UE) 2440/2480 based on the received timing offset 2440/2480. For example, the wireless device may set the UE-specific timing offset based on the timing offset (e.g., the timing offset is the same as the UE-specific timing offset). In another example, the wireless device may determine the UE-specific timing offset based on the timing offset (e.g., the timing offset is different than the UE-specific timing offset).

For example, upon receiving the timing offset 2430 at time T2 the wireless may determine the UE-specific timing offset is not available/maintained. In an example, the UE-specific timing offset may be available/maintained at the wireless device in response to receiving a timing offset from the base station prior to time T2 in FIG. 24. In an example, the UE-specific timing offset may not be available/maintained at the wireless device when the wireless device discards/deletes the UE-specific timing offset. In an example, the UE-specific timing offset may not be available/maintained at the wireless device based on not receiving the timing offset, from the base station, via one or more previous communications. For example, the UE-specific timing offset is available/maintained at the wireless device after an initial access procedure.

In response to receiving the timing offset 2430, the wireless device may calculate the UE-specific timing offset. Based on calculating the UE-specific timing offset at time T2, the UE-specific timing offset may become available/maintained from the one or more previous communications (e.g., the transmission at time T1 and/or the reception at time T2). In another example, upon receiving the timing offset

2470 at time T5 the wireless may determine the UE-specific timing offset is available/maintained from the one or more previous communications. Upon or in response to receiving the timing offset 2470, the wireless device may maintain/(re)calculate the UE-specific timing offset based on the timing offset and/or the maintained/available UE-specific timing offset. In an example, the wireless device may maintain/calculate the UE-specific timing offset based on the timing offset and/or the UE-specific timing offset and/or the third timing offset (if provided) and/or the cell/beam-specific timing offset.

In an example, in response to transmitting/reporting the TA reporting information 2420/2470, the wireless device may receive an RRC message or a MAC CE command comprising updating information corresponding to the timing offset. The wireless device may use the updating information to calculate/maintain the UE-specific timing offset 2440/2480. In an example, the wireless device may use the updating information and one or more broadcast information (e.g., the satellite ephemeris parameters and/or the common TA parameters) to calculate/maintain the UE-specific timing offset. In some aspect, the updating information may indicate the timing offset. For example, the updating information may indicate a difference between the cell/beam-specific timing offset and the timing offset. In another example, the updating information may indicate a difference between the UE-specific timing offset and the timing offset.

The timing offset may be indicated via an RRC signaling or a MAC CE command 2440/2480. For example, the RRC signaling may comprise an RRC reconfiguration message. According to an example, the MAC CE command may be a timing offset MAC CE command (e.g., Koffset_UE MAC CE command).

As shown in FIG. 24, the wireless device may transmit a TA reporting information to the base station 2420/2460. For example, the TA reporting information (e.g., a UE-specific TA information) may be based on the current TA value of the wireless device or the location information (position) of the wireless device. For example, when the TA reporting information is based on the current TA value, the TA reporting information may indicate at least one or the following: a portion of the propagation delay that is autonomously calculated/measured by the wireless device, a portion of the propagation delay that is pre-compensated by the wireless device, the service link delay, the propagation delay between the wireless device and a configured reference point (e.g., indicated based on the one or more reference points), and/or a difference between a calculated measure (e.g., based on the current TA value) by the wireless device and the UE-specific timing offset or the cell/beam-specific timing offset. In another example, the TA reporting information may be based on the location information of the wireless device, for example, a quantized location of the wireless device or a change in the position of the wireless device. The description provided regarding the TA reporting information should not be considered limited to examples provided in this disclosure. By way of the provided examples, several details of the exemplary set of embodiments regarding the TA reporting information are provided hereinabove. It will be recognized by those of skill in the art that any number of variations on or alternatives to the specific details of the exemplary embodiments may be implemented if desired.

The wireless device may transmit the TA reporting information via a MAC CE command (e.g., TA reporting MAC CE) or an RRC signaling (e.g., an RRC reconfiguration message) 2420/2460. In an example, the TA reporting information 2420 may be based on a network request (e.g., a MAC CE command and/or a DCI) or may be conducted during an initial access. As seen if FIG. 24, the TA reporting information 2460 may be based on a triggered TA reporting 2450.

In an example, the base station may configure a logical channel of the TA reporting information (e.g., corresponding to the RRC signaling or the MAC CE command). The base station may configure the logical channel of the TA reporting information with a pre-configured priority. The wireless device may transmit the TA reporting information via available UL-SCH resource(s). In an example, whether the UL-SCH resource(s) for transmitting the TA reporting information is available or not may be based on a logical channel prioritization procedure. For example, a configured grant (e.g., Type 1 and/or Type 2), random access procedure, and/or an SR for BSR procedure may be used for transmitting the TA reporting information.

For transmitting the TA reporting information during initial access (e.g., when the wireless device conducting/initiating random access in an RRC_IDLE state and/or an RRC_INACTIVE state), the wireless device may be configured (e.g., via the third configuration messages) to transmit the TA reporting information to the base station via random access procedure. In another example, during initial access, the wireless device may be configured to not transmit the TA reporting information to the base station via RA procedure. In an example, the wireless device may be configured to transmit the TA reporting information via a random access (RA) procedure when the wireless device is in an RRC_CONNECTED mode. In another example, the wireless device may not be configured to transmit the TA reporting information via a random access (RA) procedure when the wireless device is in an RRC_CONNECTED mode.

In an example, for an RRC_CONNECTED state, the third configuration messages (e.g., the TA reporting configuration) may configure the wireless device to report the TA reporting information in response to a reporting request (e.g., a DCI or a MAC CE) received from the base station. For example, based on receiving the reporting request the wireless device may calculate/measure the current TA and transmit TA reporting information. In another example, the third configuration messages (e.g., the TA reporting configuration) may configure the wireless device to periodically report the TA reporting information. For example, the third configuration messages (e.g., the TA reporting configuration) may indicate a periodicity by which the TA reporting information needs to be transmitted and/or UL-SCH resource(s) (e.g., Type 1 or Type 2 configured grants) for transmitting the TA reporting information.

According to an example, the TA reporting configuration may indicate at least one TA condition for triggering the TA reporting. For example, the at least one TA condition may indicate a first TA condition (e.g., based on a change in the current TA value) and/or a second TA condition (e.g., based on a difference between the UE-specific timing offset and the current TA value). In an example, the first TA condition may indicate whether the change in the current TA value (e.g., determined based on a difference between the current TA value and the previous TA value) is greater than a first threshold. For example, the previous TA value is calculated/measured before (in time) the current TA value. In an example, the previous TA value may correspond to a last TA reporting information. In another example, the first TA condition may indicate whether the current TA value is larger than a previous TA value and the change in the current TA value is greater (or smaller) than the first threshold (or a third threshold). The second TA condition may indicate whether the difference between the UE-specific offset and the current TA value is smaller than a second threshold.

As shown in FIG. 24, the wireless device may trigger a TA reporting at time T3 2450 based on the at least one TA condition being satisfied. In response to the triggered TA reporting, the wireless device may transmit the TA reporting information 2460 using the available UL-SCH resource(s). The wireless device may trigger the TA reporting based on the at least one TA condition.

The cell/beam-specific timing offset and/or the UE-specific timing offset may be used, by the wireless device, to ensure/guarantee the causality of an uplink grant scheduled by a DCI. In an example, using the cell/beam-specific timing offset and/or the UE-specific timing offset, the wireless device may determine timing of an UL transmission scheduled by a first DCI, a HARQ-ACK/NACK on PUCCH corresponding to a PDSCH scheduled by a second DCI, a HARQ-ACK on PUCCH corresponding to deactivation of semi-persistent scheduling indicated via a first PDCCH, a first transmission opportunity of a configured grant (e.g., Type 2 configured grant), and/or a PRACH occasion for transmission of a preamble ordered by a second PDCCH.

In an example, when the cell/beam-specific timing offset is available/maintained and/or the UE-specific timing offset is available/maintained from one or more previous communications (e.g., from the previous transmission 2430 or a new transmission 2470), the wireless device may use the cell/beam-specific timing offset to determine the transmission timing of a random access response (RAR) grant scheduled PUSCH (e.g., based on or in response to receiving a Msg2 1312 in a 4-step RA procedure); the transmission timing of a fallbackRAR grant scheduled PUSCH (e.g., based on or in response to receiving a MsgB 1332 in a two-step RA procedure); the transmission timing of a Msg3 1313 retransmission scheduled by a DCI format 0_0 having/with CRS scrambled by TC-RNTI; the transmission timing of HARQ-ACK on PUCCH indicating the success contention resolution (e.g., a contention resolution PDSCH scheduled by DCI format 0_1 having/with CRS scrambled by a TC-RNTI in an RA procedure or a contention resolution PDSCH scheduled by DCI format 0_1 having/with CRS scrambled by a TC-RNTI in a two-step RA procedure); and/or a PRACH occasion for transmission of a preamble ordered by a PDCCH.

For example, when the cell/beam-specific timing offset is available/maintained and/or the UE-specific timing offset is available/maintained, the wireless device may not use the second timing offset to determine the scheduling time of a PUSCH transmission that is scheduled by a RAR UL grant or a fallbackRAR UL grant for RACH procedure, or when PUSCH is scheduled with TC-RNTI. According to an example, when the cell/beam-specific timing offset is available/maintained and/or the UE-specific timing offset is available/maintained, the wireless device may use the UE-specific timing offset to determine the scheduling/transmission time of an UL grant that may not be a RAR grant scheduled or a fallbackRAR grant; the transmission timing of an aperiodic SRS scheduled by a first DCI; for a CSI reference resource timing corresponding to a CSI reference resource timing; the transmission timing of a CSI reporting over PUSCH scheduled by a second DCI, a HARQ-ACK/NACK on PUCCH corresponding to a contention resolution PDSCH scheduled by detecting a third DCI; a HARQ-ACK on PUCCH corresponding to deactivation of semi-persistent scheduling indicated via a PDCCH; and/or a first transmission opportunity of a configured grant (e.g., Type 2 configured grant). In an example, the third DCI may be a DCI format 0_1 having/with CRS scrambled by or a DCI format 0_1 having/with CRS scrambled by a TC-RNTI.

According to an example, when the cell/beam-specific timing offset is available/maintained and the UE-specific timing offset is available/maintained, the wireless device may use the UE-specific timing offset to determine a scheduling timing of an UL grant scheduled by a PDCCH that is addressed by a C-RNTI, MCS-RNTI, or CS-RNTI. In another example, when the cell/beam-specific timing offset is available/maintained and the UE-specific timing offset is available/maintained, the wireless device may use the UE-specific timing offset to determine a scheduling timing of a HARQ-ACK/NACK on PUCCH scheduled by a PDCCH that is not for at least one of TC-RNTI, RA-RNTI, and/or MSGB-RNTI.

In another example, using at least the cell/beam-specific timing offset and/or the UE-specific timing offset, the wireless device may ensure/guarantee a correct activation time (or the wireless assumption in a downlink configuration or the wireless assumption in an uplink configuration) of a MAC CE command (e.g., a PUCCH spatial relation activation/deactivation MAC CE, semi-persistent CSI reporting on PUCCH activation/deactivation MAC CE, TAC MAC CE, a periodic CSI trigger state subselection) based on a reception time of a PDSCH carrying the MAC CE command in the downlink configuration.

For example, for an uplink configuration, when the wireless device transmits a PUCCH with HARQ-ACK information in an uplink slot n (considering the TA value) corresponding to a PDSCH carrying a MAC CE command on the uplink configuration, the wireless device action and assumption on the downlink configuration may be applied starting from the first slot that is after slot $n+3N_{slot}^{subframe,\mu}$, where $\mu$ is the SCS configuration for the PUCCH. In an example, for a MAC CE command received in downlink slot n, where the command is used to indicate to the wireless device about an action in the downlink or an assumption on the downlink configuration, the wireless device may assume the command is activated in the downlink slot which is the first downlink slot after the uplink slot $n+k_1+3N_{slot}^{subframe,\mu}$, where TA is assumed to be zero, $k_1$ is determined based on the cell/beam-specific timing offset and/or the third timing offset (when the UL frame and the DL frame are not aligned at the base station) and/or the UE-specific timing offset (when the UE-specific timing offset is available/maintained), and the UL slot indexed by $n+k_1$ is the uplink slot where wireless device transmits HARQ-ACK corresponding to the received PDSCH carrying the MAC CE command.

For example, for an uplink configuration, when the wireless device transmits a PUCCH with HARQ-ACK information in an uplink slot n (considering the TA value) corresponding to a PDSCH carrying a MAC CE command on the uplink configuration, the wireless device action and assumption on the uplink configuration may be applied starting from the first slot that is after slot $n+3N_{slot}^{subframe,\mu}$, where $\mu$ is the SCS configuration for the PUCCH. For example, for a MAC CE command received in downlink slot n, where the command is used to indicate to the wireless device about an action in the uplink or an assumption on the uplink configuration, the wireless device may the command is activated in the uplink slot $n++3N_{slot}^{subframe,\mu}+1$, where TA is assumed to be zero, $k_1$ is determined based on the cell/beam-specific timing offset and/or the UE-specific timing offset, and the UL slot indexed by $n+k_1$ is the uplink slot where wireless device transmits HARQ-ACK corresponding to the received PDSCH carrying the MAC CE command.

According to an example, based on determining that the third timing offset is not zero, the wireless device may, by using the cell/beam-specific timing offset and the third timing offset, ensure/guarantee a correct activation time (or the wireless assumption in a downlink configuration) of the MAC CE command based on a reception time of a PDSCH carrying the MAC CE command in the downlink configuration. According to an example, based on determining that the third timing offset is not zero, the wireless device may, by using the cell/beam-specific timing offset and the third timing offset and the second timing offset, ensure/guarantee a correct activation time (or the wireless assumption in a downlink configuration) of a MAC CE command based on a reception time of a PDSCH carrying the MAC CE command in the downlink configuration. In an example, the MAC CE command may be one of PUCCH spatial relation activation/deactivation MAC CE, semi-persistent CSI reporting on PUCCH activation/deactivation MAC CE, TAC MAC CE, a periodic CSI trigger state subselection, TCI state indication for UE-specific PDCCH MAC CE, and/or TCI state activation/deactivation for UE-specific PDSCH MAC CE.

As mentioned above and shown in FIG. 24, when the wireless device communicates with the base station via a non-terrestrial network (NTN), the base station may configure the wireless device with the at least one TA condition for triggering the TA reporting (e.g., via the one or more configuration messages 2410). The wireless device may, based on the TA reporting being triggered 2450, transmit the TA reporting information 2420/2460, e.g., the current TA value or the location information of the wireless device. In response to transmitting the TA reporting information, the wireless device may receive the timing offset 2430/2470. Transmission of the TA reporting information may be based on the RRC message/signaling or a MAC CE (e.g., the MAC CE command). For example, in response to transmitting the TA reporting information, the wireless device may maintain/calculate the UE-specific timing offset based on receiving the timing offset 2480.

In the implementation of existing technologies, in an NTN scenario with a large cell/beam (e.g., 200-3500 km in case of GEO satellite) accommodating many wireless devices (e.g., 10, 50, 100, 500, or 1000), the base station may determine an increased load in the cell/beam, for example, when several wireless devices transmit their corresponding TA reporting information and/or when the base station transmits one or more timing offsets (each timing offset may correspond to each wireless device in the cell/beam). In an example, after receiving a number of TA reporting information (e.g., three TA reporting information) from the wireless device, the base station may be able to estimate/measure the location of the wireless device with a sufficient accuracy. The base station may use the estimated/measured location information to calculate the timing offset for consecutive communications with the wireless device. This may result in further transmissions of the TA reporting information, from the wireless device, to become unnecessary (or wasteful), to increase the load on the cell/beam, and/or to increase the power consumption of the wireless device. For an NTN scenario with a large cell/beam accommodating many wireless devices, enhancements may be required for flexibly managing the TA reporting, for example, to balance the load of the cell/beam and/or to reduce a possibility of unnecessarily transmitting the TA reporting information by one or more wireless devices.

According to embodiments of the present disclosure, the wireless device may initiate a TA reporting procedure in response to receiving a first command (e.g., a MAC CE command and/or a DCI and/or a RRC signaling/message) from the base station. The first command may indicate initiation/triggering/activation of the TA reporting procedure. For example, the TA reporting procedure may be configured/indicated by the TA reporting configuration. The wireless device may, in response to receiving a second command (e.g., a MAC CE command and/or a DCI or a RRC signaling/message), deactivate the TA reporting procedure. The second command may indicate deactivation/stopping/cancellation/suspension of the TA reporting procedure. Example embodiments may allow the base station to activate the TA reporting procedure in order to improve the performance of the wireless device (e.g., reducing the data transmission latency). By deactivating the TA reporting procedure, the base station may reduce the load on the cell/beam (e.g., via trading off a lower load on the cell/beam with a higher data transmission latency of the wireless device). For example, based on the TA reporting being deactivated, the wireless device may not transmit the TA reporting information. Example embodiments allow the wireless device to reduce a possibility of unnecessarily transmitting the TA reporting information.

In an example embodiment, the wireless device may start the window/timer based on initiating/triggering the TA reporting procedure. During/while the timer/window is running, the wireless device may determine whether the at least one TA condition being satisfied to trigger a TA reporting. Example embodiments may reduce power consumption of the wireless device for triggering the TA reporting. Based on certain aspects of this disclosure, the wireless device may (autonomously) deactivate the TA reporting procedure (e.g., not based on receiving the second command). For example, upon (or in response to) the expiry of the timer/window, the wireless device may (automatically/autonomously) deactivate (e.g., stop or abort or cancel) the TA reporting procedure. In another example, the wireless device based on determining the number of times that the TA reporting information is transmitted, while/during the timer/window is running, may (autonomously) deactivate the TA reporting procedure. Example embodiments may reduce signaling overhead for deactivating the TA reporting; may reduce the transmission power of the wireless device for transmitting the TA reporting information; may reduce the load on the cell/beam for transmitting the TA reporting information; and/or may improve the fairness among one or more wireless devices. For example, by configuring, by the base station, the number of times that the TA reporting information is transmitted by the wireless device, the base station may improve the fairness among the one or more wireless devices.

In an example embodiment, the TA reporting information may be based on one of the following: the location information of the wireless device and the RRC signaling (or the RRC message); the location information of the wireless device and the MAC CE command; the current TA value and the RRC signaling; the current TA value and the MAC CE command. For example, the TA reporting configuration may indicate/configure whether the TA reporting information is based on the location information of the wireless device and/or the current TA value of the wireless device; and/or whether the TA reporting information is based on the RRC signaling and/or the MAC CE command. In an example embodiment, a first command may indicate whether the TA reporting information is based on the location information of the wireless device and/or the current TA value of the wireless device; and/or whether the TA reporting information is based on the RRC signaling and/or the MAC CE command. Example embodiments may increase flexibility of the base station for configuring the TA reporting information based on one or more communication requirements, for example, the integrity/privacy requirement of the TA reporting information and/or the latency requirement of the TA reporting information and/or a type of an NTN node (e.g., a GEO satellite or a LEO satellite).

In an example embodiment, the TA reporting configuration may configure/indicate a first default/baseline TA reporting information and/or a second default/baseline TA reporting information. For example, the second default/baseline TA reporting information may be one of the location information of the wireless device or the current TA value of the wireless device. For example, the first default/baseline TA reporting information may be one of the RRC signaling or the MAC CE command. In an example embodiment, a first command may not indicate whether the TA reporting information is based on the location information of the wireless device and/or the current TA value of the wireless device; and/or whether the TA reporting information is based on the RRC signaling and/or the MAC CE command. Example embodiments may allow reducing the signaling overhead for initiating the TA reporting procedure. The wireless device may, in response to receiving the first command, transmit a TA reporting information based on the first default/baseline TA reporting information and/or the second default/baseline TA reporting information.

In an example embodiment, the TA reporting configuration may configure the wireless device with the at least one TA condition comprising the first TA condition and the second TA condition. A first command may initiate the TA reporting procedure based on the first TA condition, or the second TA condition, or both. In an example embodiment, the TA reporting configuration may configure a baseline/default TA condition (either the first TA condition or the second TA condition). The wireless device may, based on receiving a first command not indicating either the first TA condition or the second TA condition for triggering the TA reporting, initiate the TA reporting procedure based on the default/baseline TA condition. Example embodiments may improve the flexibility of the base station for initiating the TA reporting procedure (e.g., based on the first TA condition and/or the second TA condition) and/or may reduce the signaling overhead for initiating the TA reporting procedure.

Based on certain aspects of this disclosure, in response to determining that an initiation of the TA reporting procedure via receiving a timing offset is enabled/configured, the wireless device may (autonomously) initiate the TA reporting procedure (e.g., not based on receiving the first command) in response to receiving the timing offset. For example, the TA reporting configuration may indicate/configure the initiation of the TA reporting via receiving the timing offset. In response to not receiving the timing offset upon the expiry of the first timer/window, the wireless device may (autonomously) deactivate the TA reporting procedure. By autonomously activating and/or deactivating the TA reporting procedure, the signaling overhead for initiating and/or deactivating the TA reporting procedure may be reduced.

Figure 25:
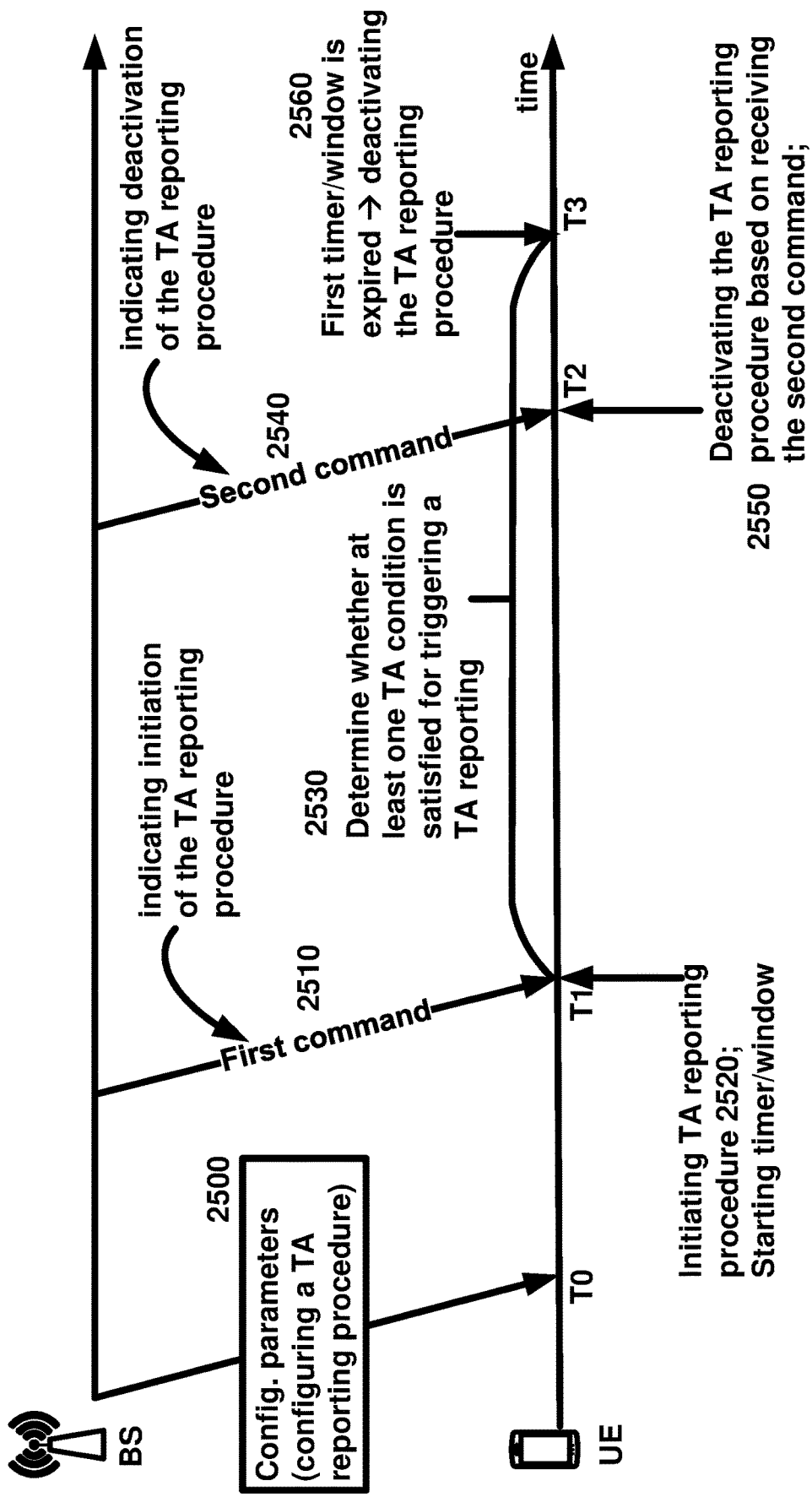
FIG. 25 shows an example embodiment of a wireless device communicating with a base station in a NTN.

FIG. 25 shows an example embodiment of a wireless device communicating with a base station in a non-terrestrial network (NTN). The wireless device may receive the one or more configuration messages 2410 from the base station at time TO in FIG. 25. The one or more configuration messages may comprise one or more configuration parameters 2500. The one or more configuration parameters may be, for example, for configuring a TA reporting procedure. The one or more configuration parameters may comprise the TA reporting configuration, e.g., the at least one TA condition for triggering the TA reporting.

In an example embodiment, the wireless device may receive, from the base station, a first command 2510 at time T1 in FIG. 25. The first command may indicate initiation/triggering/activation of the TA reporting procedure. For example, the first command may be based on a MAC CE command (or a MAC CE) and/or a DCI and/or a RRC signaling (or RRC message). The wireless device may, in response to receiving the first command, initiate (e.g., activate or start or trigger) the TA reporting procedure. In an example, the TA reporting procedure may comprise at least one or more of the following 2530: determining whether the at least one TA condition being satisfied; triggering a TA reporting 2450 based on the at least one TA condition being satisfied; and/or transmitting a TA reporting information 2420/2460 based on the triggered TA reporting. For example, the wireless device may receive the timing offset based on transmitting the TA reporting information. The wireless device may calculate/maintain the UE-specific timing offset based on receiving the timing offset from the base station.

As shown in FIG. 25, the wireless device may start the timer/window based on initiating the TA reporting 2520 for determining whether a TA reporting being triggered. The wireless device may trigger the TA reporting based on the at least one TA condition being satisfied. In an example, during the timer/window is running, in response to determining the TA reporting is triggered, the wireless device may transmit a TA reporting information.

For example, during the timer/window is running, the wireless device may trigger the TA reporting one or more times. Corresponding to each triggered TA reporting, the wireless device may transmit the TA reporting information based on the timer/window being running.

According to an example, corresponding to a triggered TA reporting, the wireless device may refrain from transmitting the TA reporting information is response to determining the timer/window is stopped/expired. For example, the wireless device may not transmit the TA reporting based on the timer/window being stopped/expired.

In an example, during the timer/window is running, the wireless device may not trigger the TA reporting, e.g., when the at least one TA condition not being satisfied.

In an example embodiment, the wireless device may receive a second command 2540 during the timer/window is running. The second command may indicate deactivation (or suspension or abortion or cancelation) of the initiated TA reporting procedure. For example, the second command may be based on a MAC CE command and/or a DCI and/or a RRC signaling (or a RRC message). In an example, based on receiving the second command, the wireless device may deactivate (or stop or suspend or abort) the TA reporting procedure 2550. Based on the TA reporting procedure being deactivated, the wireless device may stop the timer/window.

In an example, the wireless device may not receive the second command during the timer/window is running. As shown in FIG. 25, based on expiry of the timer/window the wireless device may (automatically/autonomously) deactivate the TA reporting procedure 2560.

The wireless device may trigger a TA reporting during the timer/window is running. In an example embodiment, the wireless device may cancel the triggered TA reporting based on the TA reporting procedure being deactivated.

For example, in response to the TA reporting procedure being deactivated, the wireless device may refrain from triggering a TA reporting. For example, the wireless device may not trigger the TA reporting based on the TA reporting procedure being deactivated. Based on the TA reporting procedure being deactivated, the wireless device may not determine whether the at least one TA condition is satisfied. In an example, based on the timer/window not being running, the wireless device may not determine whether the at least one TA condition is satisfied.

According to an example, during the timer/window is running, the wireless device may trigger a TA reporting based on the at least one TA condition being satisfied. The wireless device may not transmit a TA reporting information upon (or in response) the deactivation of the TA reporting procedure (e.g., the expiry of the timer/window).

According to an example, during/while the timer/window is running, the wireless device may trigger a TA reporting based on the at least one TA condition being satisfied. The wireless device may transmit a TA reporting information based on the triggered TA reporting. For example, the wireless device may receive the second offset. In an example embodiment, in response to receiving the second offset, the wireless device may restart the timer/window. For example, in response to receiving the second offset, the wireless device may restart the timer/window based on determining an initiation/activation of the TA reporting procedure is enabled/configured (e.g., via the one or more configuration parameters).

According to an example, during/while the timer/window is running, the wireless device may trigger a TA reporting based on the at least one TA condition being satisfied. The wireless device may transmit a TA reporting information based on the triggered TA reporting. For example, the wireless device may receive the second offset. In an example embodiment, in response to receiving the second offset, the wireless device may not restart the timer/window. For example, in response to receiving the second offset, the wireless device may not restart the timer/window based on determining an initiation/activation of the TA reporting procedure is not enabled/configured (e.g., via the one or more configuration parameters). In another example, in response to receiving the second offset, the wireless device may not restart the timer/window based on determining an initiation/activation of the TA reporting procedure is disabled (e.g., via the one or more configuration parameters). According to an example, in response to receiving the second offset, the wireless device may not restart the timer/window based on determining an initiation/activation of the TA reporting procedure is enabled/configured (e.g., via the one or more configuration parameters) and the TA reporting procedure is initiated based on receiving the first command.

In an example, during the timer/window is running the wireless device may trigger a TA reporting based on the at least one TA condition being satisfied. The wireless device may transmit a TA reporting information via one or more available UL-SCH resource(s). The one or more available UL-SCH resources may be based on a Type 1 configured grant and/or a Type 2 configured grant and/or a dynamic grant scheduled by a DCI. In an example, the one of more available UL-SCH resources may be based on a SR for BSR procedure. In another example, the one or more available UL-SCH resources may be based on one or more logical channel prioritization restrictions. In an example, the wireless device may trigger/initiate a random access (RA) procedure to transmit the TA reporting information via the RA procedure. For example, the wireless device may transmit the TA information via the RA procedure based on transmitting a MsgA payload 1342 comprising the TA reporting information (e.g., based on the RA procedure being a 2-step RA procedure). In another example, the wireless device may transmit the TA information via the RA procedure based on transmitting a Msg3 1313 comprising the TA reporting information (e.g., based on the RA procedure being a 4-step RA procedure). According to an example, the wireless device may transmit the TA reporting information via the RA procedure based on transmitting the TA reporting information via an UL grant indicated by a MsgB 1332 (e.g., based on the RA procedure being a 2-step RA procedure). In another example, the wireless device may transmit the TA information via the RA procedure based on transmitting the TA reporting information via an UL grant indicated by a Msg4 1314 (e.g., based on the RA procedure being a 4-step RA procedure).

In an example, during the timer/window is running, the wireless device may trigger a TA reporting based on the at least one TA condition being satisfied. In response to the triggered TA reporting, the wireless device may trigger/initiate the RA procedure for transmitting the TA reporting information. In an example, while the RA procedure is ongoing, the wireless device may determine that the TA reporting procedure is deactivated (e.g., due to the expiry of the timer/window or receiving the second command). In response to the TA reporting procedure being deactivated, the wireless device may stop the RA procedure.

In an example, during the timer/window is running, the wireless device may trigger a TA reporting based on the at least one TA condition being satisfied. In response to the triggered TA reporting, the wireless device may trigger a SR (e.g., the SR for BSR procedure). For example, the wireless device may trigger SR in response to triggering a BSR (e.g., the first type of BSR or the regular BSR). Based on transmitting the SR, the wireless device may start a SR prohibit timer and monitor one or more PDCCH candidates for receiving an UL grant. For example, when the SR is pending (is not canceled), the wireless device may determine the TA reporting procedure is deactivated (e.g., due to the expiry of the timer/window or receiving the second command). In response to the TA reporting procedure being deactivated, the wireless device may perform one or more of the following: based on determining the SR prohibit timer being running; stopping the SR prohibit timer; canceling the triggered SR; and/or canceling the BSR triggering the SR.

The UE-specific timing offset may be available/maintained 2440, for example, from one or more previous transmissions 2420/2430. For example, the one or more previous transmissions may comprise one or more UL transmissions for transmitting a TA reporting information and/or one or more DL transmissions for receiving a timing offset. For example, the UE-specific timing offset may be available/maintained at the wireless device from receiving the timing offset 2430/2460. In an example embodiment, the wireless device may, in response to the TA reporting procedure being deactivated (e.g., due to the expiry of the timer/window or receiving the second command), discard/delete the UE-specific timing offset. In response to discarding/deleting the UE-specific timing offset, the wireless device may determine the scheduling timing of an UL grant scheduled by a DCI based on the cell/beam-specific timing offset. For example, the DCI may have CRC parity bits scrambled by a C-RNTI or MCS-RNTI or CS-RNTI. In another example, the UL grant may not be a fallbackRAR grant scheduled PUSCH or a RAR grant scheduled PUSCH. In an example, in response to discarding/deleting the UE-specific timing offset, the wireless device may use the cell/beam-specific timing offset to determine a scheduling timing of a HARQ-ACK/NACK on PUCCH scheduled by a PDCCH that is not addressed by at least one of TC-RNTI, RA-RNTI, and/or MSGB-RNTI. In an example, in response to discarding/deleting the UE-specific timing offset, the wireless device may determine the action time (or an assumption in the uplink configuration or an assumption in the downlink configuration) of a MAC CE command at least based on the cell/beam-specific timing offset (and/or the third timing offset) and a reception time of a PDSCH carrying/with the MAC CE command in the downlink configuration.

The base station may, by initiating (e.g., via transmitting the first command) the TA reporting procedure, improve the data transmission latency of the wireless device. After receiving a number of TA reporting from the wireless device, the base station may deactivate the TA reporting procedure. The base station may, by deactivating (e.g., via transmitting the second command) the TA reporting procedure, control/manage the TA reporting load on the cell/beam. For example, when many wireless devices (e.g., 10, 50, 100, 500) attempt to transmit the TA reporting information (e.g., causing congestion in the cell/beam), the base station may deactivate the TA reporting procedure for one or more wireless devices. In another example, when one or more wireless devices are located close to each other in the cell/beam, the base station may initiate the TA reporting procedure for a first wireless device of the one or more wireless devices and may deactivate the TA reporting procedure for the rest of the one or more wireless devices. The base station may determine the timing offset that is applicable for the one or more wireless devices based on receiving a TA reporting information from the first wireless device.

An advantage of (autonomously) deactivating the TA reporting procedure, by the wireless device, based on the expiry of the timer/window, may be a reduction of the signaling overhead. For example, the base station does not require to transmit the second command to deactivate the TA reporting procedure at the wireless device.

Figure 26:
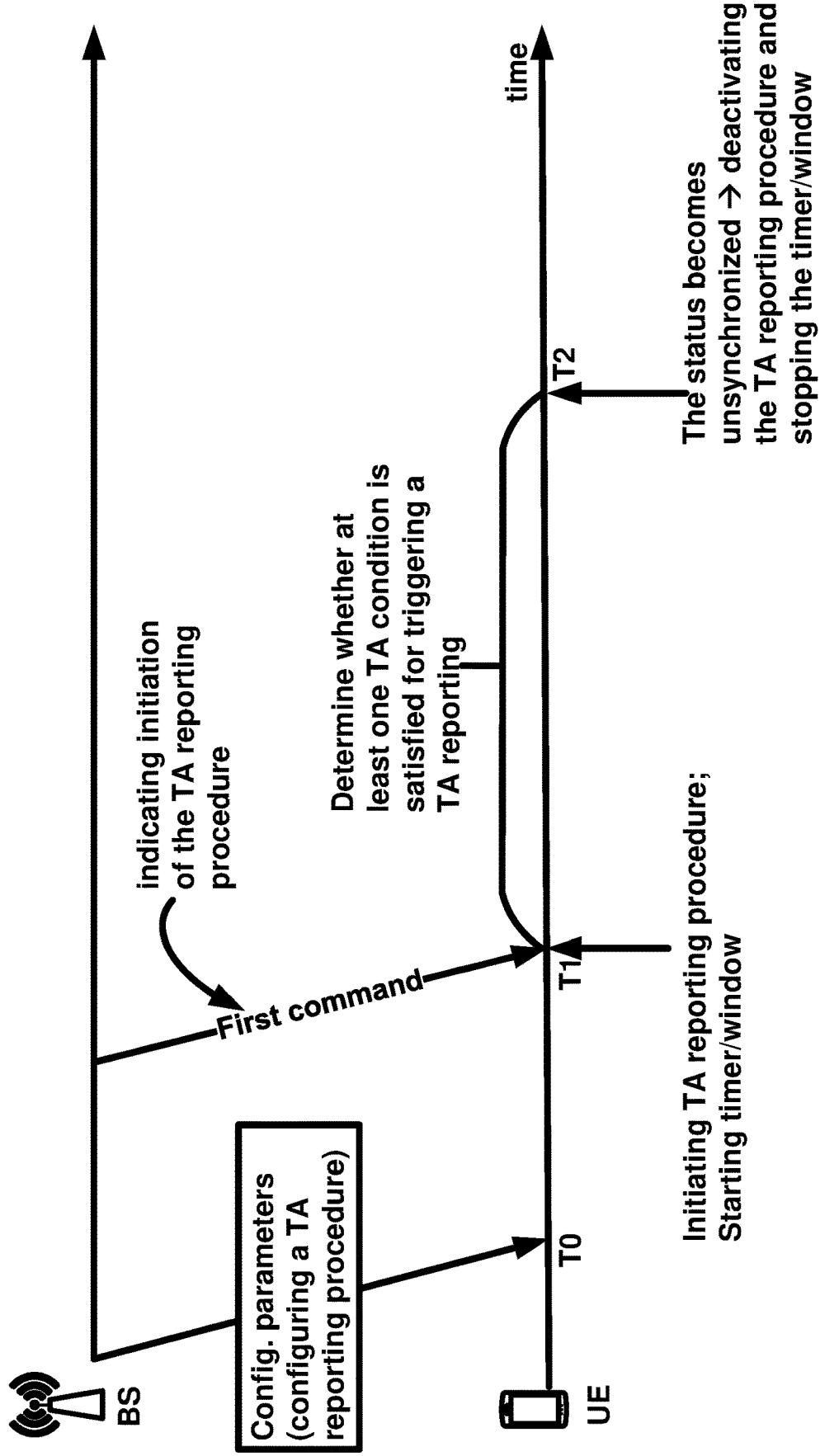
FIG. 26 shows an example embodiment of a wireless device communicating with a base station in an NTN.

FIG. 26 shows an example embodiment of a wireless device communicating with a base station in a non-terrestrial network (NTN). The wireless device may receive the one or more configuration messages 2410 from the base station at time TO in FIG. 26. The one or more configuration messages may comprise the one or more configuration parameters 2500. The one or more configuration parameters may be, for example, for configuring a TA reporting procedure. The one or more configuration parameters may comprise the TA reporting configuration, e.g., the at least one TA condition for triggering the TA reporting.

In an example embodiment, the wireless device may receive, from the base station, a first command 2510 at time T1. The first command may indicate initiation of the TA reporting procedure. As shown in FIG. 26, the wireless device may start the timer/window based on initiating the TA reporting 2520 for determining whether a TA reporting being triggered. In an example, during the timer/window is running, in response to determining the TA reporting is triggered, the wireless device may transmit a TA reporting information 2530.

As shown in FIG. 26, during the timer/window is running, the wireless device may determine at time T2 that the wireless device's status is unsynchronized (or out-of-sync). For example, the wireless device may determine its status is unsynchronized based on at least one or more of the following: a time alignment timer (e.g., the timeAlignment-Timer) being stopped/expired; the first validity/validation timer/window corresponding to the GNSS-acquired location information being expired/stopped (when the first validity/validation timer/window being configured) and the wireless device is unable to acquire a new GNSS-acquired location information; the second validity/validation timer/window corresponding to the satellite ephemeris parameters being expired/stopped (when the second validity/validation timer/being configured) and the wireless device is unable to acquire/read new satellite ephemeris parameters; and/or the third validity/validation timer/window corresponding to the common TA/delay being expired/stopped (when the second validity/validation timer/window being configured) and the wireless device is unable to acquire/read new common TA/delay parameters. In an example embodiment, in response to determining the wireless device is unsynchronized, the wireless device may deactivate the TA reporting procedure (at time T2 in FIG. 26). The wireless device may stop the timer/window based on the TA reporting procedure being deactivated.

In an example embodiment, in response to determining the wireless device is unsynchronized, the wireless device may trigger/initiate a random access (RA) procedure. For example, the wireless device may transmit a TA reporting procedure via the RA procedure. According to an example, the wireless device may deactivate the TA reporting procedure based on triggering/initiating the RA procedure. The wireless device may stop the timer/window based on the TA reporting procedure being deactivated.

In an example, the wireless device may not become unsynchronized based on determining the new satellite ephemeris parameters are not acquired upon the expiry of the second validity timer/window. For example, for calculating/measuring the current TA value, the wireless device may tolerate the expiry of the second validity period/window. According to an example, using configured drift rates (e.g., indicated/configured via the satellite ephemeris parameters), the wireless device may compensate for the expiry of the second validity window/period. For example, the wireless device may, based on the configured drift rates and/or an implemented propagator model at the wireless device and/or the TA-margin errors, estimate/calculate the open-loop TA value without acquiring the new satellite ephemeris parameters. Based on estimating/calculating the open-loop TA value, the wireless device may not become unsynchronized. In an example, based on estimating/calculating the open-loop TA value, the wireless device may restart the second validity timer/window.

In an example, the wireless device may not become unsynchronized based on determining that the common TA parameters are not acquired upon the expiry of the third validity timer/window. For example, for calculating/measuring the current TA value, the wireless device may tolerate the expiry of the third validity period/window. According to an example, using the configured drift rates indicated via the common TA parameters, the wireless device may compensate for the expiry of the third validity window/period. In an example, the wireless device may, based on the configured drift rates and/or an implemented propagator model at the wireless device and/or the configured TA-margin errors, estimate/calculate the open-loop TA value without acquiring the common TA parameters. Based on estimating/calculating the open-loop TA value, the wireless device may not become unsynchronized. In an example, based on estimating/calculating the open-loop TA value, the wireless device may restart the third validity timer/window.

Figure 27:
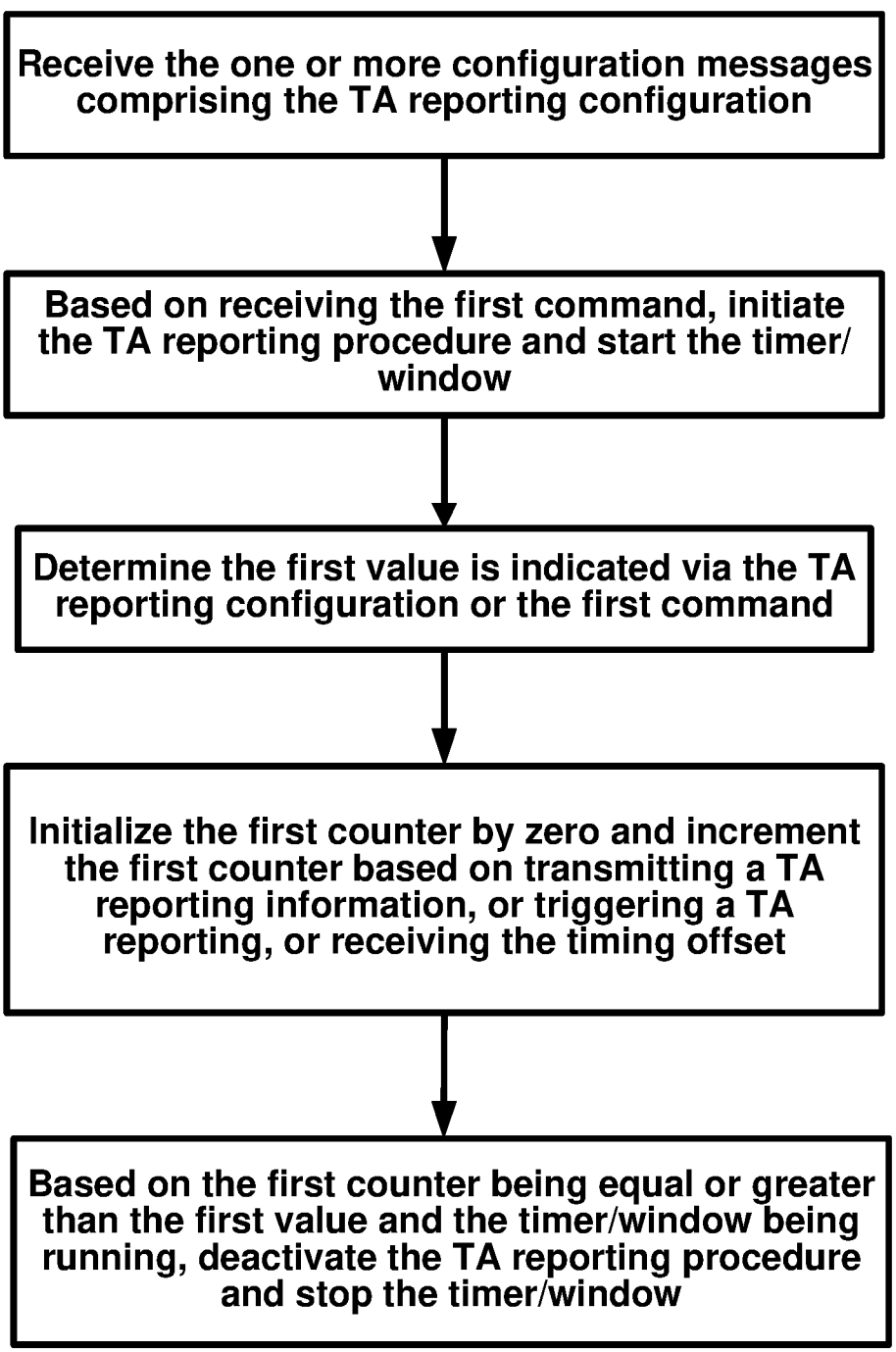
FIG. 27 shows an example embodiment of a wireless device communicating with a base station in an NTN.

FIG. 27 shows an example embodiment of a wireless device communicating with a base station in a non-terrestrial network (NTN). The wireless device may receive the one or more configuration messages 2410 from the base station. The one or more configuration messages may comprise one or more configuration parameters 2500. The one or more configuration parameters may be, for example, for configuring a TA reporting procedure. The one or more configuration parameters may comprise the TA reporting configuration, e.g., the at least one TA condition for triggering the TA reporting.

In an example embodiment, the wireless device may receive, from the base station, a first command 2510. For example, the first command may indicate initiation of the TA reporting procedure. In response to receiving the first command, the wireless device may initiate the TA reporting procedure. As shown in FIG. 27, the wireless device may start the timer/window based on initiating the TA reporting 2520 for determining whether a TA reporting being triggered. In an example, during the timer/window is running, in response to determining the TA reporting is triggered, the wireless device may transmit a TA reporting information.

In an example embodiment, the TA reporting configuration may indicate/configure a first value. For example, the first value may indicate a maximum number of times that the TA reporting information is transmitted during the timer/window is running. In an example embodiment, based on the first value being configured/indicated, the wireless device may initialize a first counter by zero based on the TA reporting procedure being initiated. For example, during the timer/window is running, in response to triggering a TA reporting the wireless device may transmit the TA reporting information. The wireless device may increment the first counter based on transmitting the TA reporting information. For example, during the timer/window is running, the wireless device may perform at least one of the following: in response to determining the first counter being smaller than the first value, transmitting a TA reporting information based on a triggered TA reporting; and/or in response to determining the first counter being equal or greater than the first value, deactivating the TA reporting procedure. In response to the TA reporting procedure being deactivated, the wireless device may stop the timer/window.

In an example embodiment, the TA reporting configuration may not indicate/configure the first value. For example, the first command may indicate initiation of the TA reporting procedure and the first value. The first value may indicate the maximum number of times that the TA reporting information is transmitted during the timer/window is running. In an example embodiment, based on the first value being indicated by the first command, the wireless device may initialize a first counter by zero based on the TA reporting procedure being initiated. For example, during the timer/window is running, in response to triggering a TA reporting the wireless device may transmit the TA reporting information. The wireless device may increment the first counter based on transmitting a TA reporting information. For example, during the timer/window is running, the wireless device may perform at least one of the following: in response to determining the first counter being smaller than the first value, transmitting a TA reporting information based on a triggered TA reporting; and/or in response to determining the first counter being equal or greater than the first value, deactivating the TA reporting procedure. In response to the TA reporting procedure being deactivated, the wireless device may stop the timer/window.

In an example embodiment, the TA reporting configuration may indicate/configure a first value. For example, the first value may indicate a maximum number of times that a TA reporting is triggered during the timer/window is running. In an example embodiment, based on the first value being configured/indicated, the wireless device may initialize a first counter by zero based on the TA reporting procedure being initiated. For example, during the timer/window is running, in response to triggering a TA reporting the wireless device may increment the first counter. For example, during the timer/window is running, the wireless device may perform at least one of the following: in response to determining the first counter being smaller than the first value, triggering a TA reporting based on the at least one TA condition being satisfied; in response to determining the first counter being equal or greater than the first value, not triggering a TA reporting based on the at least one TA condition being satisfied; and/or in response to determining the first counter being equal or greater than the first value, the wireless device may deactivate the TA reporting procedure. In response to the TA reporting procedure being deactivated, the wireless device may stop the timer/window.

In an example embodiment, the TA reporting configuration may not indicate/configure the first value. For example, a first command may indicate initiation of the TA reporting procedure and the first value. The first value may indicate the maximum number of times that the TA reporting is triggered during the timer/window is running. In an example embodiment, based on the first value being indicated by the first command, the wireless device may initialize a first counter by zero based on the TA reporting procedure being initiated. For example, during the timer/window is running, in response to triggering a TA reporting the wireless device may increment the first counter. For example, during the timer/window is running, the wireless device may perform at least one of the following: in response to determining the first counter being smaller than the first value, triggering a TA reporting based on the at least one TA condition being satisfied; in response to determining the first counter being equal or greater than the first value, not determining whether the at least one TA condition being satisfied; in response to determining the first counter being equal or greater than the first value, not triggering a TA reporting based on the at least one TA condition being satisfied; and/or in response to determining the first counter being equal or greater than the first value, the wireless device may deactivate the TA reporting procedure. In response to the TA reporting procedure being deactivated, the wireless device may stop the timer/window.

In an example embodiment, the TA reporting configuration may indicate/configure a first value. For example, the first value may indicate a maximum number of times that the timing offset is received during the timer/window is running. In an example embodiment, based on the first value being configured/indicated, the wireless device may initialize a first counter by zero based on the TA reporting procedure being initiated. For example, during the timer/window is running, in response to receiving a timing offset, the wireless device may increment the first counter.

According to an example, while the timer/window is running, in response to receiving the timing offset and determining the first counter being equal or greater than the first value, the wireless device may not restart the timer/window based on an initiation of the TA reporting procedure is enabled/configured (e.g., via the one or more configuration parameters). For example, while the timer/window is running, in response to receiving the timing offset and determining the first counter being equal or greater than the first value, the wireless device may not restart the timer/window based on an initiation of the TA reporting procedure is disabled or is not enable/configured (e.g., via the one or more configuration parameters). In an example, while the timer/window is running, in response to receiving the timing offset and determining the first counter being smaller than the first value and the TA reporting procedure being initiated based on receiving the first command, the wireless device may not restart the timer/window based on an initiation of the TA reporting procedure is enabled/configured (e.g., via the one or more configuration parameters).

According to an example, while the timer/window is running, in response to receiving the timing offset and determining the first counter being smaller than the first value, the wireless device may not restart the timer/window based on an initiation of the TA reporting procedure is disabled or is not enable/configured (e.g., via the one or more configuration parameters). In an example, while the timer/window is running, in response to receiving the timing offset and determining the first counter being smaller than the first value, the wireless device may restart the timer/window based on an initiation of the TA reporting procedure is enabled/configured (e.g., via the one or more configuration parameters).

For example, during the timer/window is running, the wireless device may perform at least one of the following: in response to determining the first counter being smaller than the first value, triggering a TA reporting based on the at least one TA condition being satisfied; and/or in response to determining the first counter being equal or greater than the first value, deactivating the TA reporting procedure. In response to the TA reporting procedure being deactivated, the wireless device may stop the timer/window.

In an example embodiment, the TA reporting configuration may not indicate/configure the first value. For example, a first command may indicate initiation of the TA reporting procedure and the first value. The first value may indicate the maximum number of times that the timing offset is received during the timer/window is running. In an example embodiment, based on the first value being indicated by the first command, the wireless device may initialize a first counter by zero based on the TA reporting procedure being initiated. For example, during the timer/window is running, in response to receiving a timing offset, the wireless device may increment the first counter. For example, during the timer/window is running, the wireless device may perform at least one of the following: in response to determining the first counter being smaller than the first value, triggering a TA reporting based on the at least one TA condition being satisfied; and/or in response to determining the first counter being equal or greater than the first value, deactivating the TA reporting procedure. In response to the TA reporting procedure being deactivated, the wireless device may stop the timer/window.

According to an example, while the timer/window is running, in response to receiving the timing offset and determining the first counter being equal or greater than the first value, the wireless device may not restart the timer/window based on an initiation of the TA reporting procedure is enabled/configured (e.g., via the one or more configuration parameters). For example, while the timer/window is running, in response to receiving the timing offset and determining the first counter being equal or greater than the first value, the wireless device may not restart the timer/window based on an initiation of the TA reporting procedure is disabled or is not enable/configured (e.g., via the one or more configuration parameters). In an example, while the timer/window is running, in response to receiving the timing offset and determining the first counter being smaller than the first value and the TA reporting procedure being initiated based on receiving the first command, the wireless device may not restart the timer/window based on an initiation of the TA reporting procedure is enabled/configured (e.g., via the one or more configuration parameters).

According to an example, while the timer/window is running, in response to receiving the timing offset and determining the first counter being smaller than the first value, the wireless device may not restart the timer/window based on an initiation of the TA reporting procedure is disabled or is not enable/configured (e.g., via the one or more configuration parameters). In an example, while the timer/window is running, in response to receiving the timing offset and determining the first counter being smaller than the first value, the wireless device may restart the timer/window based on an initiation of the TA reporting procedure is enabled/configured (e.g., via the one or more configuration parameters).

Based on determining a first value being configured/indicated (e.g., via the TA reporting configuration or via the first command) and a first counter being equal or greater than the first value, the wireless device may (autonomously) deactivate the TA reporting procedure. The first counter may, during the timer/window is running, count the number of times the wireless device transmits a TA reporting information, the number of times the wireless device triggers a TA reporting, or the number of times the wireless device receives, from the base station, the timing offset. One or more advantages of (autonomously) deactivating the TA reporting procedure, by the wireless device, may be 1) a reduction in power transmission of the wireless device for transmitting/retransmitting a TA reporting information; 2) reducing the load on the cell/beam for transmitting a TA reporting information; and/or 3) improving fairness among one or more wireless devices in a cell/beam.

Figure 28:
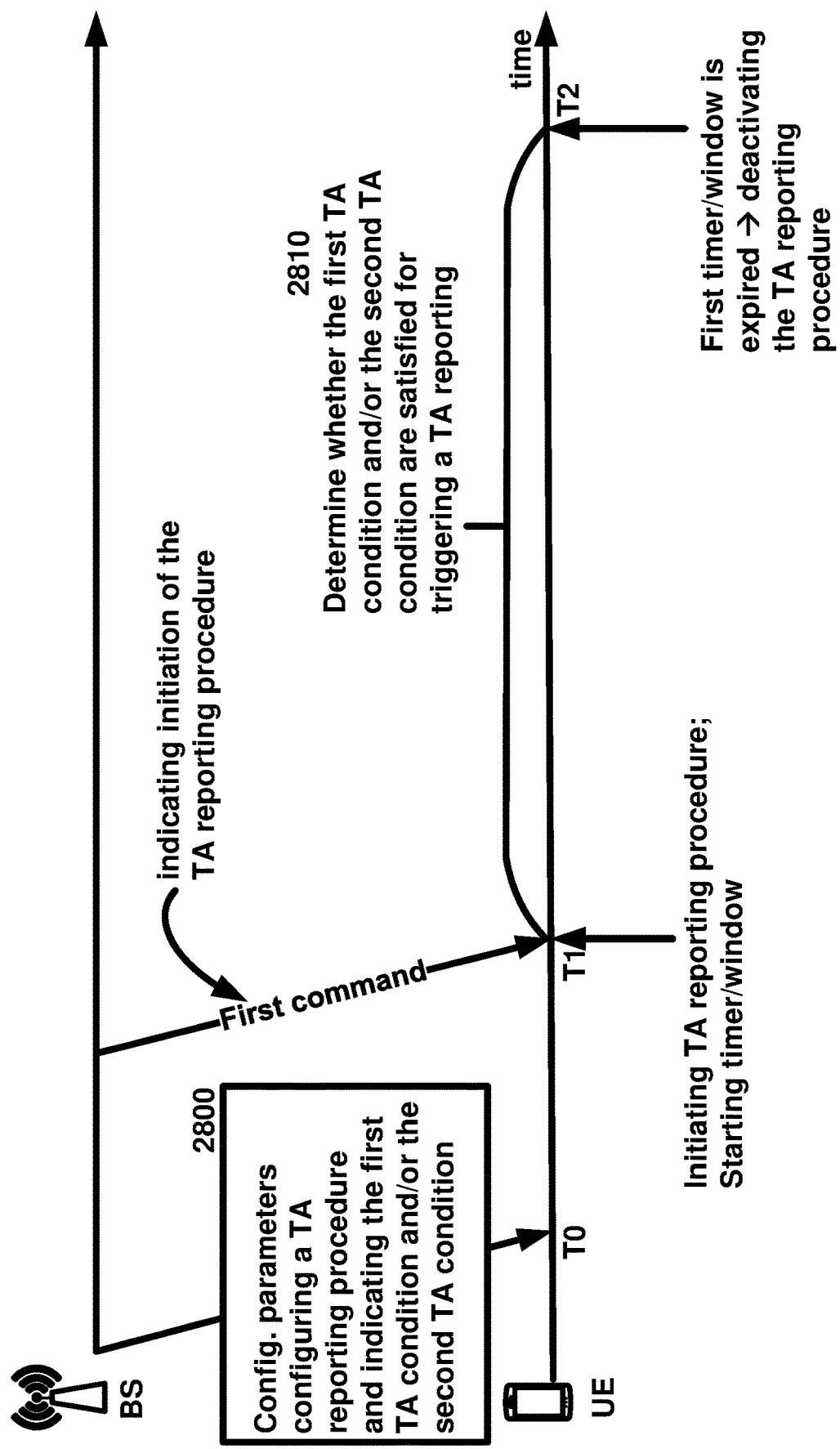
FIG. 28 shows an example embodiment of a wireless device communicating with a base station in an NTN.

FIG. 28 shows an example embodiment of a wireless device communicating with a base station in a non-terrestrial network (NTN). The wireless device may receive the one or more configuration messages 2410 from the base station at time T0 in FIG. 28. The one or more configuration messages may comprise one or more configuration parameters 2500, for example, for configuring a TA reporting procedure. The one or more configuration parameters may comprise the TA reporting configuration, e.g., the at least one TA condition for triggering the TA reporting. In an example embodiment, the at least one TA condition may comprise the first TA condition and the second TA condition 2800.

The wireless device may receive, from the base station, a first command 2510 indicating initiation of the TA reporting procedure (at time T1 in FIG. 28). In an example embodiment, the first command may indicate whether the TA reporting is based on the first TA condition. In response to receiving the first command, the wireless device may initiate the TA reporting procedure at time T1 in FIG. 28. As shown in FIG. 28, the wireless device may start the timer/window based on initiating the TA reporting procedure 2520 for determining whether a TA reporting being triggered. In an example, based on the first TA condition being indicated by the first command, the TA reporting may be triggered, by the wireless device, in response to determining the first TA condition being satisfied 2810. In an example, during the timer/window is running, in response to determining the TA reporting is triggered, the wireless device may transmit a TA reporting information.

The wireless device may receive, from the base station, a first command 2510 indicating initiation of the TA reporting procedure (at time T1 in FIG. 28). For example, a first command may indicate the TA reporting is based on the second TA condition. In response to receiving the first command, the wireless device may initiate the TA reporting procedure at time T1 in FIG. 28. As shown in FIG. 28, the wireless device may start the timer/window based on initiating the TA reporting 2520 for determining whether a TA reporting being triggered. In an example, based on the second TA condition being indicated by the first command, the TA reporting may be triggered, by the wireless device, in response to determining the second TA condition being satisfied 2810. In an example, during the timer/window is running, in response to determining the TA reporting is triggered, the wireless device may transmit a TA reporting information.

The wireless device may receive, from the base station, a first command 2510 indicating initiation of the TA reporting procedure (at time T1 in FIG. 28). For example, the first command may indicate the TA reporting is based on the first TA condition and the second TA condition. As shown in FIG. 28, the wireless device may start the timer/window based on initiating the TA reporting 2520 for determining whether a TA reporting being triggered. For example, based on the first command indicating the first TA condition and the second TA condition for triggering the TA reporting and the timer/window being running, the wireless device may determine whether the first TA condition and the second TA condition are satisfied to trigger the TA reporting.

The wireless device may receive, from the base station, a first command 2510 indicating initiation of the TA reporting procedure (at time T1 in FIG. 28). For example, the first command may not indicate whether the TA reporting is based on the first TA condition or the second TA condition. As shown in FIG. 28, the wireless device may start the timer/window based on initiating the TA reporting 2520 for determining whether a TA reporting being triggered. In an example, based on the timer/window being running and the first command not indicating the first TA condition and the second TA condition for triggering the TA reporting, the wireless device may trigger the TA reporting based on both the first TA condition and the second TA condition being satisfied. In an example, during the timer/window is running, in response to determining the TA reporting is triggered, the wireless device may transmit a TA reporting information.

In an example embodiment, the TA reporting configuration may indicate: the first TA condition, the second TA condition, and a default/baseline TA condition (e.g., the first TA condition or the second TA condition) for triggering the TA reporting 2800. The wireless device may receive a first command at time T1 in FIG. 28. The wireless device may start the timer/window based on initiating the TA reporting procedure at time T1. The first command may indicate whether the TA condition is based on the first TA condition or the second TA condition. In an example, based on the first command indicating the first TA condition for triggering the TA reporting and the timer/window being running, the wireless device may trigger the TA reporting based on the first TA condition being satisfied. In an example, based on the first command indicating the second TA condition for triggering the TA reporting and the timer/window being running, the wireless device may trigger the TA reporting based on the second TA condition being satisfied. In an example, the wireless device may trigger the TA reporting based on the default/baseline TA condition being satisfied in response to one or more of the following: the timer/window being running; the default/baseline TA condition being configured; and/or the first TA condition and the second TA condition for triggering the TA reporting not being indicated by the first activation command. In an example, the wireless device may trigger the TA reporting based on one or more of the following: the first TA condition and the second TA condition being satisfied in response to the timer/window being running; the default/baseline TA condition being configured; and/or the first activation command indicates the first TA condition and the second TA condition for triggering the TA reporting.

Based on indicating the first TA condition or the second TA condition for triggering the TA reporting via the TA reporting configuration and/or a first command, the base station may flexibly manage/control the TA reporting procedure. For example, when the UE-specific timing offset is not available/maintained at the wireless device, the first command may indicate triggering the TA reporting based on the first TA condition. In another example, to preserve the causality of the UL transmission, the first command may indicate triggering the TA reporting based on the second TA condition.

By configuring the default/baseline TA condition, the base station may reduce the signaling overhead for initiating the TA reporting procedure based on receiving the first command.

Figure 29:
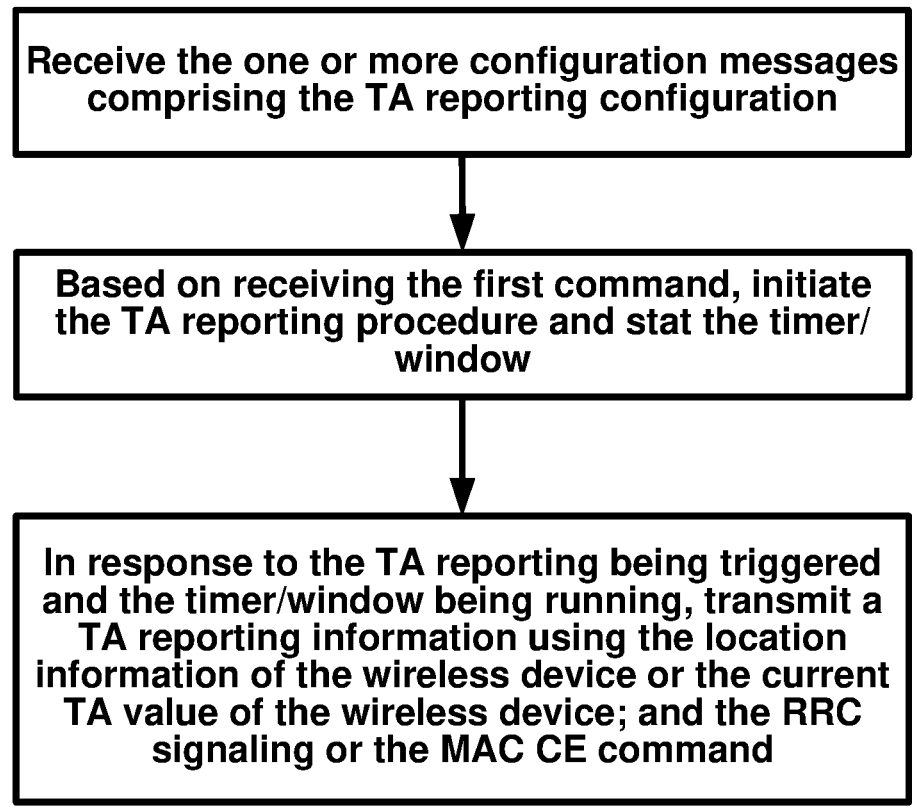
FIG. 29 shows an example embodiment of a wireless device communicating with a base station in an NTN.

FIG. 29 shows an example embodiment of a wireless device communicating with a base station in a non-terrestrial network (NTN). The wireless device may receive the one or more configuration messages 2410 from the base station. The one or more configuration messages may comprise one or more configuration parameters 2500. The one or more configuration parameters may, for example, indicate the TA reporting procedure for configuring the TA reporting procedure. The TA reporting configuration may comprise the TA reporting configuration, e.g., the at least one TA condition for triggering the TA reporting.

In an example embodiment, the TA reporting configuration may configure/indicate whether the TA reporting information is based on a MAC CE command (e.g., a TA reporting MAC CE command) or a RRC signaling (e.g., a RRC reconfiguration message); and whether the TA reporting information is based on the location information of the wireless device or the current TA value (e.g., the open-loop TA value or the service link delay). For example, the TA reporting information may be based on one of the following: the location information of the wireless device and the RRC signaling; the location information of the wireless device and the MAC CE command; the current TA value of the wireless device and the RRC signaling; and/or the current TA value of the wireless device and the MAC CE command.

The wireless device may receive, from the base station, a first command 2510 indicating initiation of the TA reporting procedure. In response to receiving the first command, the wireless device may initiate the TA reporting procedure. As shown in FIG. 29, the wireless device may start the timer/window based on initiating the TA reporting procedure 2520 for determining whether a TA reporting being triggered. For example, the first command may not indicate whether a TA reporting information is based on the MAC CE command or the RRC signaling; and whether the TA reporting information is based on the location information of the wireless device or the current TA value of the wireless device. In an example, during the timer/window is running, in response to determining the TA reporting is triggered, the wireless device may transmit a TA reporting information. The wireless device may transmit the TA reporting as configured/indicated by the TA reporting configuration.

In an example embodiment, the TA reporting configuration may indicate/configure whether a TA reporting information is based on the location information of the wireless device or the current TA value. For example, the TA reporting configuration may indicate/configure both the MAC CE command and the RRC signaling for the TA reporting information. A first command may indicate initiation of the TA reporting procedure and whether the TA reporting is based on the MAC CE command or the RRC signaling. In response to receiving the first command, the wireless device may initiate the TA reporting procedure and start the timer/window. In response to initiating the TA reporting procedure, the wireless device may use the MAC CE command or the RRC signaling for transmitting a TA reporting information (e.g., based on a triggered TA reporting) as indicated by the first command. Based on the timer/window being running, the wireless device may, for transmitting the TA reporting information, use the location information of the wireless device or the current TA value of the wireless device (e.g., based on the TA reporting configuration).

In an example embodiment, the TA reporting configuration may indicate/configure whether a TA reporting information is based on the RRC signaling or the MAC CE command. For example, the TA reporting configuration may indicate/configure both the location information of the wireless device and the current TA value of the wireless device for the TA reporting information. The wireless device may receive a first command indicating the initiation of the TA reporting information and whether the TA reporting information is based on the location information of the wireless device or the current TA value of the wireless device. In response to receiving the first command, the wireless device may initiate the TA reporting procedure and start the timer/window. Based on the timer/window being running, the wireless device may, for transmitting the TA reporting information, use the location information of the wireless device or the current TA value as indicated by the first command. The wireless device may, for transmitting the TA reporting information, use the RRC signaling, or the MAC CE command as indicated/configured by the TA reporting configuration.

In an example embodiment, the TA reporting configuration may indicate/configure both the MAC CE command and the RRC signaling. For example, the TA reporting configuration may indicate/configure both the location information of the wireless device and the current TA value of the wireless device. In an example, a first command may indicate the initiation of the TA reporting configuration and whether the TA reporting information is based on one of the following: the MAC CE command and the location information; the MAC CE command and the current TA value of the wireless device; the RRC signaling and the location information; and/or the RRC signaling and the current TA value of the wireless device. In response to receiving the first command, the wireless device may initiate the TA reporting procedure and start the timer/window. The wireless device may, based on a triggered TA reporting and the timer/window being running, transmit the TA reporting information as indicated by the first command.

In an example embodiment, the TA reporting configuration may indicate/configure both the MAC CE command and the RRC signaling. For example, the TA reporting configuration may indicate/configure both the location information of the wireless device and the current TA value of the wireless device. In an example embodiment, the base station may configure/indicate (e.g., via the TA reporting configuration) a first mapping between a first set and a second set. The first set may comprise the location information of the wireless device and the current TA value. The second set may comprise the RRC signaling and the MAC CE command. For example, the first mapping may indicate/configure that the location information of the wireless device is mapped to/from the RRC signaling or the MAC CE command; and the current TA value is mapped to/from the MAC CE command or the RRC signaling.

For example, a first command may indicate initiation of the TA reporting procedure and the TA reporting is based on the location information of the wireless device. In response to receiving the first command, the wireless device may initiate the TA reporting procedure and start the timer/window. In an example, based on the first mapping being configured/indicated, the initiation of the TA reporting procedure may be based on the location information of the wireless device and the RRC signaling, or the location information of the wireless device and the MAC CE command. In an example, based on determining that the TA reporting configuration configures/indicates the first mapping and both the MAC CE command and the RRC signaling, the initiation of the TA reporting procedure may be based on the location information of the wireless device and the RRC signaling, or the location information of the wireless device and the MAC CE command.

For example, a first command may indicate initiation of the TA reporting procedure and the TA reporting is based on the current TA value of the wireless device. In response to receiving the first command, the wireless device may initiate the TA reporting procedure and start the timer/window. In an example, based on determining that the TA reporting configuration configures/indicates both the MAC CE command and the RRC signaling, the wireless device may initiate the TA reporting procedure (in response to receiving the first command) based on the current TA value of the wireless device and the RRC signaling, or the current TA value of the wireless device and the MAC CE command. In an example, based on determining that the TA reporting configuration configures/indicates the first mapping and both the MAC CE command and the RRC signaling, the initiation of the TA reporting procedure may be based on the current TA value of the wireless device and the RRC signaling, or the current TA value of the wireless device and the MAC CE command.

For example, a first command may indicate initiation of the TA reporting procedure and the TA reporting is based on the MAC CE command. In response to receiving the first command, the wireless device may initiate the TA reporting procedure and start timer/window. According to an example, based on determining that the TA reporting configuration configures/indicates both the location information of the wireless device and the current TA value of the wireless device, the initiation of the TA reporting procedure may be based on the location information of the wireless device and the MAC CE command, or the current TA value of the wireless device and the MAC CE command. In another example, based on determining that the TA reporting configuration configures/indicates the first mapping and both the location information of the wireless device and the current TA value of the wireless device, the initiation of the TA reporting procedure may be based on the location information of the wireless device and the MAC CE command, or the current TA value of the wireless device and the MAC CE command.

For example, a first command may indicate initiation of the TA reporting procedure and the TA reporting is based on the RRC signaling. In response to receiving the first command, the wireless device may initiate the TA reporting procedure and start timer/window. In an example, based on determining that the TA reporting configuration configures/indicates both the location information of the wireless device and the current TA value of the wireless device, the initiation of the TA reporting procedure may be based on the location information of the wireless device and the RRC signaling, or the current TA value of the wireless device and the RRC signaling. According to an example, based on determining that the TA reporting configuration configures/indicates the first mapping and both the location information of the wireless device and the current TA value of the wireless device the initiation of the TA reporting procedure may be based on the location information of the wireless device and the RRC signaling, or the current TA value of the wireless device and the RRC signaling.

In an example embodiment, the TA reporting configuration may configure/indicate the MAC CE command and the RRC signaling. The TA reporting configuration may configure/indicate either of the MAC CE command or the RRC signaling as a first default/baseline TA reporting information. The wireless device may receive a first command. For example, the first command may indicate initiation of the TA reporting procedure and may not indicate whether the TA reporting is based on the MAC CE command or the RRC signaling. In response to receiving the first command and determining the first default/baseline TA reporting information being configured/indicated, the wireless device may initiate the TA reporting procedure. In response to the TA reporting procedure being initiated, the wireless device may start the timer/window. During the timer/window is running, the wireless device may transmit a TA reporting information (e.g., in response to a triggered TA reporting) based on the first default/baseline TA reporting information. For example, the wireless device may use the location information of the wireless device or the current TA value of the wireless device (e.g., based on the TA reporting configuration and/or the first command) to transmit the TA reporting information In an example embodiment, the TA reporting configuration may configure/indicate the location information of the wireless device and the current TA value of the wireless device. The TA reporting configuration may configure/indicate either of the location information of the wireless device or the current TA value of the wireless device as a second default/baseline TA reporting information. For example, a first command, received by the wireless device, may indicate initiation of the TA reporting procedure. For example, the first command may not indicate whether the TA reporting is based on the location information of the wireless device or the current TA value of the wireless device. In response to receiving the first command and based on determining the second default/baseline TA reporting information being configured/indicated, the wireless device may initiate the TA reporting procedure. The wireless device may start the timer/window based on the TA reporting procedure being initiated. During the timer/window is running, the wireless device may transmit a TA reporting information (e.g., in response to a triggered TA reporting) based on the second default/baseline TA reporting information. For example, the wireless device may transmit the TA reporting information based on the RRC signaling or the MAC CE command (e.g., based on the TA reporting configuration and/or the first command).

In an example embodiment, the TA reporting configuration may configure/indicate the MAC CE command and the RRC signaling. For example, the TA reporting configuration may indicate/configure either of the MAC CE command or the RRC signaling as a first default/baseline TA reporting information. The TA reporting configuration may configure/indicate the location information of the wireless device and the current TA value of the wireless device and may indicate/configure the location information of the wireless device or the current TA value of the wireless device as a second default/baseline TA reporting information. For example, the wireless device may receive a first command. For example, the first command may indicate initiation of the TA reporting procedure. The first command may not indicate whether the TA reporting is based on the MAC CE command or the RRC signaling and whether the TA reporting is based on the location information of the wireless device or the current TA value of the wireless device. In response to receiving the first command, the wireless device may initiate the TA reporting procedure. The wireless device may start the timer/window based on the TA reporting procedure being initiated. During the timer/window is running, the wireless device may transmit a TA reporting information (e.g., in response to a triggered TA reporting) based on the first default/baseline TA reporting information and the second default/baseline TA reporting information. For example, based on determining the first default/baseline TA reporting information and the second default/baseline TA reporting information being configured/indicated, the wireless device may transmit the TA reporting information based on the first default/baseline TA reporting information and the second default/baseline TA reporting information.

In an example embodiment, the TA reporting configuration may configure/indicate both the MAC CE command and the RRC signaling. The TA reporting configuration may configure/indicate both the location information of the wireless device and the current TA value of the wireless device. For example, the base station may not configure the first mapping, and the first default/baseline TA reporting information, and the second default/baseline TA reporting information. In an example embodiment, for transmitting a TA reporting information, the wireless device may (autonomously) perform one or more of the following: mapping the location information of the wireless device to/from the RRC signaling or the MAC CE command; and/or mapping the current TA value to/from the MAC CE command or the RRC signaling.

For example, based on whether the TA reporting information requires integrity check and/or encryption, the wireless device may (autonomously) map the location information of the wireless device to/from the RRC signaling; and/or the current TA value to/from the RRC signaling. In another example, based on the delay requirement for transmitting the TA reporting information, the wireless device may (autonomously) map the location information of the wireless device to/from the MAC CE command; and/or the current TA value to/from the MAC CE command.

In an example, based on determining the type of an NTN node that the wireless device is communicating with, the wireless device may map the location information of the wireless device to/from the RRC signaling or the MAC CE command. For example, based on determining the type of an NTN node that the wireless device is communicating with, the wireless device may map the current TA value to/from the MAC CE command or the RRC signaling. In another example, based on the type of the NTN node, the wireless device may determine whether the TA reporting information is based on the location information of the wireless device or the current TA value of the wireless device. According to an example, based on the type of the NTN node, the wireless device may determine whether the TA reporting information is based on the MAC CE command or the RRC signaling. For example, the type of the NTN node may be at least one or more of the following: a GEO satellite, a MEO satellite, a HAPS, a LEO satellite, a LEO satellite with an earth-fixed cell/beam, and/or a LEO satellite with an earth-moving cell/beam.

For example, based on determining the type of the NTN node is a first NTN type, the wireless device may map the location information of the wireless device to/from the RRC signaling; and/or the current TA value to/from the RRC signaling. In another example, based on determining the type of the NTN node is a second NTN type, the wireless device may map the location information of the wireless device to/from the MAC CE command; and/or the current TA value to/from the MAC CE command.

For example, the first NTN type may be at least one or more of the following: a GEO satellite, a (quasi-stationary) HAPS, a LEO satellite with an earth-fixed cell/beam, and/or a LEO satellite with an earth-moving cell/beam.

In an example, the second NTN type may be a LEO satellite (e.g., with an earth-fixed cell/beam and/or an earth-moving cell/beam) and/or a pseudo satellite station and/or a balloon and/or a MEO satellite.

Example embodiments may increase flexibility of the base station for configuring the TA reporting information, for example, based on one or more communication requirements. In an example, the one or more communication requirements may comprise the integrity/privacy requirement of the TA reporting information and/or the latency requirement of the TA reporting information and/or the type of an NTN node (e.g., a GEO satellite or a LEO satellite)

Figure 30:
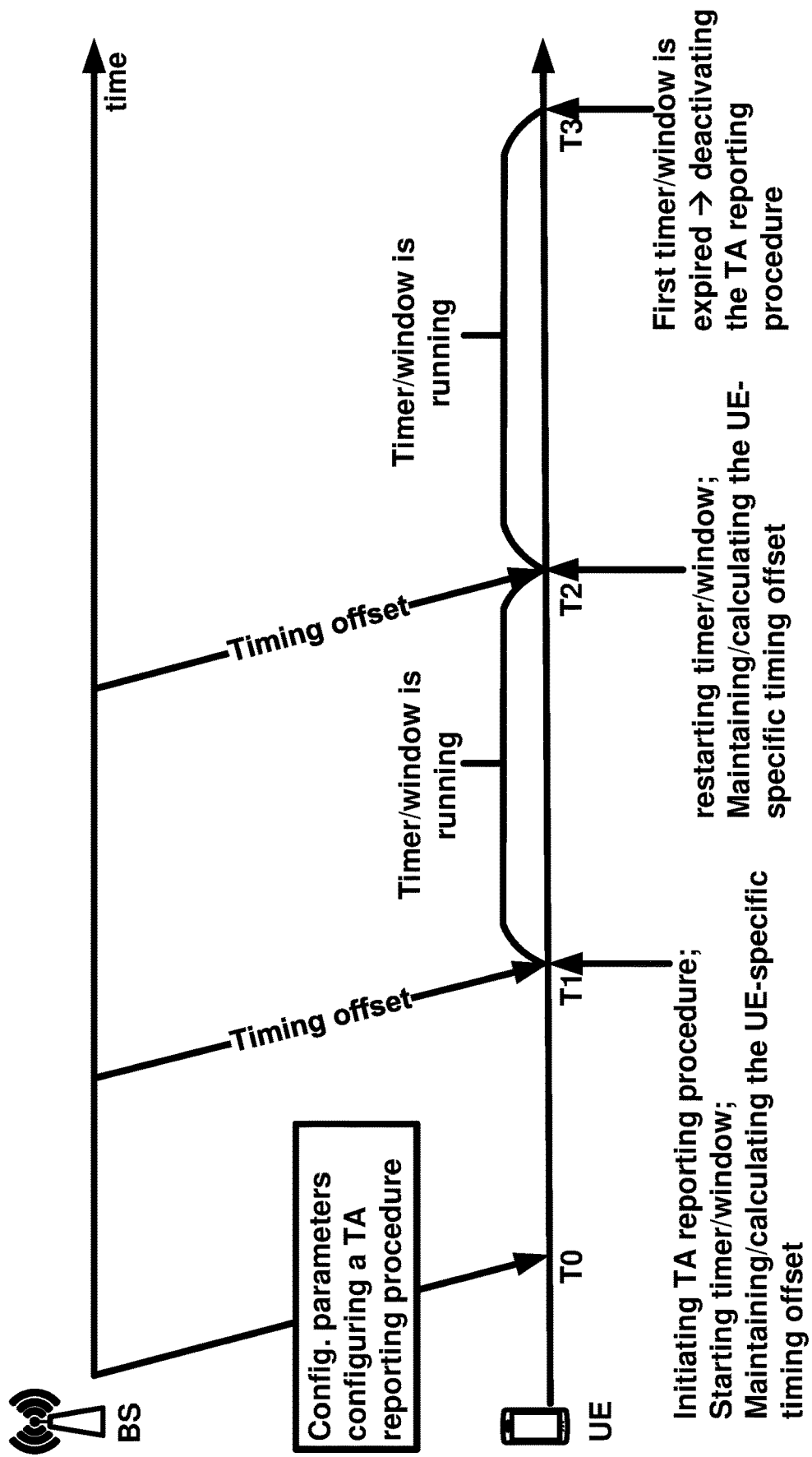
FIG. 30 shows an example embodiment of a wireless device communicating with a base station in an NTN.

FIG. 30 shows an example embodiment of a wireless device communicating with a base station in a non-terrestrial network (NTN). The wireless device may receive the one or more configuration messages 2410 from the base station. The one or more configuration messages may comprise one or more configuration parameters 2500. The one or more configuration parameters may, for example, indicate the TA reporting procedure for configuring the TA reporting procedure. The TA reporting configuration may comprise the TA reporting configuration, e.g., the at least one TA condition for triggering the TA reporting. In an example embodiment, the TA reporting configuration may indicate/configure whether initiating the TA reporting procedure via receiving the timing offset is enabled/configured or not. For example, the TA reporting configuration may indicate/configure that the initiation of the TA reporting procedure via receiving the timing offset is disabled.

In an example embodiment, the TA reporting configuration may indicate/configure the initiation of the TA reporting procedure via receiving the timing offset being enabled/configured. As shown in FIG. 30, based on the initiation of the TA reporting procedure via receiving the timing offset being enabled/configured, the wireless device may initiate (autonomously/automatically) the TA reporting procedure in response to receiving the timing offset 2430/2470 at time T1. The wireless device may maintain/calculate the UE-specific timing offset based on receiving the timing offset 2440/2480. In an example, based on the TA reporting procedure being initiated, the wireless device may start the timer/window. For example, during the timer/window is running, the wireless device may perform the TA reporting procedure. According to an example, during the timer/window is running, the wireless device may determine whether the at least one TA condition being satisfied to trigger a TA reporting. In response to triggering the TA reporting, the wireless device may transmit a TA reporting information 2420/2460. For example, during the timer/window is running, the wireless device may trigger the TA reporting one or more times. For each triggered TA reporting, the wireless device may transmit the TA reporting information. According to an example, during the timer/window is running, the wireless device may determine the at least one TA condition is satisfied.

In an example embodiment, the at least one TA condition for triggering the TA reporting may comprise the first TA condition. Based on the initiation of the TA reporting via receiving the timing offset being enabled/configured, the wireless device may initiate the TA reporting procedure in response to receiving the timing offset at time T1 in FIG. 30. For example, based on the timer/window being running, the wireless device may trigger a TA reporting in response to the first TA condition being satisfied.

In an example embodiment, the at least one TA condition for triggering the TA reporting may comprise the second TA condition. Based on the initiation of the TA reporting via receiving the timing offset being enabled/configured, the wireless device may initiate the TA reporting procedure in response to receiving the timing offset at time T1 in FIG. 30. For example, based on the timer/window being running, the wireless device may trigger a TA reporting in response to the second TA condition being satisfied.

In an example embodiment, the at least one TA condition for triggering the TA reporting may comprise the first TA condition and the second TA condition. In an example, based on the initiation of the TA reporting via receiving the timing offset being enabled/configured, the wireless device may initiate the TA reporting procedure in response to receiving the timing offset at time T1 in FIG. 30. For example, based on the timer/window being running, the wireless device may trigger a TA reporting in response to the first TA condition being satisfied and the second TA condition being satisfied. For example, based on the timer/window being running and the default/baseline TA condition not being configured/indicated, the wireless device may trigger the TA reporting in response to the first TA condition being satisfied and the second TA condition being satisfied.

In an example embodiment, the at least one TA condition may comprise the first TA condition, the second TA condition, and the default/baseline TA condition. In an example, based on the initiation of the TA reporting via receiving the timing offset being enabled/configured, the wireless device may initiate the TA reporting procedure in response to receiving the timing offset at time T1 in FIG. 30. For example, based on the timer/window being running, the wireless device may trigger a TA reporting in response to the baseline/default TA condition being satisfied.

In an example embodiment, during the timer/window is running, the wireless device may receive the timing offset at time T2 in FIG. 30. The wireless device may, based on the timer/window being running and the initiation of the TA reporting via receiving the timing offset being enabled/configured, restart the timer/window. The wireless device may calculate/maintain the UE-specific timing offset based on the timing offset. In response to starting/restarting the timer/window, the wireless device may perform at least one of the following 2530: determining whether the at least one TA condition being satisfied; triggering a TA reporting based on the at least one TA condition being satisfied; transmitting the TA reporting information based on the triggered TA reporting; and/or calculating/maintaining the UE-specific timing offset based on receiving the timing offset from the base station.

In an example embodiment, the wireless device may receive the second command 2540 during the timer/window is running. In an example, based on receiving the second command during/while the timer/window is running, the wireless device may deactivate the TA reporting procedure. The wireless device may stop the timer/window based on the TA reporting being deactivated.

In an example, the wireless device may not receive the second command during the timer/window is running. As shown in FIG. 30, based on not receiving the second command upon the expiry of the timer/window, the wireless device may (automatically/autonomously) deactivate the TA reporting procedure 2560.

In an example embodiment, the TA reporting configuration may not indicate/configure that the initiation of the TA reporting procedure via receiving the timing offset is enabled/configured. For example, the TA reporting configuration may indicate/configure the initiation of the TA reporting procedure via receiving the timing offset is disabled. In response to determining that the initiation of the TA reporting procedure via receiving the timing offset is disabled (or is not configured/enabled), the wireless device may not initiate the TA reporting procedure based on receiving the timing offset. In an example embodiment, based on the initiation of the TA reporting procedure via receiving the timing offset being disabled (or not being configured/enabled), the wireless device may not start/restart the timer/window based on receiving the timing offset.

In an example embodiment, the TA reporting configuration may indicate/configure a first value. For example, the first value may indicate the maximum number of times that the TA reporting information is transmitted during the timer/window is running. In an example embodiment, based on the first value being configured/indicated, the wireless device may initialize a first counter by zero based on the TA reporting procedure being initiated (e.g., at time T1 in FIG. 30). For example, during the timer/window is running, in response to triggering a TA reporting the wireless device may transmit the TA reporting information. The wireless device may increment the first counter based on transmitting a TA reporting information. For example, during the timer/window is running, the wireless device may perform at least one or more of the following: in response to determining the first counter being smaller than the first value, transmitting a TA reporting information based on a triggered TA reporting; and/or in response to determining the first counter being equal or greater than the first value, deactivating the TA reporting procedure. For example, the wireless device may stop the timer/window based on the TA reporting procedure being deactivated.

According to an example, while the timer/window is running, in response to receiving the timing offset and determining the first counter being equal or greater than the first value, the wireless device may not restart the timer/window based on an initiation of the TA reporting procedure is enabled/configured. For example, while the timer/window is running, in response to receiving the timing offset and determining the first counter being equal or greater than the first value, the wireless device may not restart the timer/window based on an initiation of the TA reporting procedure is disabled or is not enable/configured (e.g., via the one or more configuration parameters). In an example, while the timer/window is running, in response to receiving the timing offset and determining the first counter being smaller than the first value and the TA reporting procedure being initiated based on receiving the timing offset, the wireless device may restart the timer/window.

According to an example, while the timer/window is running, in response to receiving the timing offset and determining the first counter being smaller than the first value, the wireless device may not restart the timer/window based on an initiation of the TA reporting procedure is disabled or is not enable/configured (e.g., via the one or more configuration parameters). In an example, while the timer/window is running, in response to receiving the timing offset and determining the first counter being smaller than the first value, the wireless device may restart the timer/window based on an initiation of the TA reporting procedure is enabled/configured (e.g., via the one or more configuration parameters).

In an example embodiment, the TA reporting configuration may indicate/configure a first value. For example, the first value may configure the maximum number of times that a TA reporting is triggered during the timer/window is running. In an example embodiment, based on the first value being configured/indicated, the wireless device may initialize a first counter by zero based on the TA reporting procedure being initiated (e.g., at time T1 in FIG. 30). For example, during the timer/window is running, in response to triggering a TA reporting the wireless device may increment the first counter. For example, during the timer/window is running, the wireless device may perform at least one or more of the following: in response to determining the first counter being smaller than the first value, triggering a TA reporting based on the at least one TA condition being satisfied; in response to determining the first counter being equal or greater than the first value, not determining whether the at least one TA condition being satisfied; and/or in response to determining the first counter being equal or greater than the first value, not triggering a TA reporting based on the at least one TA condition being satisfied. In an example embodiment, in response to determining the first counter being equal or greater than the first value, the wireless device may deactivate the TA reporting procedure. For example, the wireless device may stop the timer/window based on the TA reporting procedure being deactivated.

An advantage of activating the TA reporting, by the wireless device, based on the receiving the timing offset, may be a reduction of the signaling overhead. For example, the base station does not require to transmit the first activation command to activate the TA reporting.

Figure 31:
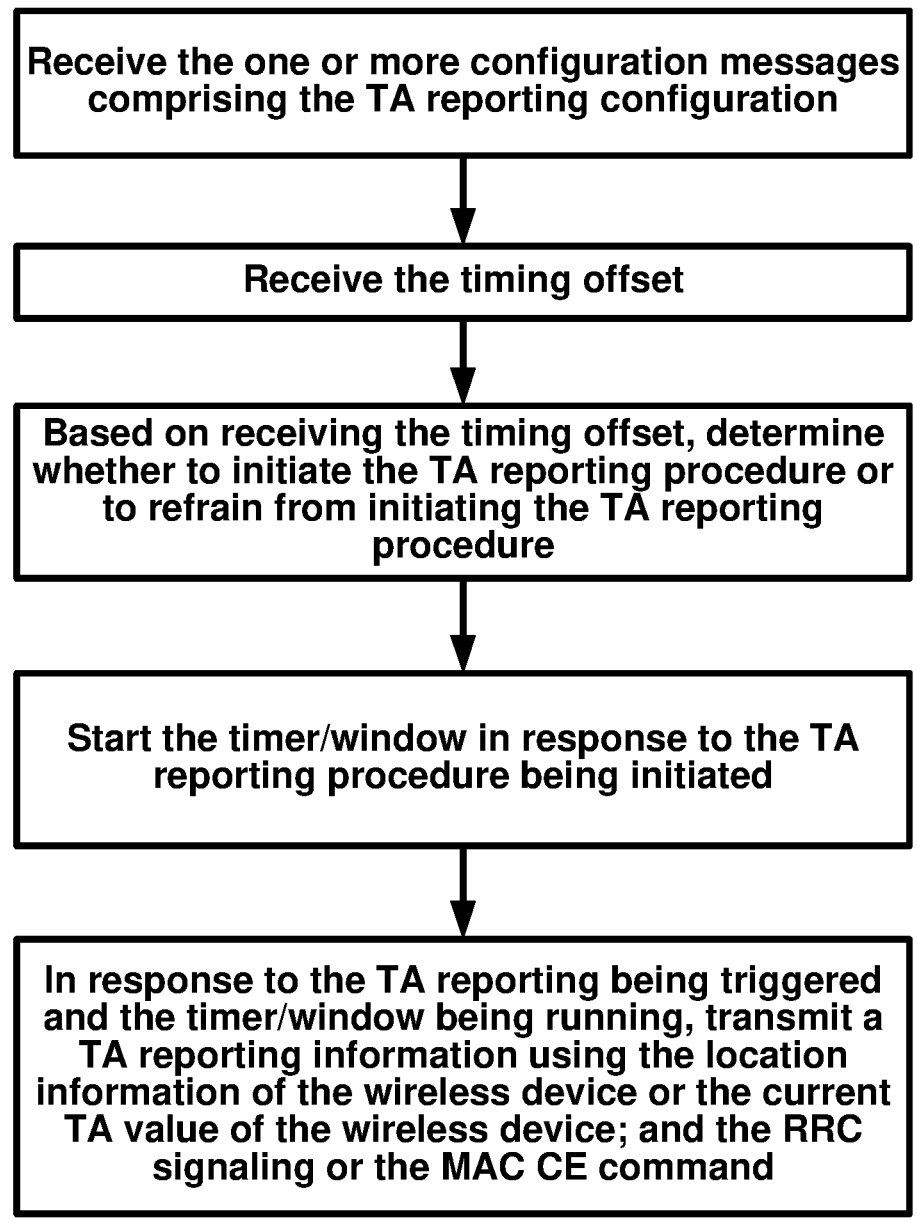
FIG. 31 shows an example embodiment of a wireless device communicating with a base station in an NTN.

FIG. 31 shows an example embodiment of a wireless device communicating with a base station in a non-terrestrial network (NTN). The wireless device may receive the one or more configuration messages 2410 from the base station. The one or more configuration messages may comprise one or more configuration parameters 2500. The one or more configuration parameters may, for example, indicate the TA reporting procedure for configuring the TA reporting procedure. The TA reporting configuration may comprise the TA reporting configuration, e.g., the at least one TA condition for triggering the TA reporting. In an example embodiment, the TA reporting configuration may indicate/configure whether initiating the TA reporting procedure via receiving the timing offset is enabled/configured or not. For example, the TA reporting configuration may indicate/configure that the initiation of the TA reporting procedure via receiving the timing offset is disabled.

In an example embodiment, the TA reporting configuration may indicate/configure at least one or more of the following: the initiation of the TA reporting procedure via receiving the timing offset is enabled/configured; whether the TA reporting information is based on the MAC CE command or the RRC signaling; and whether the TA reporting information is based on the location information of the wireless device or the current TA value. For example, based on the timing offset being received and the TA reporting procedure not being initiated, the wireless device may initiate the TA reporting procedure. For example, based on the timing offset being received, the wireless device may start/restart the timer/window. For example, in response to determining the TA reporting procedure being initiated, the wireless device may restart the timer/window based on receiving the timing offset. Based on the TA reporting procedure being initiated, the wireless device may trigger a TA reporting based on the at least one TA condition being satisfied. The wireless device may transmit the TA reporting information. For example, based on the TA reporting configuration, the TA reporting information may be based on at least one of the following: the location information of the wireless device and the RRC signaling; the location information of the wireless device and the MAC CE command; the current TA value of the wireless device and the RRC signaling; or the current TA value of the wireless device and the MAC CE command.

In an example embodiment, the TA reporting configuration may indicate/configure at least one or more of the following: initiation of the TA reporting procedure via receiving the timing offset is enabled/configured; whether the TA reporting information is based on the MAC CE command and/or the RRC signaling; whether the TA reporting information is based on the location information of the wireless device and/or the current TA value; the first default/baseline TA reporting information; and/or the second default/baseline TA reporting information.

For example, the wireless device may, based on the timing offset being received and the TA reporting procedure not being initiated, initiate (autonomously/automatically) the TA reporting procedure in response to determining: the initiation of the TA reporting procedure via receiving the timing offset is enabled/configured; either of the MAC CE command or the RRC signaling are configured/indicated for transmitting the TA reporting information; and either of the location information of the wireless device or the current TA value are configured for transmitting the TA reporting information. For example, based on the timing offset being received, the wireless device may start/restart the timer/window. For example, in response to determining the TA reporting procedure being initiated, the wireless device may restart the timer/window based on receiving the timing offset. During the timer/window is running, the wireless device may, based on a triggered TA reporting and the TA reporting configuration, transmit a TA reporting information using either of the MAC CE command or the RRC signaling and either of the location information of the wireless device or the current TA value.

For example, the wireless device may, based on the timing offset being received and the TA reporting procedure not being initiated, initiate (autonomously/automatically) the TA reporting procedure in response to determining: the initiation of the TA reporting procedure via receiving the timing offset is enabled/configured; both of the MAC CE command and the RRC signaling are configured/indicated for transmitting the TA reporting information and the first default/baseline TA reporting information is indicated/configured; and both the location information of the wireless device and the current TA value are configured for transmitting the TA reporting information and the second default/baseline TA reporting information is indicated/configured. For example, based on the timing offset being received, the wireless device may start/restart the timer/window. For example, in response to determining the TA reporting procedure being initiated, the wireless device may restart the timer/window based on receiving the timing offset. During the timer/window is running, the wireless device may, based on a triggered TA reporting and the TA reporting configuration, transmit a TA reporting information using first default/baseline TA reporting information and second default/baseline TA reporting information.

In an example, the wireless device may initiate, based on the timing offset being received and the TA reporting procedure not being initiated, the TA reporting procedure in response to determining: the initiation of the TA reporting procedure via receiving the timing offset is enabled/configured; both of the MAC CE command and the RRC signaling are configured/indicated for transmitting the TA reporting information and the first default/baseline TA reporting information is indicated/configured; and either of the location information of the wireless device or the current TA value are configured for transmitting the TA reporting information. For example, based on the timing offset being received, the wireless device may start/restart the timer/window. For example, in response to determining the TA reporting procedure being initiated, the wireless device may restart the timer/window based on receiving the timing offset. During the timer/window is running, the wireless device may, based on a triggered TA reporting and the TA reporting configuration, transmit a TA reporting information using first default/baseline TA reporting information and either of the location information of the wireless device or the current TA value.

In an example, the wireless device may, based on the timing offset being received and the TA reporting procedure not being initiated, initiate the TA reporting procedure in response to determining: the initiation of the TA reporting procedure via receiving the timing offset is enabled/configured; either of the MAC CE command or the RRC signaling are configured/indicated for transmitting the TA reporting information; and both the location information of the wireless device and the current TA value are configured for transmitting the TA reporting information and the second default/baseline TA reporting information is indicated/configured. For example, based on the timing offset being received, the wireless device may start/restart the timer/window. For example, in response to determining the TA reporting procedure being initiated, the wireless device may restart the timer/window based on receiving the timing offset. During the timer/window is running, the wireless device may, based on a triggered TA reporting and the TA reporting configuration, transmit a TA reporting information using second default/baseline TA reporting information and either of the MAC CE command or the RRC signaling.

In an example, the wireless device may, based on the timing offset being received and the TA reporting procedure not being initiated, initiate (autonomously/automatically) the TA reporting procedure in response to determining: the initiation of the TA reporting procedure via receiving the timing offset is enabled/configured; both of the MAC CE command and the RRC signaling are configured for transmitting the TA reporting information and the first default/baseline TA reporting information is not indicated/configured; and either of the location information of the wireless device or the current TA value is configured/indicated for transmitting the TA reporting information. In response to the timing offset being received, the wireless device may start/restart the timer/window. For example, in response to determining the TA reporting procedure being initiated, the wireless device may restart the timer/window based on receiving the timing offset. In an example, the wireless device may be configured with the first mapping. For example, the first mapping may be used by the wireless device to determine the mapping between the location information of the wireless device to/from the MAC CE command and the RRC signaling. For example, the first mapping may be used by the wireless device to determine the mapping between the current TA value of the wireless device to/from the MAC CE command and the RRC signaling.

For example, the wireless device may, based on the first mapping being configured/indicated, use the RRC signaling or the MAC CE command for transmitting a TA reporting information (e.g., in response to a triggered TA reporting) in response to determining that the location information of the wireless device is configured/indicated for transmitting the TA reporting information. In another example, the wireless device may, based on the first mapping being configured/indicated, use the RRC signaling or the MAC CE command for transmitting the TA reporting information in response to determining that the current TA value of the wireless device is configured/indicated for transmitting the TA reporting information. According to an example, the wireless device may, based on the first mapping being configured/indicated, use the location information of the wireless device or the current TA value of the wireless device for transmitting the TA reporting information in response to determining that the RRC signaling is configured/indicated for transmitting the TA reporting information. In another example, the wireless device may, based on the first mapping being configured/indicated, use the location information of the wireless device or the current TA value of the wireless device for transmitting the TA reporting information in response to determining that the MAC CE command is configured/indicated for transmitting the TA reporting information.

In an example embodiment, the TA reporting configuration may configure/indicate both the MAC CE command and the RRC signaling. For example, the TA reporting configuration may configure/indicate both the location information of the wireless device and the current TA value of the wireless device. For example, the base station may not configure the first mapping, and the first default/baseline TA reporting information, and the second default/baseline TA reporting information. In an example embodiment, the wireless device may, based on the timing offset being received and the TA reporting procedure not being initiated, initiate (autonomously/automatically) the TA reporting procedure in response to the initiation of the TA reporting procedure via receiving the timing offset being enabled/configured. In response to initiating the TA reporting procedure, the wireless device may start/restart the timer/window. For example, in response to determining the TA reporting procedure being initiated, the wireless device may restart the timer/window based on receiving the timing offset. During the timer/window in running, the wireless device may trigger a TA reporting procedure based on the at least one TA condition being satisfied.

In an example embodiment, based on the triggered TA reporting, for transmitting a TA reporting information, the wireless device may (autonomously) perform at least one or more of the following: mapping the location information of the wireless device to/from the RRC signaling or the MAC CE command; and/or mapping the current TA value to/from the MAC CE command or the RRC signaling.

For example, based on whether the TA reporting information requires integrity check and/or encryption, the wireless device may (autonomously) map the location information of the wireless device to/from the RRC signaling. For example, based on whether the TA reporting information requires integrity check and/or encryption, the wireless device may (autonomously) map the current TA value to/from the RRC signaling.

In an example, based on the delay requirement for transmitting the TA reporting information, the wireless device may (autonomously) map the location information of the wireless device to/from the MAC CE command. In another example, based on the delay requirement for transmitting the TA reporting information, the wireless device may (autonomously) map the current TA value to/from the MAC CE command.

In an example, based on determining the type of the NTN node that the wireless device is communicating with, the wireless device may map the location information of the wireless device to/from the RRC signaling or the MAC CE command. In another example, based on determining the type of the NTN node that the wireless device is communicating with, the wireless device may map and/or the current TA value to/from the MAC CE command or the RRC signaling.

For example, based on determining the type of the NTN node is the first NTN type, the wireless device may map the location information of the wireless device to/from the RRC signaling; and/or the current TA value to/from the RRC signaling. In another example, based on determining the type of the NTN node is the second NTN type, the wireless device may map the location information of the wireless device to/from the MAC CE command; and/or the current TA value to/from the MAC CE command. In another example, based on the type of the NTN node, the wireless device may determine the TA reporting information is based on the location information of the wireless device or the current TA value of the wireless device. According to an example, based on the type of the NTN node, the wireless device may determine the TA reporting information is based on the MAC CE command or the RRC signaling.

In an example embodiment, based on the timing offset being received and the TA reporting procedure not being initiated, the wireless device may not initiate (autonomously/automatically) the TA reporting in response to determining: the initiation of the TA reporting procedure via receiving the timing offset is enabled/configured; both of the MAC CE command and the RRC signaling are configured/indicated for transmitting the TA reporting information and the first default/baseline TA reporting information is not indicated/configured; and both of the location information of the wireless device and the current TA value are configured/indicated for transmitting the TA reporting information and the second default/baseline TA reporting information is not indicated/configured.

For example, in response to receiving the timing offset, the wireless device may not start/restart the timer/window based on determining: the initiation of the TA reporting procedure via receiving the timing offset is enabled/configured; both of the MAC CE command and the RRC signaling are configured/indicated for transmitting the TA reporting information and the first default/baseline TA reporting information is not indicated/configured; and both of the location information of the wireless device and the current TA value are configured/indicated for transmitting the TA reporting information and the second default/baseline TA reporting information is not indicated/configured.

In an example, based on the timing offset being received and the TA reporting procedure not being initiated, the wireless device may not initiate (autonomously/automatically) the TA reporting procedure in response to determining: the initiation of the TA reporting procedure via receiving the timing offset is enabled/configured; and both the MAC CE command and the RRC signaling are configured for transmitting the TA reporting information and the first default/baseline TA reporting information is not indicated/configured.

In an example, in response to receiving the timing offset, the wireless device may not start/restart the timer/window based on determining: the initiation of the TA reporting procedure via receiving the timing offset is enabled/configured; and both the MAC CE command and the RRC signaling are configured for transmitting the TA reporting information and the first default/baseline TA reporting information is not indicated/configured.

In an example, the wireless device may, based on the timing offset being received and the TA reporting procedure not being initiated, not initiate (autonomously/automatically) the TA reporting in response to determining: the initiation of the TA reporting procedure via receiving the timing offset is enabled/configured; and both of the location information of the wireless device and the current TA value are configured for transmitting the TA reporting information and the second default/baseline TA reporting information is not indicated/configured.

For example, in response to receiving the timing offset, the wireless device may not start/restart the timer/window based on determining the initiation of the TA reporting procedure via receiving the timing offset is enabled/configured; and both the location information of the wireless device and the current TA value are configured for transmitting the TA reporting information and the second default/baseline TA reporting information is not indicated/configured.

According to an example embodiment, the wireless device may receive, from a base station, one or more configuration parameters for a timing advance (TA) reporting procedure, wherein the one or more configuration parameters indicate at least one TA condition for triggering a TA reporting. The wireless device may receive, from the base station, a first command indicating initiation of the TA reporting procedure. The wireless device may initiate the TA reporting procedure in response to receiving the first command. The wireless device may start, for the TA reporting procedure, a timer/window to determine whether the at least one TA condition is satisfied. The wireless device may deactivate the TA reporting procedure based on the timer/window being expired or receiving a second command indicating deactivation of the TA reporting procedure during the timer/window.

In an example, the wireless device may stop the timer/window in response to receiving the second command.

In an example, the TA reporting procedure comprises triggering, based on the at least one TA condition being satisfied and the timer/window being running, the TA reporting; and transmitting, based on the triggered TA reporting and the timer/window being running, a TA reporting information via a medium access control (MAC) control element (CE) or a radio resource control (RRC) message.

In an example, the one or more configuration parameters may indicate/configure whether the TA reporting information is based on a MAC CE or a RRC message.

In an example, the one or more configuration parameters may indicate/configure the TA reporting information is based on a MAC CE and the RRC message.

In an example, the one or more configuration parameters may indicate/configure the MAC CE or the RRC message as a first default/baseline TA reporting information.

In an example, the TA reporting information may be based on the first default/baseline TA reporting information in response to determining the first command does not indicate whether the TA reporting information is based on the RRC message or the MAC CE.

In an example, the TA reporting information may be based on a location information of the wireless device or a current TA value of the wireless device.

In an example, the one or more configuration parameters may indicate/configure the TA reporting information is based on a location information of the wireless device or a current TA value of the wireless device.

In an example, the one or more configuration parameters may indicate/configure the TA reporting information is based on a location information of the wireless device and a current TA value of the wireless device.

In an example, the one or more configuration parameters may indicate/configure the location information of the wireless device or the current TA value of the wireless device as a second default/baseline TA reporting information.

In an example, the TA reporting information may be based on the second default/baseline TA reporting information in response to determining the first command does not indicate whether the TA reporting information is based on the location information of the wireless device or the current TA value of the wireless device.

In an example, the first command may indicate whether the TA reporting information is based on a location information of the wireless device or a current TA value of the wireless device.

In an example, the first command may indicate whether the TA reporting information is based on a MAC CE or a RRC message.

In an example, the first command may not indicate whether the TA reporting information is based on a MAC CE or a RRC message.

In an example, the wireless device may determine whether the TA reporting information is based on the MAC CE or the RRC message.

In an example, the first command may not indicate whether the TA reporting information is based on a location information of the wireless device or a current TA value of the wireless device.

In an example, the wireless device may determine whether a TA reporting information is based on a location information of the wireless device or a current TA value of the wireless device.

In an example, the one or more configuration parameters may configure/indicate a first mapping for determining, by the wireless device, whether the TA reporting information is based on a location information of the wireless device or a current TA value of the wireless device; and/or a MAC CE or a RRC message.

In an example, the wireless device may use the first mapping to determine whether the TA reporting information is based on the MAC CE or the RRC message.

In an example, the wireless device may use the first mapping to determine whether the TA reporting information is based on the location information of the wireless device or the current TA value of the wireless device.

In an example, based on a type of a non-terrestrial network (NTN) node that the wireless device is communicating with, the wireless device may determine whether the TA reporting information is based on a location information of the wireless device or a current TA value of the wireless device; and/or whether the TA reporting information is based on a MAC CE or a RRC message.

In an example, the wireless device may maintain/calculate a UE-specific timing offset based on receiving a timing offset.

In an example, the wireless device may receive the timing offset in response to transmitting a TA reporting information.

In an example, the wireless device may use the UE-specific timing offset for determining the transmission time of an uplink grant scheduled by a DCI in response to the DCI may have CRC parity bits scrambled with a random access radio network temporary identifier (RA-RNTI), MSGB-RNTI, or a temporary C-RNTI (TC-RNTI); the DCI may not indicate a random access preamble index; the DCI may not a DCI format 1_0 indicating a retransmission of a Msg3 during an ongoing random access procedure; the uplink grant may not a random access response (RAR) grant scheduled physical uplink shared channel (PUSCH) or a fallbackRAR grant scheduled PUSCH; or the uplink grant may not a hybrid automatic request (HARQ) acknowledgement (ACK) on physical uplink control channel (PUCCH) indicating a success contention resolution.

In an example, the timing offset may be indicated via a MAC CE or a RRC message.

In an example, the wireless device may discard/delete the UE-specific timing offset based on the UE-specific timing offset being available/maintained at the wireless device based on one or more previous transmissions; and the timer/window being stopped/expired.

In an example, the first command may indicate a first TA condition and/or a second TA condition for triggering the TA reporting, wherein the at least one TA condition comprises the first TA condition and the second TA condition.

In an example, the wireless device may trigger, in response to the first command not indicating the first TA condition or the second TA condition for triggering the TA reporting, the TA reporting based on the first TA condition and the second TA condition being satisfied.

In an example, the first command may not indicate the first TA condition or the second TA condition for triggering the TA reporting.

In an example, the wireless device may trigger, in response to the one or more configuration parameters indicate/configure the first TA condition or the second TA condition as a default/baseline TA condition for triggering the TA reporting, the TA reporting based on the default/baseline TA condition being satisfied.

In an example, the first TA condition may be based on a change in a current TA value compared to a previous TA value; and the second TA condition may be based on a difference between a UE-specific timing offset and the current TA value.

In an example, the time of calculating/maintaining the current TA value may be after the time of calculating/maintaining the previous TA value.

In an example, the current TA value and the previous TA value may be maintained/calculated, by the wireless device, based on a combination of a closed-loop TA procedure/control and an open-loop TA procedure/control.

In an example, the open-loop TA procedure/control may be at least based on one or more satellite ephemeris parameters; one or more common delay/TA parameters; location information (e.g., a GNSS-acquired position) of the wireless device; or a third timing offset provided via a broadcast system information.

In an example, the closed-loop TA procedure/control may be based on receiving TA command MAC CE and/or absolute TA command MAC CE.

In an example, the wireless device may trigger the TA reporting based on the at least one TA condition being satisfied and the timer/window being running.

In an example, the wireless device may cancel the triggered TA reporting based on the timer/window being stopped/expired.

In an example, the wireless device may transmit, during the timer/window being running, a TA reporting information based on the triggered TA reporting.

In an example, transmitting the TA reporting information may be via one or more available uplink shared channel (UL-SCH) resource(s).

In an example, transmitting the TA reporting information may be based on triggering/initiating a random access (RA) procedure for transmitting the TA reporting information based on transmitting the TA reporting information via a RA procedure being enabled/configured via the one or more configuration parameters.

In an example, the wireless device may stop the RA procedure based on the TA reporting procedure being deactivated.

In an example, the one or more available UL-SCH resources may be provided via triggering a scheduling request (SR).

In an example, the wireless device may cancel the triggered SR in response to the TA reporting procedure being deactivated.

In an example, the wireless device may refrain from transmitting the TA reporting information in response to the TA reporting being triggered; and the timer/window being expired/stopped.

In an example, the wireless device may initialize, in response to initiating the TA reporting procedure, a first counter by zero. The wireless device may increment the first counter based on the TA reporting being triggered. The wireless device may deactivate the TA reporting based on the first counter being equal or greater than a first value and the timer/window being running.

In an example, the one or more configuration parameters may indicate/configure the first value.

In an example, the first command may indicate the first value.

In an example, the first counter may be incremented based on receiving a timing offset.

In an example, the first counter may be incremented based on transmitting a TA reporting information.

In an example, the wireless device may stop the timer/window in response to at least one of: a time alignment timer being expired; a first validation/validity timer/window corresponding to a GNSS-acquired location information being expired and the wireless device not being able to acquire a new GNSS-acquired location information; a second validation/validity timer/window corresponding to a satellite ephemeris parameter being expired and the wireless device not being able to acquire a new satellite ephemeris parameters; or a third validation/validity timer/window corresponding to a common TA/delay being expired and the wireless device not being able to acquire a new common TA/delay parameters.

In an example, the wireless device may initiate, based on receiving a timing offset, the TA reporting procedure in response to the TA reporting not being initiated and an initiation of the TA reporting procedure based on receiving the timing offset being configured/enabled via the one or more configuration parameters.

In an example, during the timer/window is running, the wireless device may restart the timer/window based on receiving the timing offset.

In an example, the wireless device may not initiate, based on receiving a timing offset, the TA reporting procedure in response to the TA reporting not being initiated; and an initiation of the TA reporting procedure based on receiving the timing offset not being configured/enabled or being disabled via the one or more configuration parameters.

In an example, the wireless device may not initiate, based on receiving the timing offset, the TA reporting procedure in response to determining the one or more configuration parameters configure/indicate a MAC CE and a RRC message for a TA reporting information and does not configured/indicate a first default/baseline TA reporting information; the one or more configuration parameters configure/indicate a location information of the wireless device and a current TA value for the TA reporting information and does not configure/indicate a second default/baseline TA reporting information; and/or the one or more configuration parameters does not configure/indicate a first mapping.

In an example, the wireless device may restart the timer/window based on receiving the timing offset during the timer/window is running.

In an example, the one or more configuration parameters configure/indicate an initiation of the TA reporting procedure based on receiving the timing offset.

In an example, the wireless device may not restart the timer/window based on receiving the timing offset during the timer/window is running.

In an example, an initiation of the TA reporting procedure based on receiving the timing offset is not configured/enabled or is disabled.

In an example, the type of the NTN node may be at least one of the following: a GEO satellite; a MEO satellite; a LEO satellite; a LEO satellite with earth-fixed cell/beam; a LEO satellite with earth-moving cell/beam; a high altitude platform station (HAPS); or a pseudo satellite.

In an example, the wireless device may communicate with the base station via a non-terrestrial network (NTN).

///Summary of BS's Solution///

According to an example embodiment, the base station may transmit, to a wireless device, one or more configuration parameters for a timing advance (TA) reporting procedure, wherein the one or more configuration parameters indicate at least one TA condition for triggering a TA reporting. The base stationman may transmit a first command indicating initiation of the TA reporting procedure. The base station may start, for the TA reporting procedure, a timer/window to receive TA reporting information. The base station may deactivate the TA reporting procedure based on the timer/window being expired; or transmitting a second command indicating deactivation of the TA reporting procedure during the timer/window.

In an example, the base station may stop the timer/window in response to transmitting the second command.

In an example, the TA reporting procedure comprises receiving, from the wireless device, the TA reporting information; and transmitting, based on the received TA reporting information, a timing offset.

In an example, the one or more configuration parameters may indicate/configure whether the TA reporting information is based on a current TA value and/or a location information of the wireless device.

In an example, the one or more configuration parameters may indicate/configure whether the TA reporting information is based on a MAC CE and/or a RRC message.

In an example, the one or more configuration parameters may indicate/configure the MAC CE or the RRC message as a first default/baseline TA reporting information.

In an example, the first command may not indicate whether the TA reporting information is based on the RRC message or the MAC CE.

In an example, the first command may indicate whether the TA reporting information is based on the RRC message or the MAC CE.

In an example, the first command may not indicate whether the TA reporting information is based on a location information of the wireless device or a current TA value of the wireless device.

In an example, the one or more configuration parameters may indicate/configure the location information of the wireless device or the current TA value of the wireless device as a second default/baseline TA reporting information.

In an example, the one or more configuration parameters may configure/indicate a first mapping for determining, by the wireless device, whether the TA reporting information is based on a location information of the wireless device or a current TA value of the wireless device; and/or a MAC CE or a RRC message.

In an example, the timing offset may be indicated via a MAC CE or a RRC message.

In an example, the first command may indicate a first TA condition and/or a second TA condition for triggering the TA reporting by the wireless device, wherein the at least one TA condition comprises the first TA condition and the second TA condition.

In an example, the first command may not indicate the first TA condition or the second TA condition for triggering the TA reporting.

In an example, the one or more configuration parameters may indicate/configure whether initiation of the TA reporting procedure upon receiving, by the wireless device, a timing offset is enabled or not.

In an example, the base station may start/restart the timer/window based on transmitting the timing offset.

In an example, the one or more configuration parameters may configure/indicate a first value.

In an example, the first command may indicate a first value.

In an example, the wireless device may communicate with the base station via a non-terrestrial network (NTN).

What is claimed is:

1. A method comprising:
receiving, by a wireless device, one or more configuration parameters for a timing advance (TA) reporting procedure, wherein the one or more configuration parameters comprise a first timing advance threshold for a TA reporting based on an offset between a current timing advance value and a last reported timing advance value;
triggering the TA reporting procedure based on a condition for the first timing advance threshold being satisfied;
triggering a scheduling request (SR) and starting an SR prohibit timer, based on the triggering the TA reporting procedure;
transmitting a TA reporting information via one or more uplink shared channel (UL-SCH) resources;
cancelling the triggered TA reporting procedure; and
cancelling the triggered SR and stopping the SR prohibit timer, in response to the canceling of the triggered TA reporting procedure.

2. The method of claim 1,
wherein:
the TA reporting information is transmitted via a medium access control (MAC) control element (CE) or a radio resource control (RRC) message; and
the TA reporting information is based on a location information of the wireless device or a current TA value of the wireless device.

3. The method of claim 1, further comprising:
calculating a user-equipment (UE)-specific timing offset based on receiving a timing offset; and
discarding the UE-specific timing offset based on the canceling the triggered TA reporting procedure.

4. The method of claim 3, wherein the receiving the UE-specific timing offset is in response to the transmitting the TA reporting information.

5. The method of claim 3, further comprising restarting the SR prohibit timer based on receiving the UE-specific timing offset.

6. The method of claim 1, wherein the transmitting the TA reporting information comprises transmitting the TA reporting information via a random access (RA) procedure based on determining that transmitting the TA reporting information via the RA procedure is configured by the one or more configuration parameters.

7. The method of claim 1, wherein the triggering the SR is to request the one or more UL-SCH resources.

8. The method of claim 1, further comprising receiving a radio resource control (RRC) reconfiguration message indicating one or more configuration parameters of a non-terrestrial network (NTN), wherein the cancelling the triggered TA reporting procedure is in response to the receiving the RRC reconfiguration message.

9. The method of claim 1, further comprising in response to the transmitting the TA reporting information, stopping an ongoing random access procedure for the triggered SR, wherein:
the SR has no valid physical uplink control channel (PUCCH) resource; and
the UL-SCH resources are indicated by at least one of a Type 1 configured grant or a Type 2 configured grant.

10. The method of claim 9, wherein the UL-SCH resources are not associated with the ongoing random access procedure.

11. The method of claim 9, wherein the one or more configuration parameters indicate the UL-SCH resources, wherein the UL-SCH resources are based on the Type 1 configured grant or the Type 2 configured grant.

12. A method comprising:
sending, by a base station to a wireless device, one or more configuration parameters for a timing advance (TA) reporting procedure, wherein the one or more configuration parameters comprise a first timing advance threshold for a TA reporting based on an offset between a current timing advance value and a last reported timing advance value,
wherein the configurations are configured to cause the wireless device to trigger the TA reporting procedure based on a condition for the first timing advance threshold being satisfied; to, based on the TA reporting procedure being triggered, to trigger a scheduling request (SR) and starting an SR prohibit timer; to transmit a TA reporting information via one or more uplink shared channel (UL-SCH) resources; to cancel the triggered TA reporting; and, in response to the canceling the triggered TA reporting procedure, to cancel the triggered SR and to stop the SR prohibit timer.

13. The method of claim 12, further comprising sending a radio resource control (RRC) reconfiguration message indicating one or more configuration parameters of a non-terrestrial network (NTN), wherein the triggered TA reporting procedure is cancelled in response to the RRC reconfiguration message.

14. A wireless device comprising:
one or more processors; and
memory storing instructions that, when executed by the one or more processors, cause the wireless device to perform:
receiving, by a wireless device, one or more configuration parameters for a timing advance (TA) reporting procedure, wherein the one or more configuration parameters comprise a first timing advance threshold for a TA reporting based on an offset between a current timing advance value and a last reported timing advance value;
triggering the TA reporting procedure based on a condition for the first timing advance threshold being satisfied;
triggering a scheduling request (SR) and starting an SR prohibit timer, based on the triggering the TA reporting procedure;
transmitting a TA reporting information via one or more uplink shared channel (UL-SCH) resources;
canceling the triggered TA reporting procedure; and
cancelling the triggered SR and stopping the SR prohibit timer, in response to the canceling of the triggered TA reporting procedure.

15. The wireless device of claim 14, wherein:
the TA reporting information is transmitted via a medium access control (MAC) control element (CE) or a radio resource control (RRC) message; and
the TA reporting information is based on a location information of the wireless device or a current TA value of the wireless device.

16. The wireless device of claim 14, wherein the instructions, when executed by the one or more processors, further cause the wireless device to perform:
calculating a user-equipment (UE)-specific timing offset based on receiving a timing offset; and
discarding the UE-specific timing offset based on the canceling the triggered TA reporting procedure.

17. The wireless device of claim 16, wherein the receiving the UE-specific timing offset is in response to the transmitting the TA reporting information.

18. The wireless device of claim 16, wherein the instructions, when executed by the one or more processors, further cause the wireless device to perform restarting the SR prohibit timer based on receiving the UE-specific timing offset.

19. The wireless device of claim 14, wherein the transmitting the TA reporting information comprises transmitting the TA reporting information via a random access (RA) procedure based on determining that transmitting the TA reporting information via the RA procedure is configured by the one or more configuration parameters.

20. The wireless device of claim 14, wherein the triggering the SR is to request the one or more UL-SCH resources.

* * * * *